United States Patent
Mannel et al.

(10) Patent No.: US 12,370,510 B2
(45) Date of Patent: Jul. 29, 2025

(54) SCREW ELEMENT HAVING AN AXIALLY ASYMMETRICAL SCREW PROFILE WHICH HAS AT LEAST TWO CONSTRUCTION POINTS LOCATED WITHIN THE SCREW PROFILE

(71) Applicant: Covestro Intellectual Property GmbH & Co. KG, Leverkusen (DE)

(72) Inventors: Birgit Mannel, Mülheim an der Ruhu (DE); Reiner Rudolf, Langenfeld (DE); Michael Bierdel, Leverkusen (DE); Carsten Conzen, Leverkusen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 964 days.

(21) Appl. No.: 17/430,357

(22) PCT Filed: Feb. 17, 2020

(86) PCT No.: PCT/EP2020/054003
§ 371 (c)(1),
(2) Date: Aug. 12, 2021

(87) PCT Pub. No.: WO2020/173729
PCT Pub. Date: Sep. 3, 2020

(65) Prior Publication Data
US 2022/0126245 A1    Apr. 28, 2022

(30) Foreign Application Priority Data

Feb. 27, 2019    (EP) .................................... 19159671

(51) Int. Cl.
*B01F 27/1143*    (2022.01)
*B01F 27/42*    (2022.01)
*B01F 101/00*    (2022.01)

(52) U.S. Cl.
CPC ........ *B01F 27/1143* (2022.01); *B01F 27/421* (2022.01); *B01F 2101/2805* (2022.01);
(Continued)

(58) Field of Classification Search
CPC ................ B01F 27/1143; B01F 27/421; B01F 2101/2805; B29C 48/505; B29C 48/2517; B29C 48/405
See application file for complete search history.

(56) References Cited

U.S. PATENT DOCUMENTS

| 3,900,187 A |   | 8/1975 | Loomans |
| 4,131,371 A | * | 12/1978 | Tynan ................... B29C 48/405 366/301 |

(Continued)

FOREIGN PATENT DOCUMENTS

| CN | 102066083 | 5/2011 |
| CN | 102123845 | 7/2011 |

(Continued)

OTHER PUBLICATIONS

International Search Report for International Patent Application No. PCT/EP2020/054003, mailed Apr. 9, 2020. (English translation attached).

(Continued)

*Primary Examiner* — Claire X Wang
*Assistant Examiner* — Patrick M McCarty
(74) *Attorney, Agent, or Firm* — K&L Gates LLP

(57) ABSTRACT

A screw element which has an axially asymmetrical screw cross-sectional profile which has at least two construction points located within the screw cross-sectional profile is provided. The screw element is suitable for use in an extruder having two drive shafts which rotate in the same direction and at the same speed, in order to process or produce plastic masses as an extrudate. Also, an arrange-
(Continued)

ment of two identical or different screw elements in an extruder having two drive shafts which rotate in the same direction and at the same speed is provided. An extruder which is equipped with two identical or different screw elements and has two drive shafts which rotate in the same direction and at the same speed is provided. Furthermore, the use of the screw element according to the invention for processing or producing plastic masses is provided.

17 Claims, 21 Drawing Sheets

(52) U.S. Cl.
CPC ............ *B01F 2215/0422* (2013.01); *B01F 2215/0431* (2013.01)

(56) References Cited

U.S. PATENT DOCUMENTS

| | | | | |
|---|---|---|---|---|
| 4,824,256 | A | * | 4/1989 | Haring .................... B29B 7/483 366/85 |
| 5,048,971 | A | * | 9/1991 | Wall ...................... B29C 48/395 366/85 |
| 2011/0158039 | A1 | | 6/2011 | Bierdel et al. |
| 2011/0160381 | A1 | * | 6/2011 | Konig .................... B29C 48/65 366/85 |
| 2013/0033956 | A1 | | 2/2013 | Kirchhoff et al. |

FOREIGN PATENT DOCUMENTS

| | | | | |
|---|---|---|---|---|
| CN | 102333635 | | 1/2012 | |
| CN | 103112193 | A * | 5/2013 | ......... B29C 47/6075 |
| CN | 105612041 | | 5/2016 | |
| DE | 102008029303 | A1 | 12/2009 | |
| DE | 102008029306 | A1 | 12/2009 | |
| JP | 2912021 | B2 | 6/1999 | |
| JP | 2011/524280 | | 9/2011 | |
| JP | 2011/524283 | | 9/2011 | |
| WO | 2011/039016 | A1 | 4/2011 | |

OTHER PUBLICATIONS

Written Opinion for International Patent Application No. PCT/EP2020/054003, mailed Apr. 9, 2020.

* cited by examiner

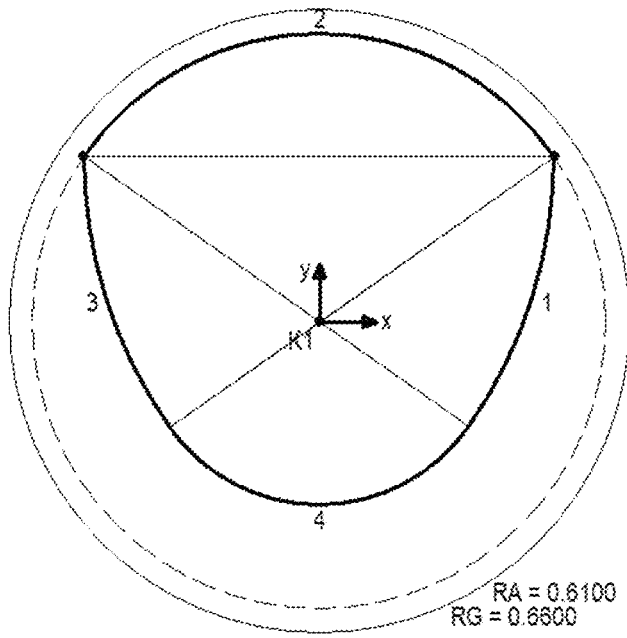
Fig. 1a - Prior Art
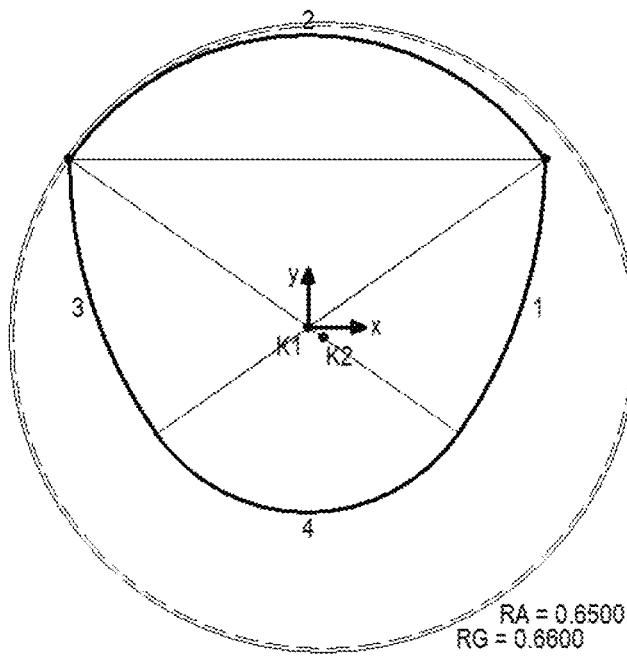
Fig. 1b

1) R = 1.0000  Mx = -0.5000  Ax = 0.3197
   α = 0.6100  My = 0.3494  Ay = -0.2234
2) R = 0.6100  Mx = 0.0000  Ax = 0.5000
   α = 0.5238  My = 0.0000  Ay = 0.3494
2a) R = 0.6500  Mx = 0.0132  Ax = 0.2582
    α = 1.2966  My = -0.0494  Ay = 0.5527
3) R = 1.0000  Mx = 0.5000  Ax = -0.5000
   α = 0.6100  My = 0.3494  Ay = 0.3494
4) R = 0.3900  Mx = 0.0000  Ax = -0.3197
   α = 1.9217  My = 0.0000  Ay = -0.2234

RA = 0.6100
RG = 0.6600

1) R = 1.0000  Mx = -0.5000  Ax = 0.3197
   α = 0.6100  My = 0.3494  Ay = -0.2234
2) R = 0.6100  Mx = 0.0000  Ax = 0.5000
   α = 0.5238  My = 0.0000  Ay = 0.3494
2a) R = 0.6500  Mx = 0.0132  Ax = 0.2582
    α = 1.2966  My = -0.0494  Ay = 0.5527
3) R = 1.0000  Mx = 0.5000  Ax = -0.5000
   α = 0.6100  My = 0.3494  Ay = 0.3494
4) R = 0.3900  Mx = 0.0000  Ax = -0.3197
   α = 1.9217  My = 0.0000  Ay = -0.2234

RA = 0.6500
RG = 0.6600

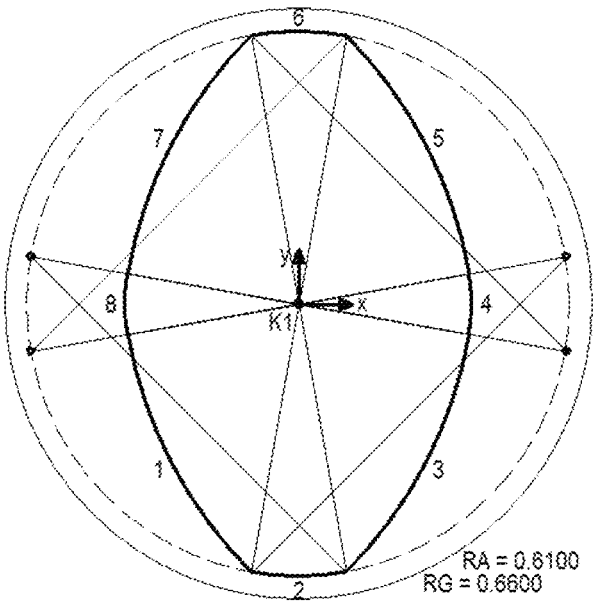
Fig. 5a - Prior Art
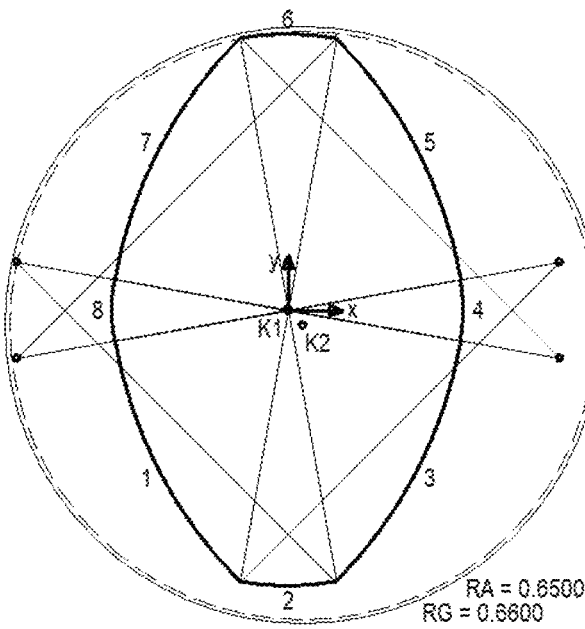
Fig. 5b

| 1) R = 1.0000 | Mx = 0.6006 | Ax = -0.3840 |
| α = 0.6100 | My = 0.1065 | Ay = -0.0681 |
| 2) R = 0.6100 | Mx = 0.0000 | Ax = -0.1065 |
| α = 0.3509 | My = 0.0000 | Ay = -0.6006 |
| 3) R = 1.0000 | Mx = -0.6006 | Ax = 0.1065 |
| α = 0.6100 | My = 0.1065 | Ay = -0.6006 |
| 4) R = 0.3900 | Mx = 0.0000 | Ax = 0.3840 |
| α = 0.3509 | My = 0.0000 | Ay = -0.0681 |
| 5) R = 1.0000 | Mx = -0.6006 | Ax = 0.3840 |
| α = 0.6100 | My = -0.1065 | Ay = 0.0681 |
| 6) R = 0.6100 | Mx = 0.0000 | Ax = 0.1065 |
| α = 0.0001 | My = 0.0000 | Ay = 0.6006 |
| 6a) R = 0.6500 | Mx = 0.0466 | Ax = 0.1064 |
| α = 0.3618 | My = -0.0466 | Ay = 0.6007 |
| 7) R = 1.0000 | Mx = 0.6006 | Ax = -0.1266 |
| α = 0.5811 | My = -0.1065 | Ay = 0.5799 |
| 8) R = 0.3900 | Mx = 0.0000 | Ax = -0.3840 |
| α = 0.3509 | My = 0.0000 | Ay = 0.0681 |

| 1) R = 1.0000 | Mx = 0.6006 | Ax = -0.3840 |
| α = 0.6100 | My = 0.1065 | Ay = -0.0681 |
| 2) R = 0.6100 | Mx = 0.0000 | Ax = -0.1065 |
| α = 0.3509 | My = 0.0000 | Ay = -0.6006 |
| 3) R = 1.0000 | Mx = -0.6006 | Ax = 0.1065 |
| α = 0.6100 | My = 0.1065 | Ay = -0.6006 |
| 4) R = 0.3900 | Mx = 0.0000 | Ax = 0.3840 |
| α = 0.3509 | My = 0.0000 | Ay = -0.0681 |
| 5) R = 1.0000 | Mx = -0.6006 | Ax = 0.3840 |
| α = 0.6100 | My = -0.1065 | Ay = 0.0681 |
| 6) R = 0.6100 | Mx = 0.0000 | Ax = 0.1065 |
| α = 0.0001 | My = 0.0000 | Ay = 0.6006 |
| 6a) R = 0.6500 | Mx = 0.0466 | Ax = 0.1064 |
| α = 0.3618 | My = -0.0466 | Ay = 0.6007 |
| 7) R = 1.0000 | Mx = 0.6006 | Ax = -0.1266 |
| α = 0.5811 | My = -0.1065 | Ay = 0.5799 |
| 8) R = 0.3900 | Mx = 0.0000 | Ax = -0.3840 |
| α = 0.3509 | My = 0.0000 | Ay = 0.0681 |

1) R = 1.0000  Mx = 0.6006  Ax = -0.3840
   α = 0.6100  My = 0.1065  Ay = -0.0681
2) R = 0.6100  Mx = 0.0000  Ax = -0.1065
   α = 0.3509  My = 0.0000  Ay = -0.6006
3) R = 1.0000  Mx = -0.6006 Ax = 0.1065
   α = 0.6100  My = 0.1065  Ay = -0.6006
4) R = 0.3900  Mx = 0.0000  Ax = 0.3840
   α = 0.3509  My = 0.0000  Ay = -0.0681
5) R = 1.0000  Mx = -0.6006 Ax = 0.3840
   α = 0.6100  My = -0.1065 Ay = 0.0681
6) R = 0.6100  Mx = 0.0000  Ax = 0.1065
   α = 0.0837  My = 0.0000  Ay = 0.6006
6a) R = 0.6500 Mx = 0.0424  Ax = 0.0559
    α = 0.2731 My = -0.0424 Ay = 0.6074
7) R = 1.0000  Mx = 0.6006  Ax = -0.1199
   α = 0.5908  My = -0.1065 Ay = 0.5870
8) R = 0.3900  Mx = 0.0000  Ax = -0.3840
   α = 0.3509  My = 0.0000  Ay = 0.0681

1) R = 1.0000  Mx = 0.6006  Ax = -0.3840
   α = 0.6100  My = 0.1065  Ay = -0.0681
2) R = 0.6100  Mx = 0.0000  Ax = -0.1065
   α = 0.3509  My = 0.0000  Ay = -0.6006
3) R = 1.0000  Mx = -0.6006 Ax = 0.1065
   α = 0.6100  My = 0.1065  Ay = -0.6006
4) R = 0.3900  Mx = 0.0000  Ax = 0.3840
   α = 0.3509  My = 0.0000  Ay = -0.0681
5) R = 1.0000  Mx = -0.6006 Ax = 0.3840
   α = 0.6100  My = -0.1065 Ay = 0.0681
6) R = 0.6100  Mx = 0.0000  Ax = 0.1065
   α = 0.0837  My = 0.0000  Ay = 0.6006
6a) R = 0.6500 Mx = 0.0424  Ax = 0.0559
    α = 0.2731 My = -0.0424 Ay = 0.6074
7) R = 1.0000  Mx = 0.6006  Ax = -0.1199
   α = 0.5908  My = -0.1065 Ay = 0.5870
8) R = 0.3900  Mx = 0.0000  Ax = -0.3840
   α = 0.3509  My = 0.0000  Ay = 0.0681

| | | | |
|---|---|---|---|
| 1) | R = 1.0000 | Mx = 0.5614 | Ax = -0.4065 |
| | α = 0.5315 | My = 0.1457 | Ay = -0.1055 |
| 2) | R = 0.5800 | Mx = 0.0000 | Ax = -0.1457 |
| | α = 0.5079 | My = 0.0000 | Ay = -0.5614 |
| 3) | R = 1.0000 | Mx = -0.5614 | Ax = 0.1457 |
| | α = 0.5315 | My = 0.1457 | Ay = -0.5614 |
| 4) | R = 0.4200 | Mx = 0.0000 | Ax = 0.4065 |
| | α = 0.5079 | My = 0.0000 | Ay = -0.1055 |
| 5) | R = 1.0000 | Mx = -0.5614 | Ax = 0.4065 |
| | α = 0.5315 | My = -0.1457 | Ay = 0.1055 |
| 6) | R = 0.5800 | Mx = 0.0000 | Ax = 0.1457 |
| | α = 0.0320 | My = 0.0000 | Ay = 0.5614 |
| 6a) | R = 0.6000 | Mx = 0.0255 | Ax = 0.1277 |
| | α = 0.4895 | My = -0.0255 | Ay = 0.5658 |
| 7) | R = 1.0000 | Mx = 0.5614 | Ax = -0.1623 |
| | α = 0.5077 | My = -0.1457 | Ay = 0.5444 |
| 8) | R = 0.4200 | Mx = 0.0000 | Ax = -0.4065 |
| | α = 0.5079 | My = 0.0000 | Ay = 0.1055 |

| | | | |
|---|---|---|---|
| 1) | R = 1.0000 | Mx = 0.5614 | Ax = -0.4065 |
| | α = 0.5315 | My = 0.1457 | Ay = -0.1055 |
| 2) | R = 0.5800 | Mx = 0.0000 | Ax = -0.1457 |
| | α = 0.5079 | My = 0.0000 | Ay = -0.5614 |
| 3) | R = 1.0000 | Mx = -0.5614 | Ax = 0.1457 |
| | α = 0.5315 | My = 0.1457 | Ay = -0.5614 |
| 4) | R = 0.4200 | Mx = 0.0000 | Ax = 0.4065 |
| | α = 0.5079 | My = 0.0000 | Ay = -0.1055 |
| 5) | R = 1.0000 | Mx = -0.5614 | Ax = 0.4065 |
| | α = 0.5315 | My = -0.1457 | Ay = 0.1055 |
| 6) | R = 0.5800 | Mx = 0.0000 | Ax = 0.1457 |
| | α = 0.0320 | My = 0.0000 | Ay = 0.5614 |
| 6a) | R = 0.6000 | Mx = 0.0255 | Ax = 0.1277 |
| | α = 0.4895 | My = -0.0255 | Ay = 0.5658 |
| 7) | R = 1.0000 | Mx = 0.5614 | Ax = -0.1623 |
| | α = 0.5077 | My = -0.1457 | Ay = 0.5444 |
| 8) | R = 0.4200 | Mx = 0.0000 | Ax = -0.4065 |
| | α = 0.5079 | My = 0.0000 | Ay = 0.1055 |

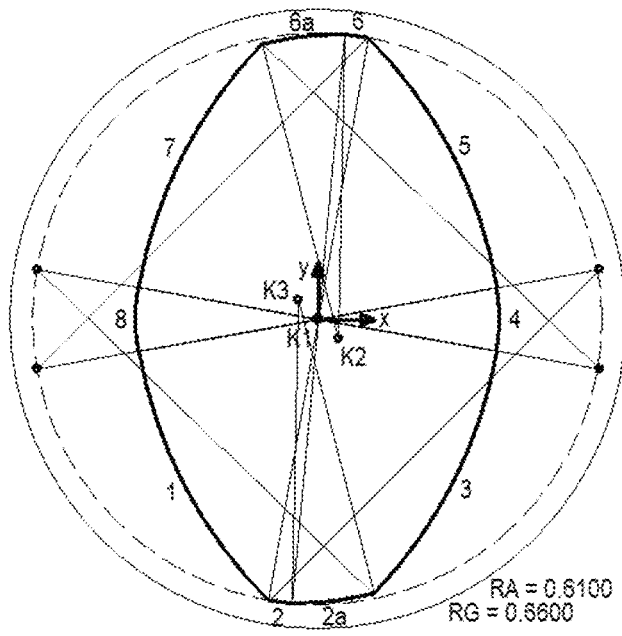

| | | | |
|---|---|---|---|
| 1) | R = 1.0000 | Mx = 0.6006 | Ax = -0.3840 |
| | α = 0.6100 | My = 0.1065 | Ay = -0.0681 |
| 2) | R = 0.6100 | Mx = 0.0000 | Ax = -0.1065 |
| | α = 0.0837 | My = 0.0000 | Ay = -0.6006 |
| 2a) | R = 0.6500 | Mx = -0.0424 | Ax = -0.0559 |
| | α = 0.2731 | My = 0.0424 | Ay = -0.6074 |
| 3) | R = 1.0000 | Mx = -0.6006 | Ax = 0.1199 |
| | α = 0.5908 | My = 0.1065 | Ay = -0.5870 |
| 4) | R = 0.3900 | Mx = 0.0000 | Ax = 0.3840 |
| | α = 0.3509 | My = 0.0000 | Ay = -0.0681 |
| 5) | R = 1.0000 | Mx = -0.6006 | Ax = 0.3840 |
| | α = 0.6100 | My = -0.1065 | Ay = 0.0681 |
| 6) | R = 0.6100 | Mx = 0.0000 | Ax = 0.1065 |
| | α = 0.0837 | My = 0.0000 | Ay = 0.6006 |
| 6a) | R = 0.6500 | Mx = 0.0424 | Ax = 0.0559 |
| | α = 0.2731 | My = -0.0424 | Ay = 0.6074 |
| 7) | R = 1.0000 | Mx = 0.6006 | Ax = -0.1199 |
| | α = 0.5908 | My = -0.1065 | Ay = 0.5870 |
| 8) | R = 0.3900 | Mx = 0.0000 | Ax = -0.3840 |
| | α = 0.3509 | My = 0.0000 | Ay = 0.0681 |

Fig. 10a

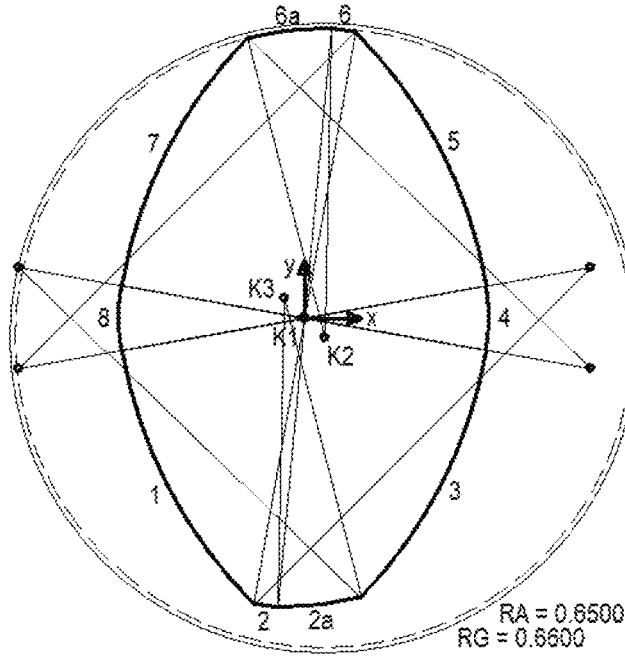

| | | | |
|---|---|---|---|
| 1) | R = 1.0000 | Mx = 0.6006 | Ax = -0.3840 |
| | α = 0.6100 | My = 0.1065 | Ay = -0.0681 |
| 2) | R = 0.6100 | Mx = 0.0000 | Ax = -0.1065 |
| | α = 0.0837 | My = 0.0000 | Ay = -0.6006 |
| 2a) | R = 0.6500 | Mx = -0.0424 | Ax = -0.0559 |
| | α = 0.2731 | My = 0.0424 | Ay = -0.6074 |
| 3) | R = 1.0000 | Mx = -0.6006 | Ax = 0.1199 |
| | α = 0.5908 | My = 0.1065 | Ay = -0.5870 |
| 4) | R = 0.3900 | Mx = 0.0000 | Ax = 0.3840 |
| | α = 0.3509 | My = 0.0000 | Ay = -0.0681 |
| 5) | R = 1.0000 | Mx = -0.6006 | Ax = 0.3840 |
| | α = 0.6100 | My = -0.1065 | Ay = 0.0681 |
| 6) | R = 0.6100 | Mx = 0.0000 | Ax = 0.1065 |
| | α = 0.0837 | My = 0.0000 | Ay = 0.6006 |
| 6a) | R = 0.6500 | Mx = 0.0424 | Ax = 0.0559 |
| | α = 0.2731 | My = -0.0424 | Ay = 0.6074 |
| 7) | R = 1.0000 | Mx = 0.6006 | Ax = -0.1199 |
| | α = 0.5908 | My = -0.1065 | Ay = 0.5870 |
| 8) | R = 0.3900 | Mx = 0.0000 | Ax = -0.3840 |
| | α = 0.3509 | My = 0.0000 | Ay = 0.0681 |

Fig. 10b

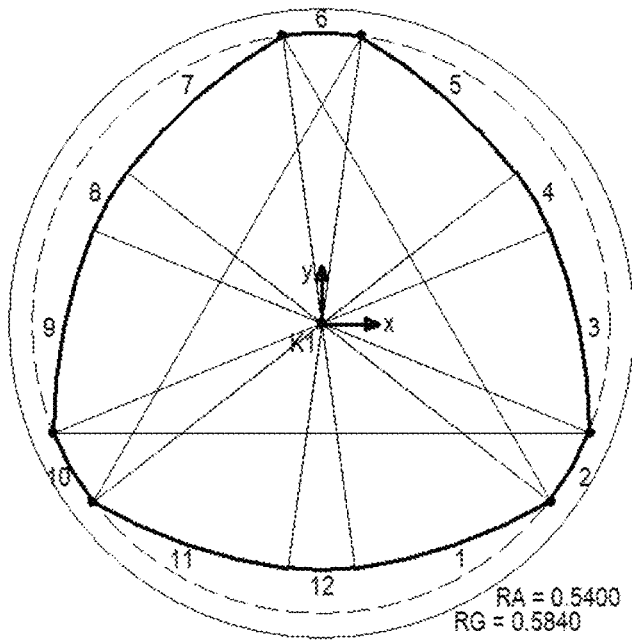
1) R = 1.0000  Mx = -0.0734  Ax = 0.0625
   α = 0.3873  My = 0.5350  Ay = -0.4557
2) R = 0.5400  Mx = 0.0000  Ax = 0.4266
   α = 0.2726  My = 0.0000  Ay = -0.3310
3) R = 1.0000  Mx = -0.5000  Ax = 0.5000
   α = 0.3873  My = -0.2040  Ay = -0.2040
4) R = 0.4600  Mx = 0.0000  Ax = 0.4259
   α = 0.2726  My = 0.0000  Ay = 0.1737
5) R = 1.0000  Mx = -0.4266  Ax = 0.3634
   α = 0.3873  My = -0.3310  Ay = 0.2820
6) R = 0.5400  Mx = 0.0000  Ax = 0.0734
   α = 0.2726  My = 0.0000  Ay = 0.5350
7) R = 1.0000  Mx = 0.4266  Ax = -0.0734
   α = 0.3873  My = -0.3310  Ay = 0.5350
8) R = 0.4600  Mx = 0.0000  Ax = -0.3634
   α = 0.2726  My = 0.0000  Ay = 0.2820
9) R = 1.0000  Mx = 0.5000  Ax = -0.4259
   α = 0.3873  My = -0.2040  Ay = 0.1737
10) R = 0.5400  Mx = 0.0000  Ax = -0.5000
    α = 0.2726  My = 0.0000  Ay = -0.2040
11) R = 1.0000  Mx = 0.0734  Ax = -0.4266
    α = 0.3873  My = 0.5350  Ay = -0.3310
12) R = 0.4600  Mx = 0.0000  Ax = -0.0625
    α = 0.2726  My = 0.0000  Ay = -0.4557
Fig. 11a1 - Prior Art
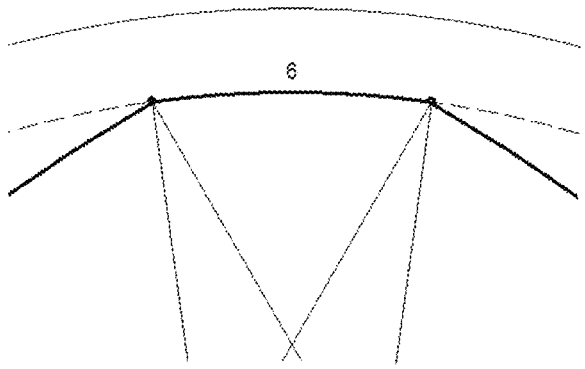
Fig. 11a2

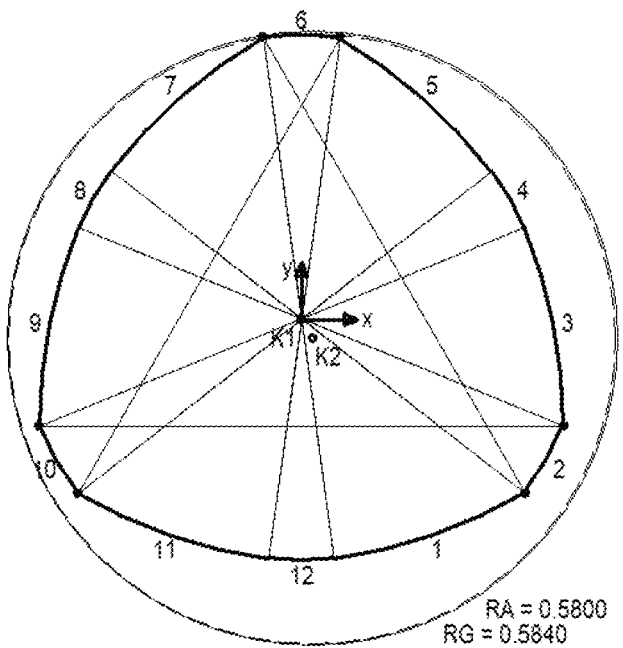
1) R = 1.0000  Mx = -0.0734  Ax = 0.0625
   α = 0.3873  My = 0.5350   Ay = -0.4557
2) R = 0.5400  Mx = 0.0000   Ax = 0.4266
   α = 0.2726  My = 0.0000   Ay = -0.3310
3) R = 1.0000  Mx = -0.5000  Ax = 0.5000
   α = 0.3873  My = -0.2040  Ay = -0.2040
4) R = 0.4600  Mx = 0.0000   Ax = 0.4259
   α = 0.2726  My = 0.0000   Ay = 0.1737
5) R = 1.0000  Mx = -0.4266  Ax = 0.3634
   α = 0.3873  My = -0.3310  Ay = 0.2820
6) R = 0.5400  Mx = 0.0000   Ax = 0.0734
   α = 0.2726  My = 0.0000   Ay = 0.5350
7) R = 1.0000  Mx = 0.4266   Ax = -0.0734
   α = 0.3873  My = -0.3310  Ay = 0.5350
8) R = 0.4600  Mx = 0.0000   Ax = -0.3634
   α = 0.2726  My = 0.0000   Ay = 0.2820
9) R = 1.0000  Mx = 0.5000   Ax = -0.4259
   α = 0.3873  My = -0.2040  Ay = 0.1737
10) R = 0.5400 Mx = 0.0000   Ax = -0.5000
    α = 0.2726 My = 0.0000   Ay = -0.2040
11) R = 1.0000 Mx = 0.0734   Ax = -0.4266
    α = 0.3873 My = 0.5350   Ay = -0.3310
12) R = 0.4600 Mx = 0.0000   Ax = -0.0625
    α = 0.2726 My = 0.0000   Ay = -0.4557
Fig. 11b1
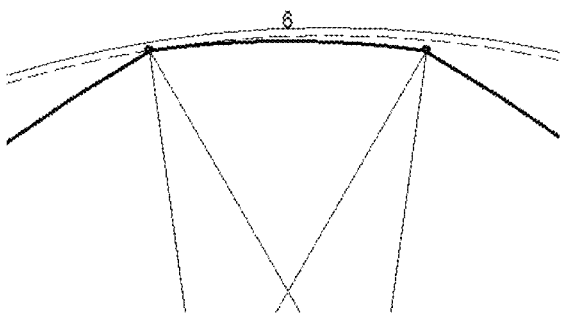
Fig. 11b2

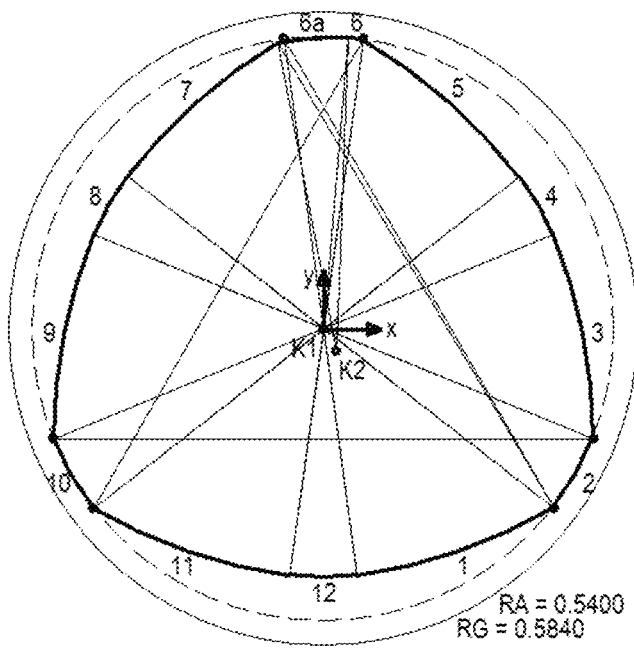
Fig. 12a1
| | | | |
|---|---|---|---|
| 1) | R = 1.0000 | Mx = -0.0734 | Ax = 0.0625 |
| | α = 0.3873 | My = 0.5350 | Ay = -0.4557 |
| 2) | R = 0.5400 | Mx = 0.0000 | Ax = 0.4266 |
| | α = 0.2726 | My = 0.0000 | Ay = -0.3310 |
| 3) | R = 1.0000 | Mx = -0.5000 | Ax = 0.5000 |
| | α = 0.3873 | My = -0.2040 | Ay = -0.2040 |
| 4) | R = 0.4600 | Mx = 0.0000 | Ax = 0.4259 |
| | α = 0.2726 | My = 0.0000 | Ay = 0.1737 |
| 5) | R = 1.0000 | Mx = -0.4266 | Ax = 0.3634 |
| | α = 0.3873 | My = -0.3310 | Ay = 0.2820 |
| 6) | R = 0.5400 | Mx = 0.0000 | Ax = 0.0734 |
| | α = 0.0501 | My = 0.0000 | Ay = 0.5350 |
| 6a) | R = 0.5800 | Mx = 0.0240 | Ax = 0.0465 |
| | α = 0.2282 | My = -0.0416 | Ay = 0.5380 |
| 7) | R = 1.0000 | Mx = 0.4266 | Ax = -0.0852 |
| | α = 0.3736 | My = -0.3310 | Ay = 0.5281 |
| 8) | R = 0.4600 | Mx = 0.0000 | Ax = -0.3634 |
| | α = 0.2726 | My = 0.0000 | Ay = 0.2820 |
| 9) | R = 1.0000 | Mx = 0.5000 | Ax = -0.4259 |
| | α = 0.3873 | My = -0.2040 | Ay = 0.1737 |
| 10) | R = 0.5400 | Mx = 0.0000 | Ax = -0.5000 |
| | α = 0.2726 | My = 0.0000 | Ay = -0.2040 |
| 11) | R = 1.0000 | Mx = 0.0734 | Ax = -0.4266 |
| | α = 0.3873 | My = 0.5350 | Ay = -0.3310 |
| 12) | R = 0.4600 | Mx = 0.0000 | Ax = -0.0625 |
| | α = 0.2726 | My = 0.0000 | Ay = -0.4557 |
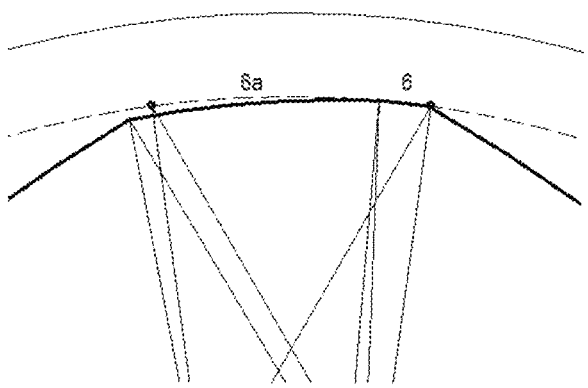
Fig. 12a2

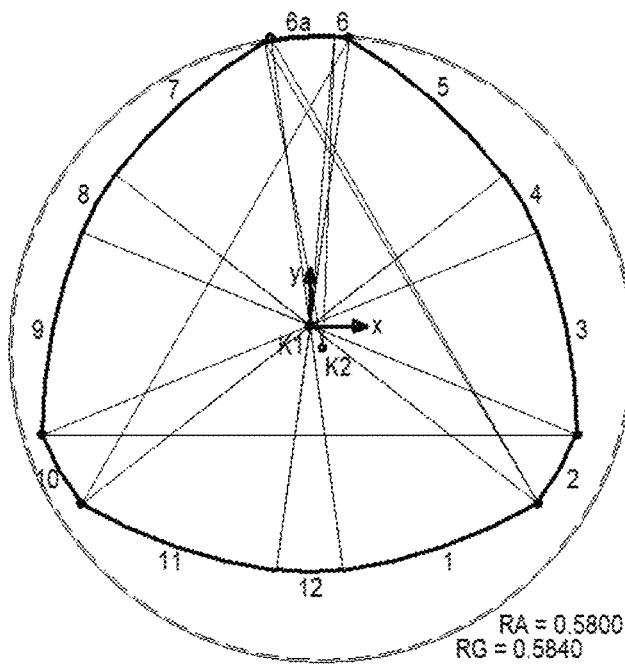
1) R = 1.0000  Mx = -0.0734  Ax = 0.0625
   α = 0.3873  My = 0.5350   Ay = -0.4557
2) R = 0.5400  Mx = 0.0000   Ax = 0.4266
   α = 0.2726  My = 0.0000   Ay = -0.3310
3) R = 1.0000  Mx = -0.5000  Ax = 0.5000
   α = 0.3873  My = -0.2040  Ay = -0.2040
4) R = 0.4600  Mx = 0.0000   Ax = 0.4259
   α = 0.2726  My = 0.0000   Ay = 0.1737
5) R = 1.0000  Mx = -0.4266  Ax = 0.3634
   α = 0.3873  My = -0.3310  Ay = 0.2820
6) R = 0.5400  Mx = 0.0000   Ax = 0.0734
   α = 0.0501  My = 0.0000   Ay = 0.5350
6a) R = 0.5800 Mx = 0.0240   Ax = 0.0465
   α = 0.2282  My = -0.0416  Ay = 0.5380
7) R = 1.0000  Mx = 0.4266   Ax = -0.0852
   α = 0.3736  My = -0.3310  Ay = 0.5281
8) R = 0.4600  Mx = 0.0000   Ax = -0.3634
   α = 0.2726  My = 0.0000   Ay = 0.2820
9) R = 1.0000  Mx = 0.5000   Ax = -0.4259
   α = 0.3873  My = -0.2040  Ay = 0.1737
10) R = 0.5400 Mx = 0.0000   Ax = -0.5000
   α = 0.2726  My = 0.0000   Ay = -0.2040
11) R = 1.0000 Mx = 0.0734   Ax = -0.4266
   α = 0.3873  My = 0.5350   Ay = -0.3310
12) R = 0.4600 Mx = 0.0000   Ax = -0.0625
   α = 0.2726  My = 0.0000   Ay = -0.4557
Fig. 12b1
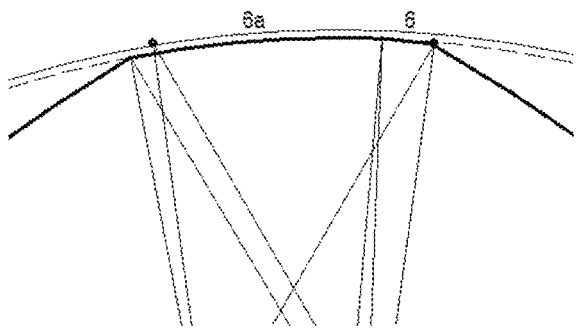
Fig. 12b2

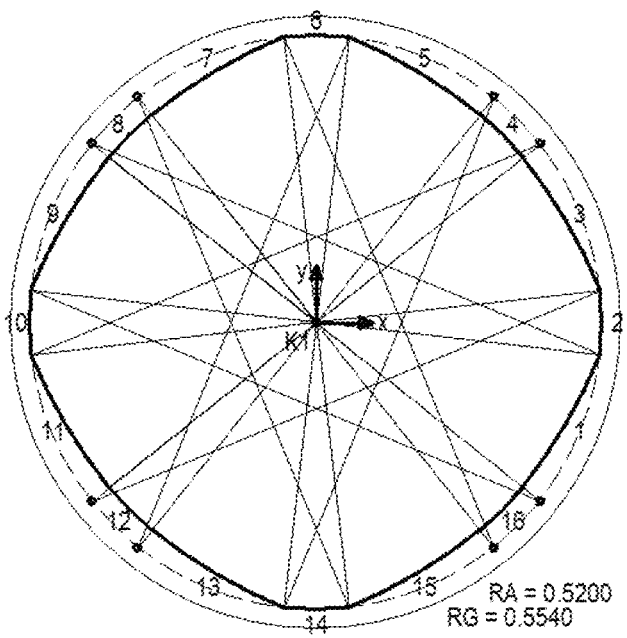
| | | | |
|---|---|---|---|
| 1) R = 1.0000 | Mx = -0.4073 | Ax = 0.3760 | |
| α = 0.2782 | My = 0.3233 | Ay = -0.2984 | |
| 2) R = 0.5200 | Mx = 0.0000 | Ax = 0.5166 | |
| α = 0.2289 | My = 0.0000 | Ay = -0.0594 | |
| 3) R = 1.0000 | Mx = -0.4073 | Ax = 0.5166 | |
| α = 0.2782 | My = -0.3233 | Ay = 0.0594 | |
| 4) R = 0.4800 | Mx = 0.0000 | Ax = 0.3760 | |
| α = 0.2289 | My = 0.0000 | Ay = 0.2984 | |
| 5) R = 1.0000 | Mx = -0.3233 | Ax = 0.2984 | |
| α = 0.2782 | My = -0.4073 | Ay = 0.3760 | |
| 6) R = 0.5200 | Mx = 0.0000 | Ax = 0.0594 | |
| α = 0.2289 | My = 0.0000 | Ay = 0.5166 | |
| 7) R = 1.0000 | Mx = 0.3233 | Ax = -0.0594 | |
| α = 0.2782 | My = -0.4073 | Ay = 0.5166 | |
| 8) R = 0.4800 | Mx = 0.0000 | Ax = -0.2984 | |
| α = 0.2289 | My = 0.0000 | Ay = 0.3760 | |
| 9) R = 1.0000 | Mx = 0.4073 | Ax = -0.3760 | |
| α = 0.2782 | My = -0.3233 | Ay = 0.2984 | |
| 10) R = 0.5200 | Mx = 0.0000 | Ax = -0.5166 | |
| α = 0.2289 | My = 0.0000 | Ay = 0.0594 | |
| 11) R = 1.0000 | Mx = 0.4073 | Ax = -0.5166 | |
| α = 0.2782 | My = 0.3233 | Ay = -0.0594 | |
| 12) R = 0.4800 | Mx = 0.0000 | Ax = -0.3760 | |
| α = 0.2289 | My = 0.0000 | Ay = -0.2984 | |
| 13) R = 1.0000 | Mx = 0.3233 | Ax = -0.2984 | |
| α = 0.2782 | My = 0.4073 | Ay = -0.3760 | |
| 14) R = 0.5200 | Mx = 0.0000 | Ax = -0.0594 | |
| α = 0.2289 | My = 0.0000 | Ay = -0.5166 | |
| 15) R = 1.0000 | Mx = -0.3233 | Ax = 0.0594 | |
| α = 0.2782 | My = 0.4073 | Ay = -0.5166 | |
| 16) R = 0.4800 | Mx = 0.0000 | Ax = 0.2984 | |
| α = 0.2289 | My = 0.0000 | Ay = -0.3760 | |
Fig. 13a1 - Prior Art
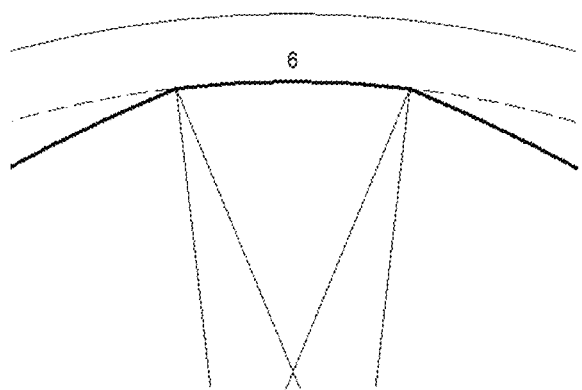
Fig. 13a2

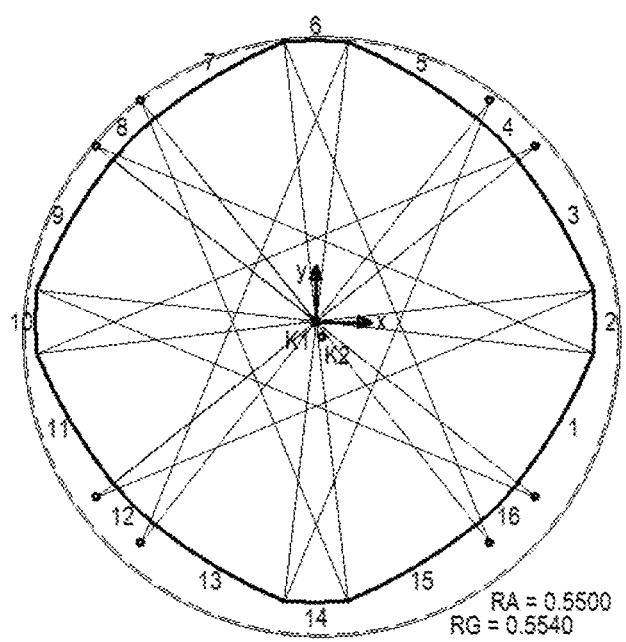
| | | | |
|---|---|---|---|
| 1) R = 1.0000 | Mx = -0.4073 | Ax = 0.3760 | |
| α = 0.2782 | My = 0.3233 | Ay = -0.2984 | |
| 2) R = 0.5200 | Mx = 0.0000 | Ax = 0.5166 | |
| α = 0.2289 | My = 0.0000 | Ay = -0.0594 | |
| 3) R = 1.0000 | Mx = -0.4073 | Ax = 0.5166 | |
| α = 0.2782 | My = -0.3233 | Ay = 0.0594 | |
| 4) R = 0.4800 | Mx = 0.0000 | Ax = 0.3760 | |
| α = 0.2289 | My = 0.0000 | Ay = 0.2984 | |
| 5) R = 1.0000 | Mx = -0.3233 | Ax = 0.2984 | |
| α = 0.2782 | My = -0.4073 | Ay = 0.3760 | |
| 6) R = 0.5200 | Mx = 0.0000 | Ax = 0.0594 | |
| α = 0.2289 | My = 0.0000 | Ay = 0.5166 | |
| 7) R = 1.0000 | Mx = 0.3233 | Ax = -0.0594 | |
| α = 0.2782 | My = -0.4073 | Ay = 0.5166 | |
| 8) R = 0.4800 | Mx = 0.0000 | Ax = -0.2984 | |
| α = 0.2289 | My = 0.0000 | Ay = 0.3760 | |
| 9) R = 1.0000 | Mx = 0.4073 | Ax = -0.3760 | |
| α = 0.2782 | My = -0.3233 | Ay = 0.2984 | |
| 10) R = 0.5200 | Mx = 0.0000 | Ax = -0.5166 | |
| α = 0.2289 | My = 0.0000 | Ay = 0.0594 | |
| 11) R = 1.0000 | Mx = 0.4073 | Ax = -0.5166 | |
| α = 0.2782 | My = 0.3233 | Ay = -0.0594 | |
| 12) R = 0.4800 | Mx = 0.0000 | Ax = -0.3760 | |
| α = 0.2289 | My = 0.0000 | Ay = -0.2984 | |
| 13) R = 1.0000 | Mx = 0.3233 | Ax = -0.2984 | |
| α = 0.2782 | My = 0.4073 | Ay = -0.3760 | |
| 14) R = 0.5200 | Mx = 0.0000 | Ax = -0.0594 | |
| α = 0.2289 | My = 0.0000 | Ay = -0.5166 | |
| 15) R = 1.0000 | Mx = -0.3233 | Ax = 0.0594 | |
| α = 0.2782 | My = 0.4073 | Ay = -0.5166 | |
| 16) R = 0.4800 | Mx = 0.0000 | Ax = 0.2984 | |
| α = 0.2289 | My = 0.0000 | Ay = -0.3760 | |
Fig. 13b1
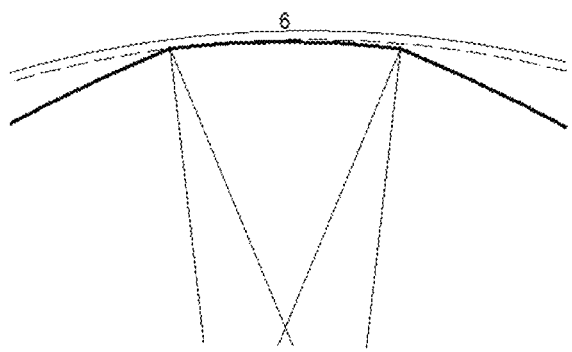
Fig. 13b2

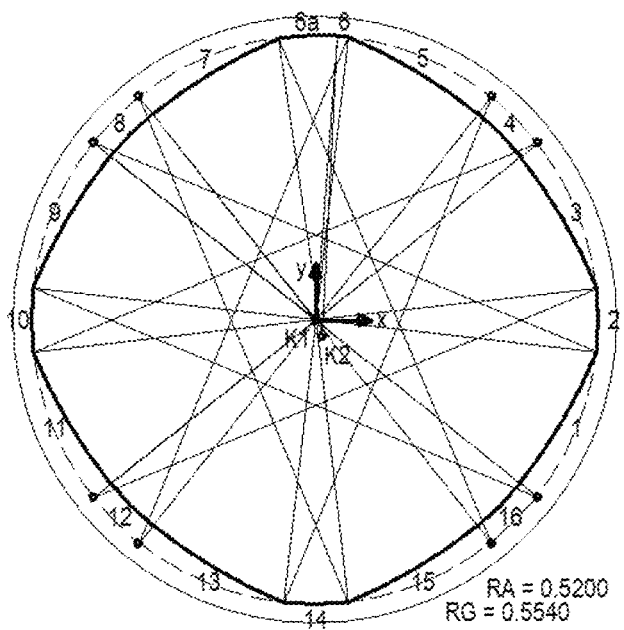
| | | | |
|---|---|---|---|
| 1) | R = 1.0000 | Mx = -0.4073 | Ax = 0.3760 |
| | α = 0.2782 | My = 0.3233 | Ay = -0.2984 |
| 2) | R = 0.5200 | Mx = 0.0000 | Ax = 0.5166 |
| | α = 0.2289 | My = 0.0000 | Ay = -0.0594 |
| 3) | R = 1.0000 | Mx = -0.4073 | Ax = 0.5166 |
| | α = 0.2782 | My = -0.3233 | Ay = 0.0594 |
| 4) | R = 0.4800 | Mx = 0.0000 | Ax = 0.3760 |
| | α = 0.2289 | My = 0.0000 | Ay = 0.2984 |
| 5) | R = 1.0000 | Mx = -0.3233 | Ax = 0.2984 |
| | α = 0.2782 | My = -0.4073 | Ay = 0.3760 |
| 6) | R = 0.5200 | Mx = 0.0000 | Ax = 0.0594 |
| | α = 0.0381 | My = 0.0000 | Ay = 0.5166 |
| 6a) | R = 0.5500 | Mx = 0.0128 | Ax = 0.0397 |
| | α = 0.1950 | My = -0.0309 | Ay = 0.5185 |
| 7) | R = 1.0000 | Mx = 0.3233 | Ax = -0.0673 |
| | α = 0.2697 | My = -0.4073 | Ay = 0.5133 |
| 8) | R = 0.4800 | Mx = 0.0000 | Ax = -0.2984 |
| | α = 0.2289 | My = 0.0000 | Ay = 0.3760 |
| 9) | R = 1.0000 | Mx = 0.4073 | Ax = -0.3760 |
| | α = 0.2782 | My = -0.3233 | Ay = 0.2984 |
| 10) | R = 0.5200 | Mx = 0.0000 | Ax = -0.5166 |
| | α = 0.2289 | My = 0.0000 | Ay = 0.0594 |
| 11) | R = 1.0000 | Mx = 0.4073 | Ax = -0.5166 |
| | α = 0.2782 | My = 0.3233 | Ay = -0.0594 |
| 12) | R = 0.4800 | Mx = 0.0000 | Ax = -0.3760 |
| | α = 0.2289 | My = 0.0000 | Ay = -0.2984 |
| 13) | R = 1.0000 | Mx = 0.3233 | Ax = -0.2984 |
| | α = 0.2782 | My = 0.4073 | Ay = -0.3760 |
| 14) | R = 0.5200 | Mx = 0.0000 | Ax = -0.0594 |
| | α = 0.2289 | My = 0.0000 | Ay = -0.5166 |
| 15) | R = 1.0000 | Mx = -0.3233 | Ax = 0.0594 |
| | α = 0.2782 | My = 0.4073 | Ay = -0.5166 |
| 16) | R = 0.4800 | Mx = 0.0000 | Ax = 0.2984 |
| | α = 0.2289 | My = 0.0000 | Ay = -0.3760 |
Fig. 14a1
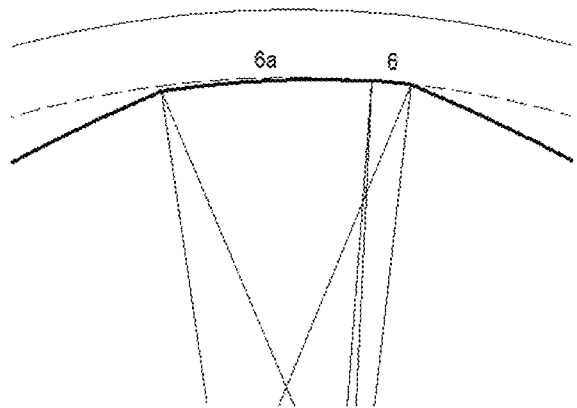
Fig. 14a2

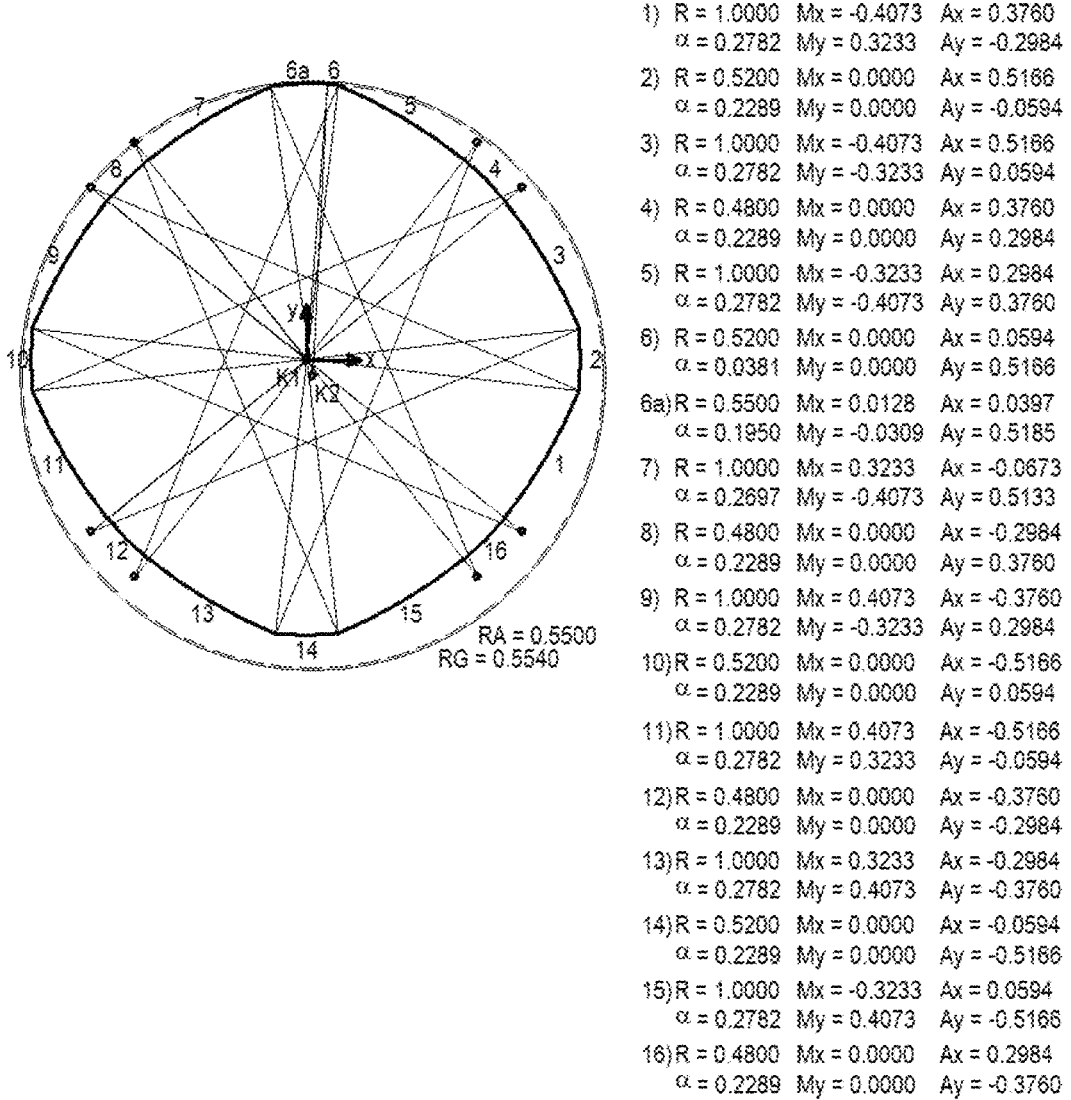
| | | | |
|---|---|---|---|
| 1) | R = 1.0000 | Mx = -0.4073 | Ax = 0.3760 |
| | α = 0.2782 | My = 0.3233 | Ay = -0.2984 |
| 2) | R = 0.5200 | Mx = 0.0000 | Ax = 0.5166 |
| | α = 0.2289 | My = 0.0000 | Ay = -0.0594 |
| 3) | R = 1.0000 | Mx = -0.4073 | Ax = 0.5166 |
| | α = 0.2782 | My = -0.3233 | Ay = 0.0594 |
| 4) | R = 0.4800 | Mx = 0.0000 | Ax = 0.3760 |
| | α = 0.2289 | My = 0.0000 | Ay = 0.2984 |
| 5) | R = 1.0000 | Mx = -0.3233 | Ax = 0.2984 |
| | α = 0.2782 | My = -0.4073 | Ay = 0.3760 |
| 6) | R = 0.5200 | Mx = 0.0000 | Ax = 0.0594 |
| | α = 0.0381 | My = 0.0000 | Ay = 0.5166 |
| 6a) | R = 0.5500 | Mx = 0.0128 | Ax = 0.0397 |
| | α = 0.1950 | My = -0.0309 | Ay = 0.5185 |
| 7) | R = 1.0000 | Mx = 0.3233 | Ax = -0.0673 |
| | α = 0.2697 | My = -0.4073 | Ay = 0.5133 |
| 8) | R = 0.4800 | Mx = 0.0000 | Ax = -0.2984 |
| | α = 0.2289 | My = 0.0000 | Ay = 0.3760 |
| 9) | R = 1.0000 | Mx = 0.4073 | Ax = -0.3760 |
| | α = 0.2782 | My = -0.3233 | Ay = 0.2984 |
| 10) | R = 0.5200 | Mx = 0.0000 | Ax = -0.5166 |
| | α = 0.2289 | My = 0.0000 | Ay = 0.0594 |
| 11) | R = 1.0000 | Mx = 0.4073 | Ax = -0.5166 |
| | α = 0.2782 | My = 0.3233 | Ay = -0.0594 |
| 12) | R = 0.4800 | Mx = 0.0000 | Ax = -0.3760 |
| | α = 0.2289 | My = 0.0000 | Ay = -0.2984 |
| 13) | R = 1.0000 | Mx = 0.3233 | Ax = -0.2984 |
| | α = 0.2782 | My = 0.4073 | Ay = -0.3760 |
| 14) | R = 0.5200 | Mx = 0.0000 | Ax = -0.0594 |
| | α = 0.2289 | My = 0.0000 | Ay = -0.5166 |
| 15) | R = 1.0000 | Mx = -0.3233 | Ax = 0.0594 |
| | α = 0.2782 | My = 0.4073 | Ay = -0.5166 |
| 16) | R = 0.4800 | Mx = 0.0000 | Ax = 0.2984 |
| | α = 0.2289 | My = 0.0000 | Ay = -0.3760 |
Fig. 14b1
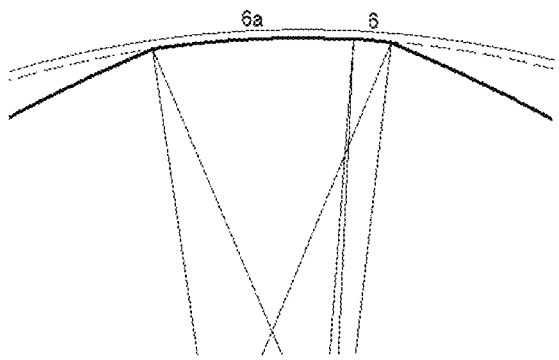
Fig. 14b2

SCREW ELEMENT HAVING AN AXIALLY ASYMMETRICAL SCREW PROFILE WHICH HAS AT LEAST TWO CONSTRUCTION POINTS LOCATED WITHIN THE SCREW PROFILE

CROSS REFERENCE TO RELATED APPLICATIONS

This application is a U.S. national stage application, filed under 35 U.S.C. § 371, of International Application No. PCT/EP2020/054003, which was filed on Feb. 17, 2020, and which claims priority to European Patent Application No. 19159671.7, which was filed on Feb. 27, 2019. The contents of each are hereby incorporated by reference into this specification.

FIELD

The present invention relates to a screw element which has a non-axisymmetric screw cross-sectional profile having at least two construction points which lie within the screw cross-sectional profile. The screw element according to the invention is suitable for being used in an extruder having two drive shafts that rotate in the same direction and at the same speed for the purpose of processing or producing plastic masses in the form of extrudate. The present invention also relates to an arrangement of two identical or different screw elements according to the invention in an extruder having two drive shafts that rotate in the same direction and at the same speed, wherein the screw elements according to the invention are situated opposite one another in pairs on the two drive shafts. The present invention further also relates to an extruder equipped with two identical or different screw elements according to the invention and having two drive shafts that rotate in the same direction and at the same speed, wherein the screw elements according to the invention are situated opposite one another in pairs on the two drive shafts. The present invention moreover relates to the use of the screw element according to the invention for processing or producing plastic masses.

BACKGROUND

In an arrangement of two identical or different screw elements according to the invention in an extruder having two drive shafts that rotate in the same direction and at the same speed, wherein the screw elements according to the invention are situated opposite one another in pairs on the two drive shafts, the screw elements according to the invention that are situated opposite one another in pairs on the two drive shafts partially—but not completely—clean one another.

The screw element according to the invention is also suitable for use in extruders having more than two drive shafts, for example in extruders having more than three or four drive shafts or what are known as annular extruders having eight to sixteen, in particular twelve, drive shafts arranged annularly relative to one another. In this respect, identical or different screw elements according to the invention are arranged opposite one another on the drive shafts in a number that corresponds to the number of drive shafts of the respective extruder.

Even in an arrangement of more than two identical or different screw elements according to the invention in an extruder having more than two drive shafts that rotate in the same direction and at the same speed, wherein the screw elements according to the invention are situated opposite one another in pairs on the more than two drive shafts, the screw elements according to the invention that are situated opposite one another in pairs on the more than two drive shafts partially—but not completely—clean one another.

A screw cross-sectional profile is also referred to below in brief as a screw profile. In the context of the present invention, a construction point is understood to mean a point from which at least one circular arc of the screw profile is constructed and which is the center of this at least one circular arc.

In this context, the center of a circular arc denotes the point that is the center of the circle of which the associated circular arc is a subset.

The term "circular arc" signifies that it is not only a point on the screw profile, but that the circular arc has at least two points which are different from one another and have a non-zero angular interval, wherein all points of a circular arc have the same center and the same radius and a circular arc is that part of the circular line which belongs to a circular sector. The angular interval is also referred to below as the center angle.

The two circular arcs directly adjacent to a particular circular arc are:
on the one hand the circular arc directly preceding the particular circular arc,
on the other hand the circular arc directly following the particular circular arc.

Directly adjacent circular arcs have a common point of contact. If the screw profile can be differentiated at this point of contact, the two circular arcs with this common point of contact have a different radius, since otherwise these two circular arcs with the same radius could be combined to form a larger circular arc. If the screw profile cannot be differentiated at this point of contact, the two circular arcs with this common point of contact have a different radius or the same radius.

A drive shaft of an extruder that is equipped with screw elements, whether they are in accordance with the invention or in accordance with the prior art, is also referred to below as a screw shaft.

Screw elements which are suitable for being used in an extruder having two drive shafts that rotate in the same direction and at the same speed for the purpose of processing or producing plastic masses in the form of extrudate have been known for a long time. For example [1]=Klemens Kohlgraber: Der gleichlaufige Doppelschneckenextruder [The co-rotating twin-screw extruder], Hanser Verlag, Munich, 2007 gives a detailed and good overview of the prior art in relation to such screw elements and extruders. An "extruder" is also referred to below as a "screw machine".

In the case of the screw elements from the prior art, however, problems frequently arising individually or in combination are:
that the mixing action is inadequate,
that a non-uniform distribution of forces occurs between the housing inner wall of the extruder and the flight lands of these screw elements, in particular between the housing inner wall and the screw flight land which is closest to the housing,
that the angle of the screw flight land which is closest to the housing cannot be freely selected,
that a uniform distribution of the extrudate is not guaranteed when the extruder is partially filled, wherein partially filled is understood in particular to mean when in one portion of the extruder the actual throughput of extrudate is lower, preferably at least 10% lower, particularly preferably at least 20% lower, very particularly preferably 25% to 75% lower, than the maximum possible throughput through this portion without a build-up of pressure, and that in the last few years, screw profiles have not been based on standard screw profiles such as the Erdmenger screw profile, as a result of which the construction outlay and manufacturing outlay are increased.

FIG. 5 of U.S. Pat. No. 4,131,371A discloses Erdmenger screw profiles, the centers (83, 83') of which are not identical to the axes of rotation (84, 84') or the housing bores. Such screw profiles are referred to as eccentric. The three-flight Erdmenger screw profiles disclosed in FIG. 5 of U.S. Pat. No. 4,131,371A are positioned eccentrically such that exactly one screw flight land 80 (or 80') forms a symmetric and narrow clearance with respect to the housing inner wall, and the other two flight lands form the same, but significantly larger, clearances with respect to the housing inner wall. A positioning of this kind leads to a non-uniform clearance between the screw flight land 80 (or 80') and the housing, as a result of which a non-uniform distribution of forces occurs.

The two- and three-flight Erdmenger screw profiles also disclosed in U.S. Pat. No. 4,131,371A have only one flight-land tip, that is to say they have a flight-land angle of 0°. Such a flight-land tip is mechanically unstable. Eccentrically positioned two-flight Erdmenger screw profiles having a flight-land angle of greater than 0° would likewise have a non-uniform clearance between the screw flight land and the housing, as a result of which a non-uniform distribution of forces would occur.

EP850738A2 likewise discloses eccentric three-flight screw elements, all of the screw flight lands of which have a flight-land angle of 0° and are therefore mechanically unstable.

DE3412258A1 discloses eccentric three-flight and four-flight screw elements, all of the screw flight lands of which have a flight-land angle of 0° and are therefore mechanically unstable. WO2011116965A1 discloses screw elements in which the center of their cross-sectional profiles is arranged eccentrically offset in relation to the center of the housing bore and the center of rotation of the conveying shafts. The profiles of the screw elements strip one another completely when the screw elements are situated opposite one another on the conveying shafts. With this arrangement, the intention is to improve the product quality and reduce load peaks of the torque on the support shafts, and thus essentially improve the cost-effectiveness of the extruder. It is also the case here that this positioning—analogously to U.S. Pat. No. 4,131,371A—leads to a non-uniform clearance between the screw flight land and the housing, as a result of which a non-uniform distribution of forces occurs. Moreover, the fact that the screw elements are unrestrictedly self-cleaning results in a relatively poor mass transfer, i.e. only an inadequate mixing action is achieved.

WO2011006516A1 discloses screw elements having at least two flights and in which a first flight land cleans the inner wall of an extruder housing with a small clearance and a second flight land cleans the inner wall of an extruder housing with a larger clearance. With this arrangement, the intention is to provide an unrestrictedly self-cleaning multi-screw extruder by means of which the product quality is improved significantly and effectively. Since the screw elements are unrestrictedly self-cleaning, the result is a relatively poor mass transfer, i.e. only an inadequate mixing action is achieved.

Consequently, even with the screw elements according to WO2011116965A1 or WO2011006516A1, it is not possible to solve the above-mentioned problems in a satisfactory manner.

What is explained above for WO2011006516A1 applies equally to EP0002131A1 and EP0788868A1.

FIGS. 6 to 8 of DE19718292A1 disclose two-flight screw elements, the flight lands of which have a radius which deviates from the radius of the housing inner wall by considerably more than the housing clearance. This configuration also—analogously to U.S. Pat. No. 4,131,371A—leads to a non-uniform clearance between the screw flight land and the housing, as a result of which a non-uniform distribution of forces occurs. For the screw element disclosed in FIG. 9 of DE19718292A1, the same applies as explained above for WO2011006516A1. In FIG. 7 of DE19718292A1, the flight land has a flight-land angle of 0°. As already explained further above, such a flight-land tip is mechanically unstable.

It is therefore an object of the present invention to provide a screw element by means of which the above-mentioned problems can be solved.

In particular, it is an object of the present invention to provide a screw element which makes it possible to improve the mixing action,
to ensure a uniform distribution of forces between the flight land or the flight lands of the screw element and the housing inner wall of the extruder,
to treat the extrudate more gently,
to ensure a uniform distribution of the extrudate when the extruder is partially filled, when this screw element is used in an extruder having two or more drive shafts. In this context, the flight land or the flight lands of the screw element according to the invention should be mechanically stable.

SUMMARY

The object is achieved by a screw element having the features of the main claim.

In particular, the object is achieved by:

a screw element having a number of grooves Z,
suitable for a twin-shaft screw machine
having two screw shafts SW1 and SW2 that rotate in the same direction and at the same speed, the axes of rotation D1 and D2 of which are at an axial distance a and having two circular housing bores which penetrate one another, each of which has an identical housing inner radius rg and the bore centers M1 and M2 of which are at a distance which is the same as the axial distance a, and the bore centers M1 and M2 of which coincide with the centers of the cross sections of the respective axes of rotation D1 and D2 of the screw shafts SW1 and SW2, wherein the screw element has a screw profile which:

(1) forms a closed convex line,
(2) is composed only of circular arcs the radius of which is less than or equal to the axial distance a, wherein directly adjacent circular arcs have a different radius,
(3) has a first construction point K1 which lies within the screw profile,
(4) is not axisymmetric in relation to the construction point K1,
(5) is composed of at least 4, preferably of 4 to 25, particularly preferably of 4 to 17 circular arcs,
(6) has a second construction point K2 which does not coincide with the construction point K1, wherein the construction point K2 lies within the screw profile, (7) is not point-symmetric or axisymmetric in relation to the construction point K2,
(8) has a point of rotation DP which coincides with one of the bore centers M1 or M2 and which lies on a path from the construction point K1 to the construction point K2,
(9) has exactly one main flight land HK, wherein the main flight land HK is formed from only one circular arc and the center of this circular arc is the construction point K2, and wherein the main flight land HK and the points of contact of the two circular arcs directly adjacent to the main flight land HK is the set of points of the screw profile that are furthest away from the construction point K2,
(10) has at least one groove, wherein one groove is formed from only one circular arc the center of which is the construction point K1, and one groove is a circular arc the radius of which is the same as the core radius ri, and wherein the two circular arcs respectively directly adjacent to one groove, apart from the respective common point of contact, have a greater distance from the construction point K1 than the circular arc of this groove,
(11) has a plurality of flanks, wherein flanks are those regions of the screw profile the circular arcs of which have a center which is neither the construction point K1 nor the construction point K2,
(12) a groove is separated from the closest point of the main flight land HK by at least one circular arc, which is a flank.

The number of grooves Z is understood here to mean the number of grooves in the screw profile. The number of grooves Z is a whole natural number greater than or equal to 1. The number of grooves Z is preferably a whole natural number from 1 to 4, and a number of grooves 2 is particularly preferred.

According to the invention, preferably the screw profile according to the invention is not point-symmetric or is point-symmetric in relation to the construction point K1, preferably the screw profile according to the invention is not point-symmetric in relation to the construction point K1.

The circular arc which forms the main flight land HK preferably has a center angle which is greater than 0°, preferably the circular arc which forms a main flight land HK has a center angle of 1° to 179°. As a result, the main flight land HK, which is generally exposed to the greatest mechanical loads when a screw element is used as intended, has high mechanical stability in comparison with the prior art.

According to the invention, the number of circular arcs of the screw profile according to the invention is preferably equal to the number of grooves Z multiplied by 4 or equal to the number of grooves multiplied by 4 and then increased by 1, that is to say that the screw profile according to the invention at a number of grooves Z=1 is preferably composed of exactly 4 circular arcs or exactly 5 circular arcs, particularly preferably of exactly 5 circular arcs,
at a number of grooves Z=2 is preferably composed of exactly 8 circular arcs or exactly 9 circular arcs, particularly preferably of exactly 9 circular arcs,
at a number of grooves Z=3 is preferably composed of exactly 12 circular arcs or exactly 13 circular arcs, particularly preferably of exactly 13 circular arcs,
at a number of grooves Z=4 is preferably composed of exactly 16 circular arcs or exactly 17 circular arcs, particularly preferably of exactly 17 circular arcs.

According to the invention, the second construction point K2 of the screw profile according to the invention preferably lies within a circle having the construction point K1 as the center and the core radius ri as the radius, wherein the core radius ri is the radius that corresponds to the smallest distance from the construction point K1 and a point on the screw profile.

According to the invention, the second construction point K2 of the screw profile according to the invention particularly preferably lies within a circle having the construction point K1 as the center and a radius that is a maximum of 30%, very particularly preferably a maximum of 20%, of the core radius ri.

This achieves the situation in which the screw element, when being used as intended, has high mechanical stability in comparison with the prior art. This also makes it possible to treat the extrudate more gently in comparison with the prior art.

The point of rotation DP of the screw element according to the invention preferably lies closer to the construction point K2 than to the construction point K1, particularly preferably the point of rotation DP lies on the construction point K2.

The radius rHK of the circular arc of the main flight land HK preferably corresponds to the housing inner radius rg reduced by the main flight-land clearance c_HK. The main flight-land clearance c_HK is in this case greater than 0. The main flight-land clearance c_HK here is preferably 0.1% to 3.2%, preferably 0.2% to 2.6%, particularly preferably 0.3% to 2.0%, very particularly preferably approximately 0.8% to 1.4%, of the housing inner radius rg. The main flight-land clearance c_HK is particularly preferably constant over the entire main flight land HK; in this way, a shear gap with a constant distance between the main flight land HK and the housing inner wall is formed.

The circular arcs forming the grooves preferably have,
at a number of grooves Z=1, a center angle of 90° to 150°, preferably of 95° to 140°, particularly preferably of 100° to 130°,
at a number of grooves Z=2, respectively a center angle of 5° to 50°, preferably of 10° to 40°, particularly preferably of 15° to 30°, wherein the center angles of the grooves may be the same or different but are preferably the same,
at a number of grooves Z=3, respectively a center angle of 3° to 30°, preferably of 6° to 24°, particularly preferably of 9° to 18°, wherein the center angles of the grooves may be the same or different but are preferably the same,
at a number of grooves Z=4, respectively a center angle of 2° to 20°, preferably of 4° to 16°, particularly preferably of 6° to 12°, wherein the center angles of the grooves may be the same or different but are preferably the same.

The screw profile according to the invention may have a third construction point K3, wherein the screw profile is not axisymmetric or point-symmetric in relation to the construction point K3, wherein the construction point K3 is a point which has the same distance to the construction point K1 as the construction point K2, and wherein the construction points K1, K2 and K3 lie on a straight line and K1, K2 and K3 are not identical.

The screw profile according to the invention may have a secondary flight land or a plurality of secondary flight lands $NK_i = NK_1$ to $NK_n$, wherein each secondary flight land $NK_i$ is formed from only one circular arc, the center of which is the construction point K1 or the construction point K2 or the construction point K3. The subscripts i and n represent whole positive numbers. The index n specifies the number of secondary flight lands $NK_1$ to $NK_n$. The number n of secondary flight lands $NK_1$ to $NK_n$ is preferably equal to the number of grooves Z.

If the screw profile according to the invention has at least one secondary flight land $NK_i$, a groove is separated from the closest point of this secondary flight land $NK_i$ by at least one circular arc, which is a flank. Since a groove—as already explained above—is separated from the closest point of the main flight land HK by at least one circular arc, which is a flank, it holds true that if the screw profile according to the invention has at least one secondary flight land $NK_i$, a groove is not only separated from the closest point of the main flight land HK by at least one circular arc, which is a flank, but is also separated from the closest point of this secondary flight land $NK_i$ by at least one circular arc, which is a flank.

A circular arc which forms a secondary flight land $NK_i$ preferably has a center angle which is greater than 0°, a circular arc which forms a secondary flight land $NK_i$ preferably has a center angle of 1° to 179°. As a result, a secondary flight land $NK_i$— which is generally exposed, after the main flight land HK, to the greatest mechanical loads when a screw element is used as intended—has high mechanical stability in comparison with the prior art.

A circular arc which forms a secondary flight land $NK_i$ and in which neither of the two directly adjacent circular arcs is the main flight land HK in this case particularly preferably has,
    at a number of grooves Z=2, a center angle of 5° to 50°, preferably of 10° to 40°, particularly preferably of 15° to 30°,
    at a number of grooves Z=3, a center angle of 3° to 30°, preferably of 6° to 24°, particularly preferably of 9° to 18°,
    at a number of grooves Z=4, a center angle of 2° to 20°, preferably of 4° to 16°, particularly preferably of 6° to 12°,
    wherein, in the case of a plurality of secondary flight lands $NK_1$ to $NK_n$, the center angles of the secondary flight lands $NK_1$ to $NK_n$ may be the same or different.

A circular arc which forms a secondary flight land $NK_i$ and in which one of the two directly adjacent circular arcs is the main flight land HK in this case particularly preferably has,
    at a number of grooves Z=1, a center angle of greater than 0° to 140°, preferably of 5° to 110°, particularly preferably of greater than 10° to 80°,
    at a number of grooves Z=2, respectively a center angle of greater than 0° to 45°, preferably of 5° to 30°, particularly preferably of greater than 10° to 15°,
    at a number of grooves Z=3, respectively a center angle of greater than 0° to 27°, preferably of 2° to 18°, particularly preferably of 4° to 9°,
    at a number of grooves Z=4, respectively a center angle of greater than 0° to 18°, preferably of 1° to 12°, particularly preferably of 2° to 6°,
    wherein, in the case of a plurality of secondary flight lands $NK_1$ to $NK_n$, the center angles of the secondary flight lands $NK_1$ to $NK_n$ may be the same or different.

For the one secondary flight land or the plurality of secondary flight lands $NK_i=NK_1$ to $NK_n$, which may have the screw profile according to the invention, it moreover holds true that
    the two circular arcs respectively directly adjacent to one secondary flight land $NK_i$, except for the respective common point of contact with the secondary flight land $NK_i$, have a smaller distance to the construction point K1 when the center of the circular arc which forms the secondary flight land $NK_i$ is the construction point K1, or have a smaller distance to the construction point K2 when the center of the circular arc which forms the secondary flight land $NK_i$ is the construction point K2, or have a smaller distance to the construction point K3 when the center of the circular arc which forms the secondary flight land $NK_i$ is the construction point K3,
    the circular arc which forms a secondary flight land $NK_i$ has a smaller distance to the construction point K2 than the main flight land HK when the center of the circular arc which forms the secondary flight land $NK_i$ is the construction point K2.

The circular arc which forms the main flight land HK preferably makes contact with a circular arc which forms a secondary flight land $NK_i$, wherein the circular arc of the secondary flight land $NK_i$ has the construction point K1 as the center and the radius rNK of which corresponds to the housing inner radius rg reduced by the secondary flight-land clearance c_NK.

The circular arc which forms the main flight land HK and in which neither of the two directly adjacent circular arcs is a secondary flight land $NK_i$ preferably has,
    at a number of grooves Z=1, a center angle of 90° to 150°, preferably of 95° to 140°, particularly preferably of 100° to 130°,
    at a number of grooves Z=2, a center angle of 5° to 50°, preferably of 10° to 40°, particularly preferably of 15° to 30°,
    at a number of grooves Z=3, a center angle of 3° to 30°, preferably of 6° to 24°, particularly preferably of 9° to 18°,
    at a number of grooves Z=4, a center angle of 2° to 20°, preferably of 4° to 16°, particularly preferably of 6° to 12°.

The circular arc which forms the main flight land HK and in which one of the two directly adjacent circular arcs is a secondary flight land $NK_i$ preferably has,
    at a number of grooves Z=1, a center angle of 10° to 150°, preferably of 30° to 140°, particularly preferably of 50° to 130°,
    at a number of grooves Z=2, a center angle of 5° to 50°, preferably of 10° to 40°, particularly preferably of 15° to 30°,
    at a number of grooves Z=3, a center angle of 3° to 30°, preferably of 6° to 24°, particularly preferably of 9° to 18°,
    at a number of grooves Z=4, a center angle of 2° to 20°, preferably of 4° to 16°, particularly preferably of 6° to 12°.

In particular, the two inner angles between the circular arc of the main flight land HK and both the circular arc that directly precedes the circular arc of the main flight land HK and has a common point of contact with the circular arc of the main flight land HK and also the circular arc that directly follows the circular arc of the main flight land HK and has a common point of contact with the circular arc of the main flight land HK are from 130° to 180°, preferably from 135° to 180°, particularly preferably from 140 to 180°. In this respect, these two inner angles may be the same or different; preferably they are different.

In the context of the present invention, an inner angle between two directly adjacent circular arcs is the angle, lying within the screw profile, between the tangents of the relevant circular arcs, wherein the tangents run through the common point of contact of the relevant circular arcs.

Furthermore, in particular, the two inner angles between a circular arc of a secondary flight land $NK_i$ and both the circular arc that directly precedes the circular arc of a secondary flight land $NK_i$ and has a common point of contact with the circular arc of a secondary flight land $NK_i$ and also the circular arc that directly follows the circular arc of a secondary flight land $NK_i$ and has a common point of contact with the circular arc of a secondary flight land $NK_i$ are from 130° to 180°, preferably from 135° to 180°, particularly preferably from 140 to 180°. In this respect, these two inner angles may be the same or different.

Most particularly, all of the inner angles between two directly adjacent circular arcs of the screw profile according to the invention are from 130° to 180°, preferably from 135° to 180°, particularly preferably from 140 to 180°.

This additionally achieves the situation in which the screw element, when used as intended, has high mechanical stability in comparison with the prior art. This also makes it possible to treat the extrudate more gently in comparison with the prior art.

A flank preferably has a radius which corresponds to the axial distance a. Further preferably, a circular arc which forms a flank has a center that is neither the construction point K1 nor the construction point K2 nor the construction point K3.

Further preferably, the distance from the construction point K1 to the construction point K2 is 0.2% to 20%, preferably 0.4% to 15%, particularly preferably 0.6% to 10%, very particularly preferably 0.8% to 5%, of the housing inner radius rg.

Further preferably, in the case of the screw profile according to the invention, at a number of grooves Z=1, the smaller angle between the angle bisector of the groove and of the connecting line between K1 and K2 is from 0° to 90°, preferably from 45° to 70° and particularly preferably approximately 55°, at a number of grooves Z=2, the smaller angle between the angle bisector of the groove, the circular arc point of which that lies on the angle bisector of the groove is separated from the closest point of the main flight land HK by the smaller curve length, and the connecting line between K1 and K2 is from 110° to 160°, preferably from 125° to 1450 and particularly preferably approximately 135°, at a number of grooves Z=3, the smaller angle between the angle bisector of the groove, the circular arc point of which that lies on the angle bisector of the groove is separated from the closest point of the main flight land HK by the smaller curve length, and the connecting line between K1 and K2 is from 130° to 170°, preferably from 140° to 160° and particularly preferably approximately 150°, at a number of grooves Z=4, the smaller angle between the angle bisector of the groove, the circular arc point of which that lies on the angle bisector of the groove is separated from the closest point of the main flight land HK by the smaller curve length, and the connecting line between K1 and K2 is from 140° to 175°, preferably from 150° to 165° and particularly preferably approximately 157.5°.

From the above it follows that the distance of the main flight land HK from the construction point K1 at each point of the main flight land HK is greater than the core radius and therefore this distance is also greater than the distance between a groove and the construction point K1, the distance of the main flight land HK from the construction point K2 at each point of the main flight land HK is the same as or smaller than the housing inner radius rg, the distance of each secondary flight land $NK_i$ from the construction point K1 at each point of the relevant secondary flight land $NK_i$ is greater than the core radius and therefore this distance is also greater than the distance between a groove and the construction point K1, a main flight land HK and a secondary flight land $NK_i$ lie directly next to one another and may have a common point of contact.

The screw element according to the invention makes it possible to improve the mixing action, to ensure a uniform distribution of forces between the flight land or the flight lands of the screw element and the housing inner wall of the extruder, to treat the extrudate more gently, to ensure a uniform distribution of the extrudate when the extruder is partially filled, when this screw element is used in an extruder having two or more drive shafts. In this case, the screw element, in particular the main flight land HK and—if present—the secondary flight land $NK_1$ or the secondary flight lands $NK_1$ to $NK_n$, most particularly the main flight land HK, has high mechanical stability in comparison with the prior art.

This is surprising, because—as already stated above—in the case of an arrangement of two identical or different screw elements according to the invention in an extruder having two drive shafts that rotate in the same direction and at the same speed, wherein the screw elements according to the invention are situated opposite one another in pairs on the two drive shafts, the screw elements according to the invention that are situated opposite one another in pairs on the two drive shafts only partially—but not completely—clean one another. The same applies analogously—as already stated above—for an arrangement of more than two identical or different screw elements according to the invention in an extruder having more than two drive shafts that rotate in the same direction and at the same speed, wherein the screw elements according to the invention are respectively situated opposite one another in pairs on the more than two drive shafts.

Up until now, it has been assumed that screw elements that clean one another completely are necessary to achieve the object.

However, it has surprisingly been found that, by means of the screw elements according to the invention, a better mixing action by virtue of the extrudate flowing back into the regions of the screw elements that are not self-cleaning, a uniform distribution of forces by virtue of a shear gap with a constant distance between the main flight land HK and the housing inner wall, and a more uniform distribution of plastic mass in the case of a partial fill by virtue of the extrudate flowing back in the regions of the screw elements that are not self-cleaning are achieved. This additionally makes it possible to treat the extrudate more gently in comparison with the prior art.

When being used in a screw machine, the main flight land HK of a screw element according to the invention shortens the flow channels that form in such a way that a uniform flow gap is formed along the housing wall. This results in the uniform distribution of forces.

The screw element according to the invention is suitable for being arranged and operated in pairs in a screw machine having two drive shafts that rotate in the same direction and at the same speed and have another screw element according to the invention with the same or a different screw profile and the same or a different arrangement of the point of rotation on the other screw shaft, wherein preferably screw elements according to the invention that have the same screw profile are used. The screw element according to the invention is analogously also suitable for use in screw machines having more than two drive shafts that rotate in the same direction and at the same speed.

The screw element according to the invention may be in the form of a conveying, kneading or mixing element, preferably a conveying element or kneading element.

The present invention therefore also relates to an arrangement of two identical or different screw elements according to the invention in a screw machine having two drive shafts that rotate in the same direction and at the same speed, wherein the screw elements according to the invention are situated opposite one another in pairs on the two drive shafts. Correspondingly, the present invention therefore also relates to an arrangement of more than two identical or different screw elements according to the invention in a screw machine having more than two drive shafts that rotate in the same direction and at the same speed, wherein the screw elements according to the invention are respectively situated opposite one another in pairs on the more than two drive shafts.

The present invention further also relates to a screw machine equipped with two identical or different screw elements according to the invention and having two drive shafts that rotate in the same direction and at the same speed, wherein the screw elements according to the invention are situated opposite one another in pairs on the two drive shafts. Correspondingly, the present invention therefore also relates to a screw machine equipped with more than two identical or different screw elements according to the invention and having more than two drive shafts that rotate in the same direction and at the same speed, wherein the screw elements according to the invention are respectively situated opposite one another in pairs on the more than two drive shafts.

The screw profile according to the invention may be constructed in a simple manner from a reference screw profile; this reference screw profile is preferably a screw profile from the prior art, particularly preferably what is known as an Erdmenger profile, see [1], pages 249 to 253.

In this respect, it holds true
that the core radius ri, the number of grooves Z and the outer radius ra of the screw profile according to the invention correspond to the core radius ri, the number of grooves Z and the outer radius ra of the reference screw profile
and
the construction point K1 of the screw profile according to the invention is the same as the construction point K1 of the reference screw profile,
wherein the outer radius of the reference screw profile rfra is smaller than the housing inner radius rg by 0.2% to 10%, preferably 0.4% to 7.5%, particularly preferably 0.6% to 5%, very particularly preferably 0.8% to 2.5%,
wherein two similar ones of the reference screw profiles precisely clean one another in pairs,
if the ones of the reference screw profiles are at a reference distance rfa which corresponds to the axial distance a, and
if the reference screw profiles rotate in their respective reference points of rotation, reference point of rotation 1 (rfDP1) and reference point of rotation 2 (rfDP2), at the same speed with the same direction of rotation.

Into such a reference screw profile is then inserted a second construction point K2—as explained above—and if appropriate—as likewise explained above—also inserted is a third construction point K3. Proceeding from this construction point K2, and if present also proceeding from the construction point K3, at least one further circular arc is inserted into the screw profile, wherein this at least one further circular arc intersects at least one circular arc already present in the reference screw profile, and the parts of the at least one already present circular arc that have been "cut off" by the at least one further circular arc are replaced by the at least one further circular arc.

The present invention moreover relates to the use of the screw element according to the invention for processing or producing plastic masses.

In the context of the present invention, plastic masses are understood to mean: Suspensions, pastes, glass melts, unfired ceramics, metal melts, plastics, plastic melts or solutions, polymer melts or solutions, elastomers, rubber melts or solutions.

Preference is given to using plastics, polymer solutions or polymer melts, particularly preferably thermoplastic polymers. The thermoplastic polymer used is preferably at least one from the group of polycarbonate, polyamide, polyester, in particular polybutylene terephthalate and polyethylene terephthalate, polylactide, polyether, thermoplastic polyurethane, polyacetal, fluoropolymer, in particular polyvinylidene fluoride, polyether sulfones, polyolefin, in particular polyethylene and polypropylene, polyimide, polyacrylate, in particular poly(methyl)methacrylate, polyphenylene oxide, polyphenylene sulfide, polyetherketone, polyaryletherketone, styrene polymers, in particular polystyrene, styrene copolymers, in particular styrene-acrylonitrile copolymer, acrylonitrile-butadiene-styrene block copolymers and polyvinyl chloride. Similarly preferably used are what are known as blends of the polymers listed, which a person skilled in the art understands to be a combination of two or more polymers. Particularly preferred are polycarbonate and mixtures containing polycarbonate, very particularly preferably polycarbonate, which are obtained, for example, by the interfacial process or the melt transesterification process.

Other preferred feed materials are rubbers. The rubber used is preferably at least one from the group of styrene-butadiene rubber, natural rubber, butatidene rubber, isoprene rubber, ethylene-propylenediene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta-percha, arylate rubber, fluorinated rubber, silicone rubber, sulfide rubber and chlorosulfonyl polyethylene rubber. A combination of two or more of the rubbers listed, or a combination of one or more rubbers with one or more plastics, is of course also possible.

These thermoplastics and elastomers may be used in pure form or as mixtures with fillers and reinforcers, such as in particular glass fibers, as mixtures with one another or with other polymers, or as mixtures with customary polymer additives.

In a preferred embodiment, additives are added to the plastic masses, in particular to the polymer melts and mixtures of polymer melts. Said additives may be added to the extruder in solid, liquid or solution form together with the polymer, or else at least some or all of the additives are fed to the extruder via a side stream.

Additives can provide a polymer with a wide variety of properties. Said additives may be, for example, colorants, pigments, processing aids, fillers, antioxidants, reinforcers, UV absorbers and light stabilizers, metal deactivators, peroxide scavengers, basic stabilizers, nucleating agents, benzofurans and indolinones which have a stabilizing or antioxidant action, mold release agents, flame retardant additives, antistatic agents, dyes and melt stabilizers. Examples of these are carbon black, glass fibers, clay, mica, graphite fibers, titanium dioxide, carbon fibers, carbon nanotubes, ionic liquids and natural fibers.

BRIEF DESCRIPTION OF THE DRAWINGS

The invention will be explained in more detail and by way of example below with reference to the figures, but without being restricted thereto. All of the figures were created using a computer program.

For the purpose of creating or describing screw profiles or elements, it is expedient to use dimensionless characteristics in order to simplify the transferability to different sizes of screw elements or extruders. Suitable as a reference variable for geometric variables such as, for example, lengths, radii or clearances, is the axial distance a, since this variable on an extruder cannot be changed. For the dimensionless axial distance A, it holds true that $A=a/a=1$. The dimensionless housing inner radius RG is calculated as $RG=rg/a$, where rg is the housing inner radius. For the dimensionless screw outer radius RA of a screw profile, it follows that $RA=ra/a$, where ra is the screw outer radius. The dimensionless core radius RI of a screw profile is calculated as $RI=ri/a$, where ri is the core radius. The dimensionless clearance C between a screw flight land and the housing is calculated as $C=c/a$, where c is the clearance of a screw flight land with respect to the housing. The corresponding dimensionless clearance of the main flight land HK is denoted by C_HK and the corresponding dimensionless clearance of a secondary flight land $NK_i$ is denoted by C_NK. For a dimensionless radius R, it correspondingly holds true that $R=r/a$.

In the figures, all geometric variables on the right alongside the respective figure are used in their dimensionless form. All angles are reported in radians or degrees.

FIG. 1a shows a screw profile having a number of grooves Z=1 according to the prior art, and FIG. 1b shows the screw profile of FIG. 1a in an eccentric displacement.

In the context of the present invention, in an eccentric displacement is understood to mean that the construction point K1 of a screw profile does not lie in the point of rotation. The construction point K1 is the point which is the center of the circular arc or the circular arcs which forms a groove or form the grooves.

Figure 2A:
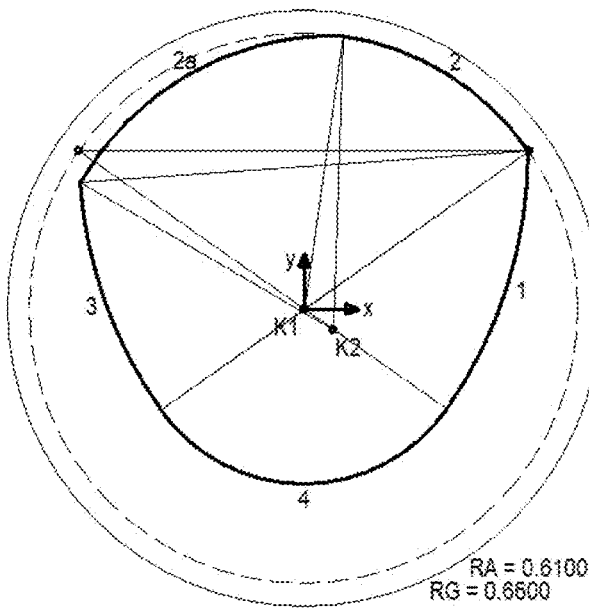
Figure 2B:
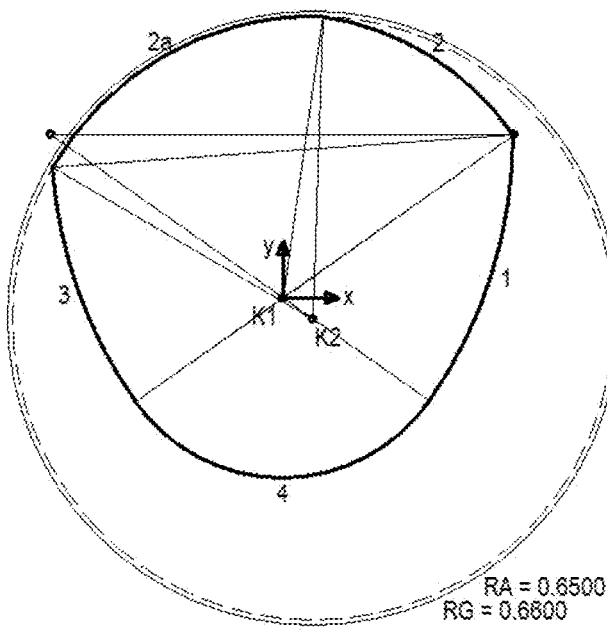

FIG. 2a shows a screw profile according to the invention having a number of grooves Z=1 and FIG. 2b shows the screw profile of FIG. 2a in an eccentric displacement.

Figure 3A:
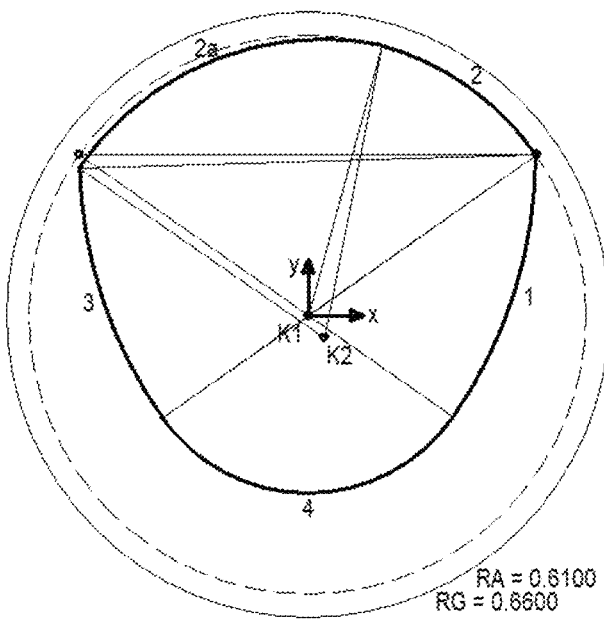
Figure 3B:
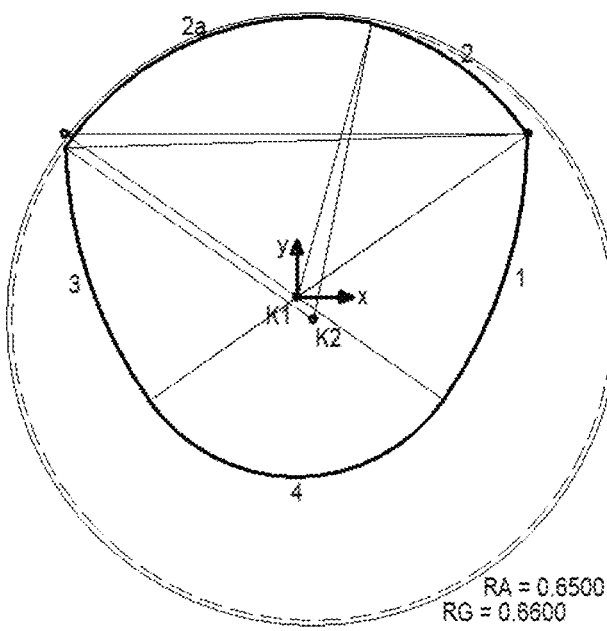

FIG. 3a shows a further screw profile according to the invention having a number of grooves Z=1 and FIG. 3b shows the screw profile of FIG. 3a in an eccentric displacement.

Figure 4A:
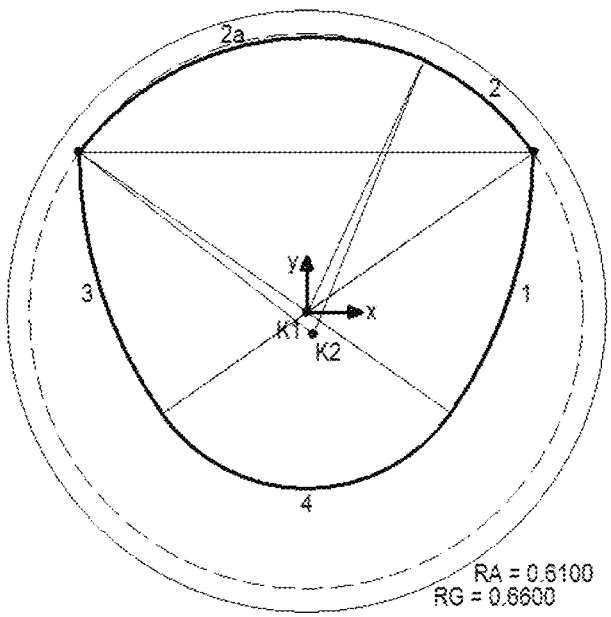
Figure 4B:
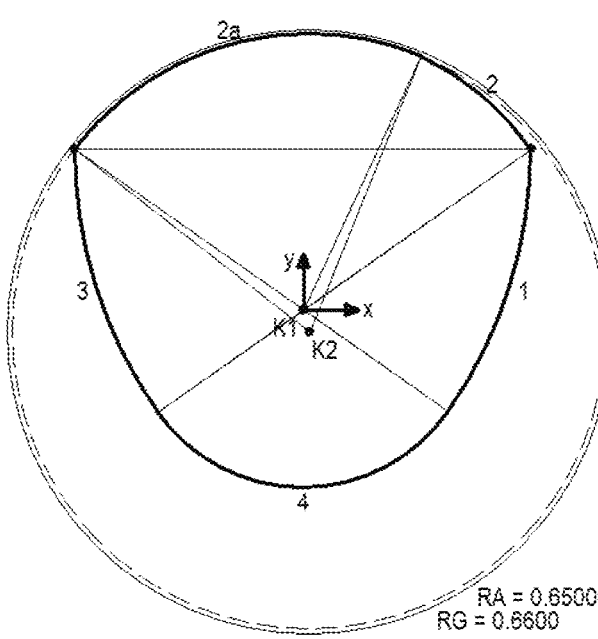

FIG. 4a shows a further screw profile according to the invention having a number of grooves Z=1 and FIG. 4b shows the screw profile of FIG. 4a in an eccentric displacement.

FIG. 5a shows a screw profile having a number of grooves Z=2 according to the prior art, and FIG. 5b shows the screw profile of FIG. 5a in an eccentric displacement.

Figure 6A:
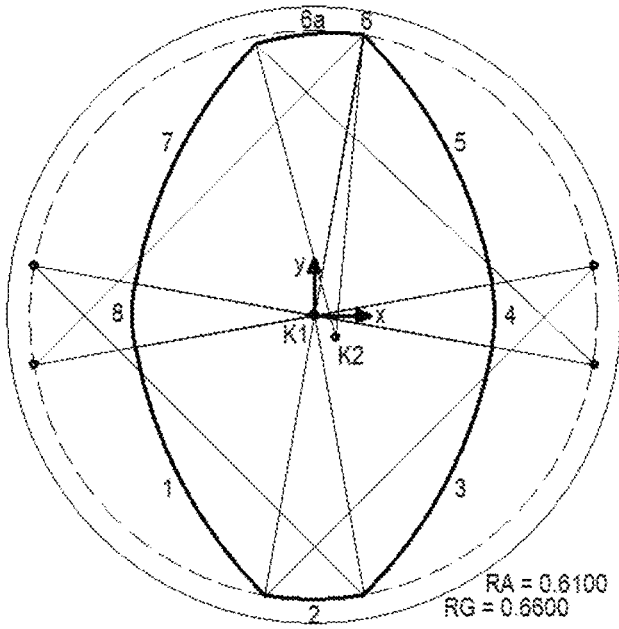
Figure 6B:
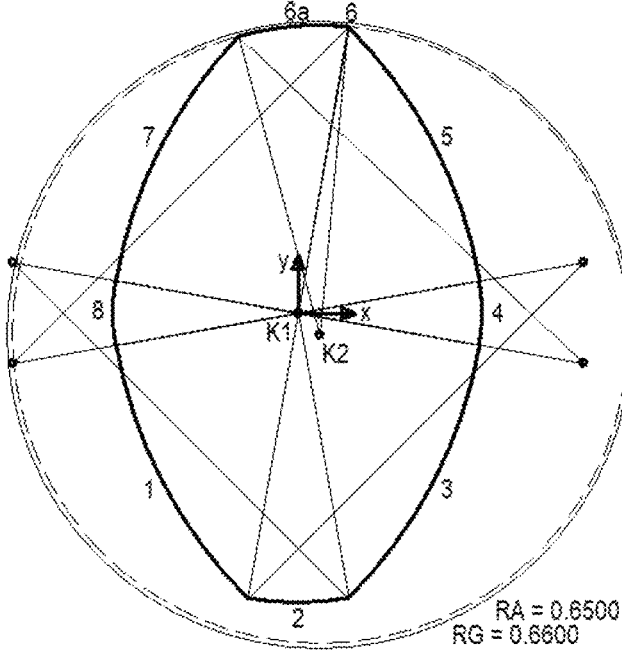

FIG. 6a shows a screw profile according to the invention having a number of grooves Z=2 and FIG. 6b shows the screw profile of FIG. 6a in an eccentric displacement.

Figure 7A:
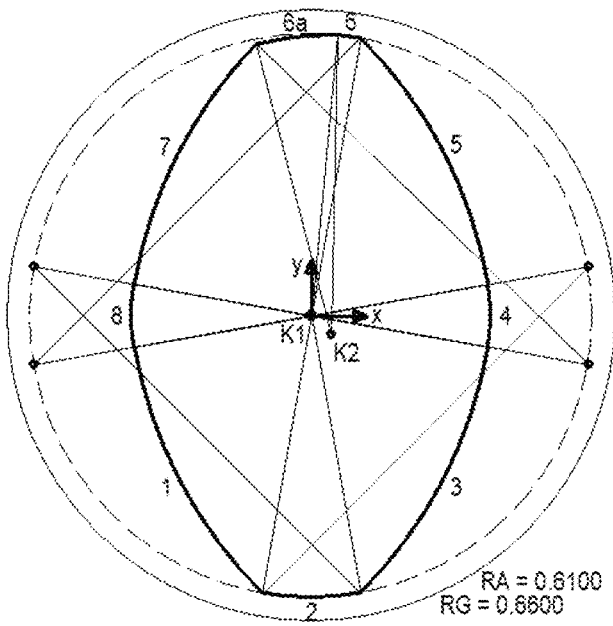
Figure 7B:
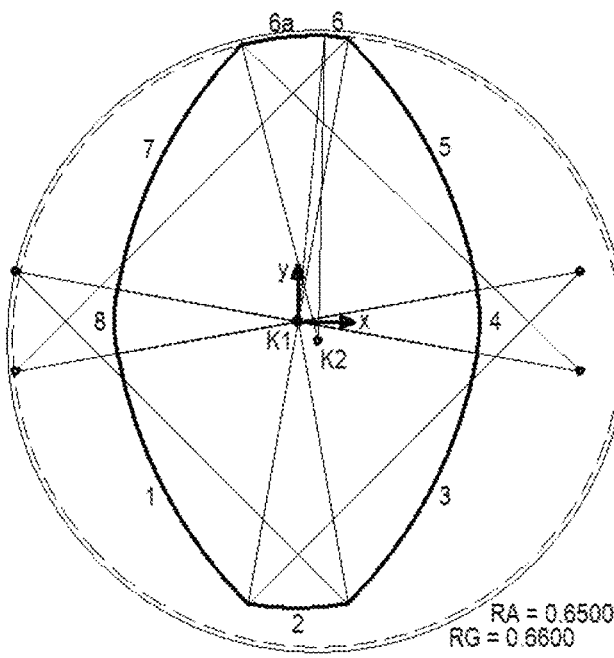

FIG. 7a shows a further screw profile according to the invention having a number of grooves Z=2 and FIG. 7b shows the screw profile of FIG. 7a in an eccentric displacement.

Figure 8A:
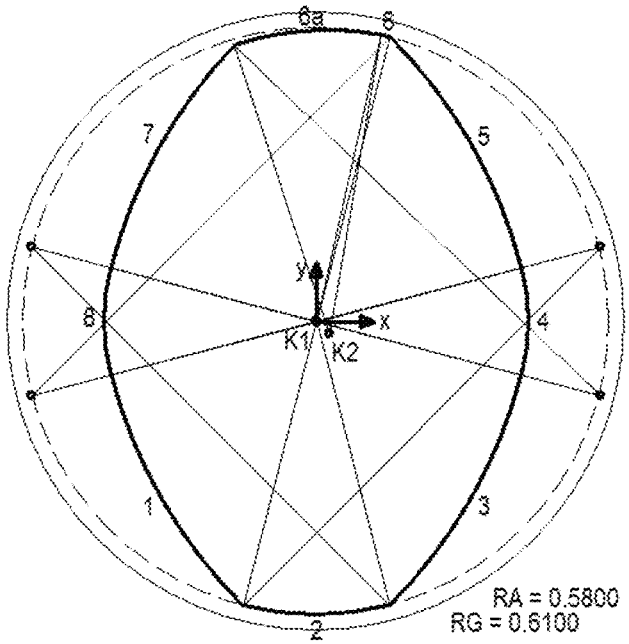
Figure 8B:
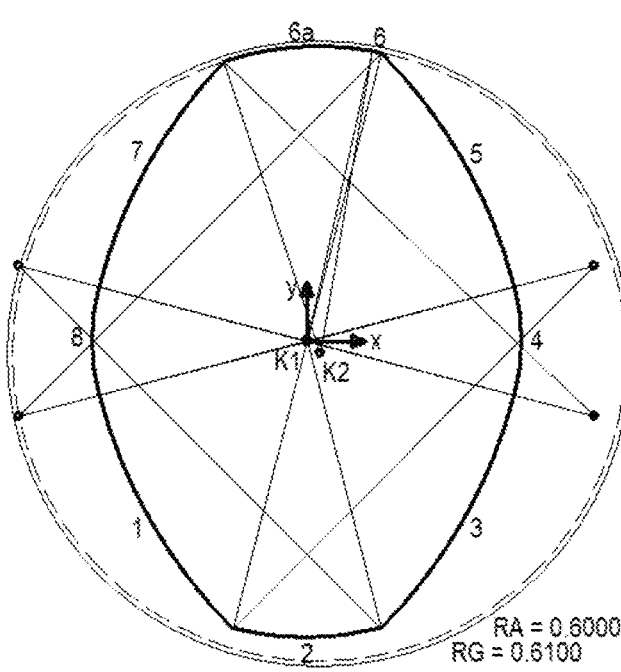

FIG. 8a shows a further screw profile according to the invention having a number of grooves Z=2 and FIG. 8b shows the screw profile of FIG. 8a in an eccentric displacement.

Figure 9A:
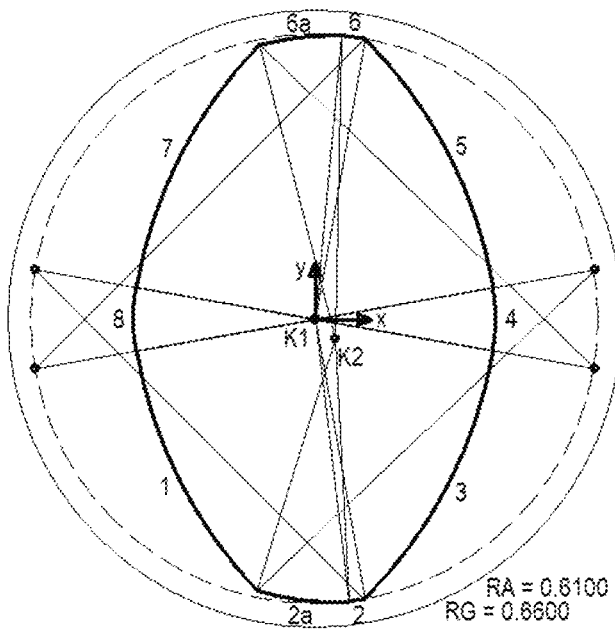
Figure 9B:
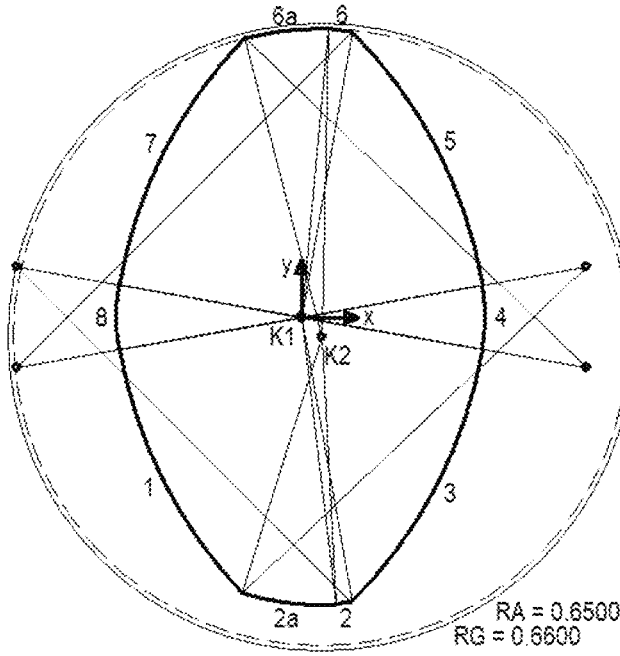

FIG. 9a shows a further screw profile according to the invention having a number of grooves Z=2 and FIG. 9b shows the screw profile of FIG. 9a in an eccentric displacement.

FIG. 10a shows a further screw profile according to the invention having a number of grooves Z=2 and FIG. 10b shows the screw profile of FIG. 10a in an eccentric displacement.

FIG. 11a1 shows a screw profile having a number of grooves Z=3 according to the prior art, FIG. 11a2 shows an enlargement of a detail around a screw flight land (circular arc 6) of FIG. 11a1, FIG. 11b1 shows the screw profile from FIG. 11a1 in an eccentric displacement and FIG. 11b2 shows an enlargement of a detail around a screw flight land (circular arc 6) of FIG. 11b1.

FIG. 12a1 shows a screw profile according to the invention having a number of grooves Z=3, FIG. 12a2 shows an enlargement of a detail around the main flight land HK (circular arc 6a) and a secondary flight land $NK_i$ (circular arc 6) of FIG. 12a1, FIG. 12b1 shows the screw profile of FIG. 12a in an eccentric displacement and FIG. 12b2 shows an enlargement of a detail around the main flight land HK (circular arc 6a) and a secondary flight land $NK_i$ (circular arc 6) of FIG. 12b1.

FIG. 13a1 shows a screw profile having a number of grooves Z=4 according to the prior art, FIG. 13a2 shows an enlargement of a detail around the screw flight land (circular arc 6) and FIG. 13b1 shows the screw profile of FIG. 13a1 in an eccentric displacement and FIG. 13b2 shows an enlargement of a detail around a screw flight land (circular arc 6) of FIG. 13b1.

FIG. 14a1 shows a screw profile according to the invention having a number of grooves Z=4, FIG. 14a2 shows an enlargement of a detail around the main flight land HK (circular arc 6a) and a secondary flight land $NK_i$ (circular arc 6) of FIG. 14a1, FIG. 14b1 shows the screw profile of FIG. 14a1 in an eccentric displacement and FIG. 14b2 shows an enlargement of a detail around the main flight land HK (circular arc 6a) and a secondary flight land $NK_i$ (circular arc 6) of FIG. 14b1.

Figure 15:
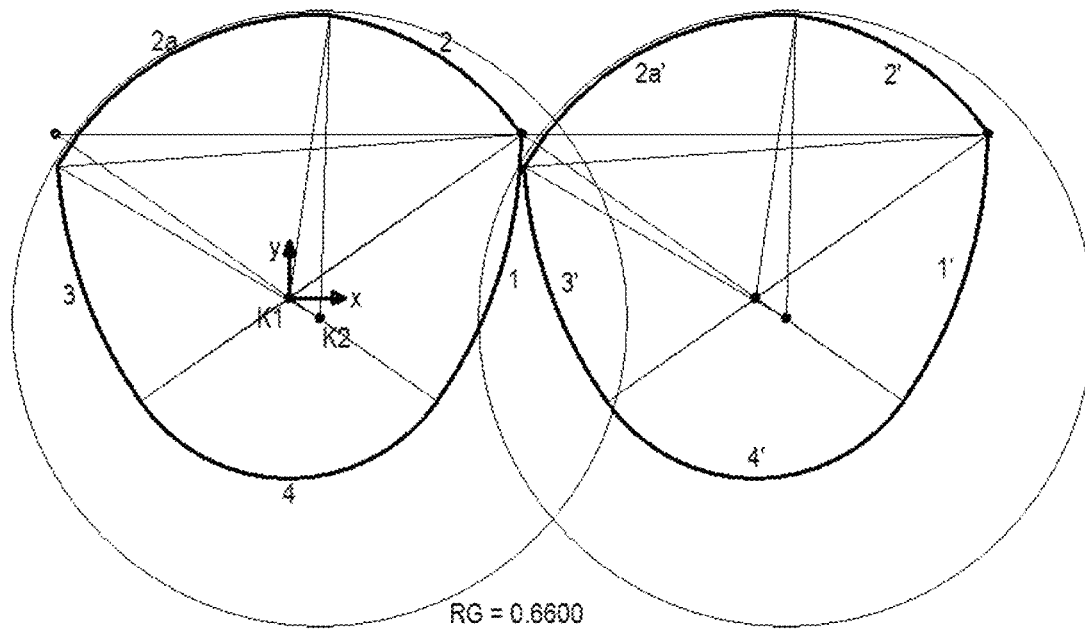

FIG. 15 shows the screw profile according to the invention having a number of grooves Z=1 from FIG. 2b as a pair of two identical screw profiles.

Figure 16:
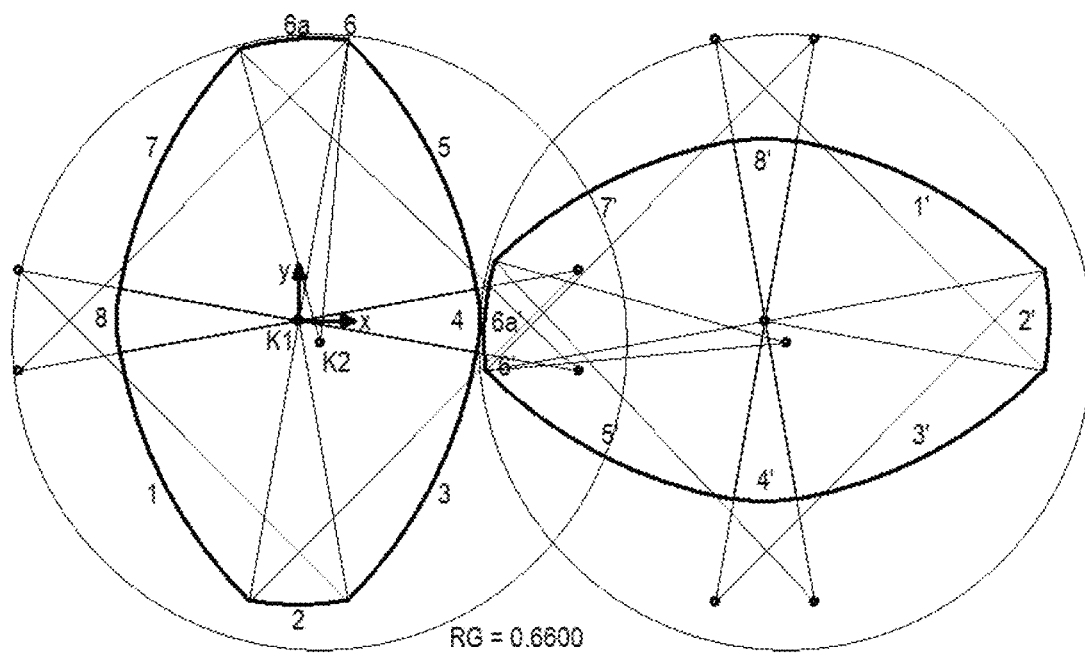

FIG. 16 shows the screw profile according to the invention having a number of grooves Z=2 from FIG. 6b as a pair of two identical screw profiles.

Figure 17:
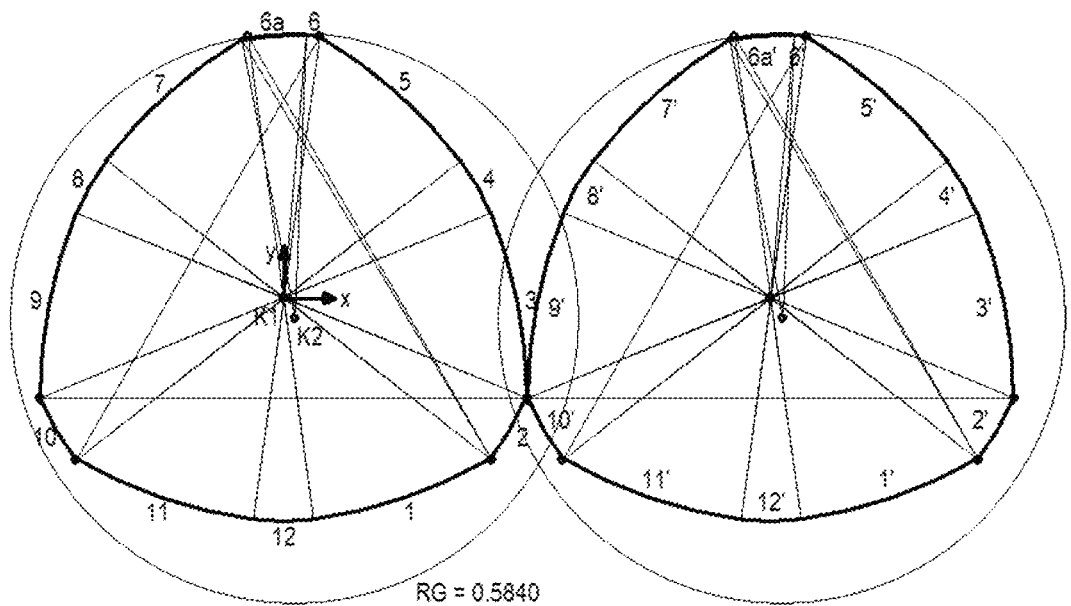

FIG. 17 shows the screw profile according to the invention having a number of grooves Z=3 from FIG. 12b as a pair of two identical screw profiles.

Figure 18:
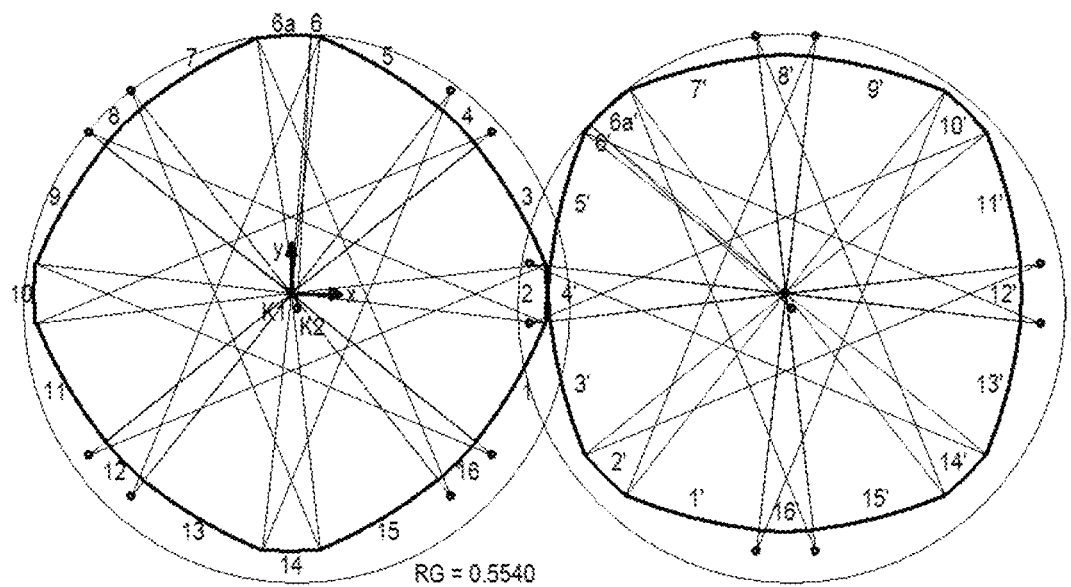

FIG. 18 shows the screw profile according to the invention having a number of grooves Z=4 from FIG. 14b as a pair of two identical screw profiles.

Figure 19:
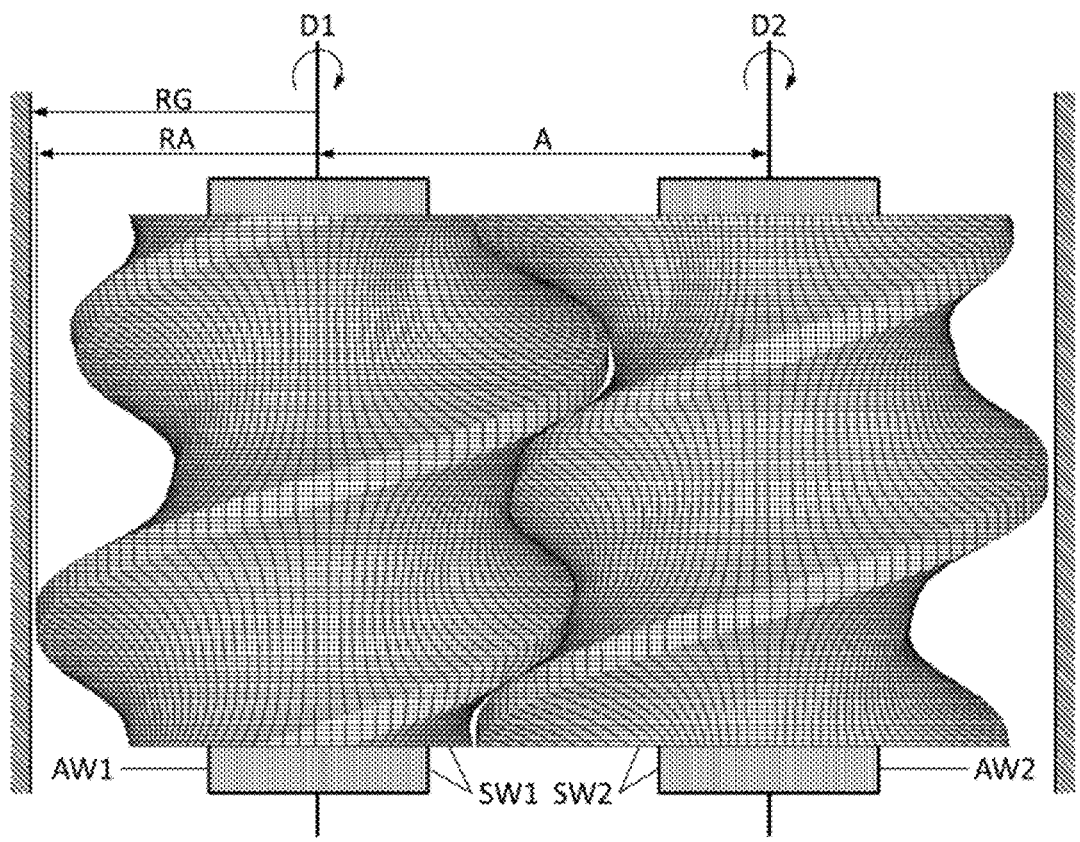

FIG. 19 shows the screw profiles according to the invention from FIG. 16 as a pair of conveying elements.

Figure 20:
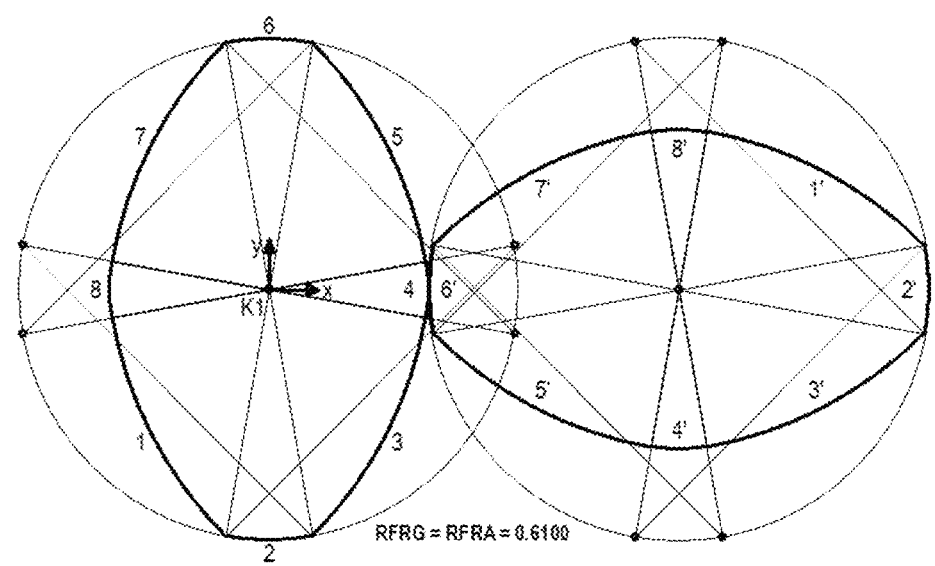

FIG. 20 shows the screw profile having a number of grooves Z=2 from FIG. 5a as a pair of two identical screw profiles.

DETAILED DESCRIPTION

FIGS. 1 to 14 fundamentally have the same structure, which is described in detail below. Each of the figures has a construction point K1 in which the origin of an x/y coordinate system is also located. In addition to the construction point K1, the figures may also have a construction point K2 and, in addition, also a construction point K3. The circular arcs of the screw profile are identified by thick, solid lines which are provided with the respective numbers of the circular arcs. The circular arcs are consecutively numbered counterclockwise, that is to say with a mathematically positive directional sense. In this respect, the starting point of a circular arc is the first point of a circular arc and the end point is the last point of a circular arc when the circular arc is traversed in a mathematically positive direction. The centers of the circular arcs are represented by small circles. The centers of the circular arcs are connected by thin, solid lines both to the starting point and to the end point of the associated circular arc. The dimensionless screw outer radius RA is characterized by a thin, dashed line, the numerical value of which is reported to four significant digits at the bottom right in the figure. The dimensionless housing inner radius RG is characterized by a thin, solid line, the numerical value of which is likewise reported to four significant digits at the bottom right in the figure. To the right alongside the figures, for each circular arc the associated dimensionless radius R, the associated center angle $\alpha$, the associated dimensionless x-coordinate Mx of the circular arc center M and the associated dimensionless y-coordinate My of the circular arc center M and the associated dimensionless x-coordinate Ax of the starting point AP of the circular arc and the associated dimensionless y-coordinate Ay of the starting point AP of the circular arc are reported in each case to four significant digits. This information clearly defines the screw profile. Moreover, in each of these figures the dimensionless screw outer radius RA and the dimensionless housing inner radius RG are reported.

Reported in each of FIGS. 15 to 18 is the dimensionless housing inner radius RG, and reported in FIG. 20 is the dimensionless reference housing inner radius RFRG and the dimensionless reference screw outer radius RFRA.

In each of FIGS. 15 and 17 the circular arcs are consecutively numbered in mathematically positive fashion for both the left-hand and right-hand screw profile, and in each of FIGS. 16 and 18 the circular arcs are consecutively numbered in mathematically positive fashion for the left-hand screw profile and the circular arcs are consecutively numbered in mathematically negative fashion for the right-hand screw profile.

FIG. 1a: FIG. 1a shows a screw profile having a number of grooves Z=1 according to the prior art. The dimensionless screw outer radius is RA=0.61. The dimensionless housing inner radius is RG=0.66. The construction point K1 lies in the center M1 of the housing bore and thus in the associated point of rotation DP1.

This embodiment is disadvantageous because the clearance between the housing and the screw flight land (circular arc 2) is large, the result of which is poor cleaning of the housing.

FIG. 1b: The screw profile in FIG. 1b has been obtained by displacing the screw profile from FIG. 1a. The displacement was effected such that the end point of the circular arc 2 corresponding to the starting point of the circular arc 3, the construction point K1 and the construction point K2 lie on a straight line. The construction point K2 lies in the center M1 of the housing bore and thus in the associated point of rotation DP1. The end point of the circular arc 2 corresponding to the starting point of the circular arc 3 lies on the dimensionless screw outer radius RA. The dimensionless screw outer radius is RA=0.65. The dimensionless housing inner radius is RG=0.66.

Compared to the embodiment according to FIG. 1a, this embodiment has a narrow clearance between the housing and the end point of the circular arc 2, which results in good cleaning of the housing. However, this embodiment is disadvantageous in that the clearance between the housing and the screw flight land (circular arc 2) is not constant and this results in a convergent or divergent channel between the housing and the screw flight land (circular arc 2) depending on the direction of rotation. When the screw profile is rotated clockwise around the construction point K2, polymer mass is pressed into the convergent channel between the housing and the screw flight land (circular arc 2), as a result of which large compressive forces act on the screw element that can move the screw element far enough out of the point of rotation DP1 that the screw element makes contact with the housing and/or a directly adjacent screw element and this leads to mechanical wear of the screw element.

FIG. 2a: FIG. 2a shows a closed screw profile according to the invention which has the number of grooves Z=1 and is composed of 5 circular arcs. The dimensionless housing inner radius is RG=0.66. The dimensionless screw outer radius is RA=0.61. The dimensionless clearance of the secondary flight land $NK_i$ (circular arc 2) with respect to the housing is C_NK=0.05.

The screw profile includes a construction point K1, which lies in the center M1 of the housing bore and thus in the associated point of rotation DP1. The screw profile is not axisymmetric or point-symmetric in relation to the construction point K1. The construction point K1 is the center of the circular arc 2. The circular arc 2 has a dimensionless radius R_2=0.61, which is the same as the dimensionless screw outer radius RA. The center angle is $\alpha$_2=0.8186≈46.9°. The circular arc 2 represents a secondary flight land $NK_i$, since the two directly adjacent circular arcs 1 and 2a, apart from the common point of contact, have a smaller distance to the construction point K1. The construction point K1 is the center of the circular arc 4. The circular arc 4 has a dimensionless radius R_4=0.39, which is the same as the dimensionless core radius RI. The center angle is $\alpha$_4=1.9217≈110.1°. The circular arc 4 represents a groove, since the two directly adjacent circular arcs 1 and 3, apart from the common point of contact, have a greater distance to the construction point K1.

The screw profile includes a construction point K2 which does not coincide with the construction point K1 and which lies within the screw profile and which moreover lies within a circle the center of which is the construction point K1 and the dimensionless radius of which is the same as the dimensionless core radius RI. The screw profile is not axisymmetric or point-symmetric in relation to the construction point K2. The construction point K2 is the center of the circular arc 2a. The circular arc 2a has a dimensionless radius R_2a=0.65, which is somewhat smaller than the dimensionless housing inner radius RG=0.66. The center angle is $\alpha$_2a=1.0799≈61.9°. The circular arc 2a represents the main flight land HK, since the two directly adjacent circular arcs 2 and 3, apart from the common point of contact, have a smaller distance to the construction point K2.

The distance between the construction point K2 and the construction point K1 is approximately 0.121 times the dimensionless housing inner radius RG. The smaller angle between the angle bisector of the groove (circular arc 4) and the connecting line between K1 and K2 is 55.1°. The construction point K1, the construction point K2 and the center of the circular arc 1 lie on a line.

The circular arcs 1 and 3 represent flanks. The dimensionless radii $R\_1$ and $R\_3$ of the two circular arcs 1 and 3 are respectively $R\_1=R\_3=1.00$. The centers of these two circular arcs are in each case not identical to the construction points K1 and K2.

The main flight land HK (circular arc 2a) and the secondary flight land $NK_1$ (circular arc 2) make contact with one another. The main flight land HK and the secondary flight land $NK_i$ are each separated from the groove by a flank.

FIG. 2b: The screw profile in FIG. 2b has been obtained by displacing the screw profile from FIG. 2a. The displacement was effected such that the construction point K2 lies in the center M1 of the housing bore and thus in the associated point of rotation DP1. The dimensionless housing inner radius is RG=0.66. The dimensionless screw outer radius is RA=0.65. The circular arc 2a has a dimensionless radius $R\_2a=0.65$, which is the same as the dimensionless screw outer radius RA. The dimensionless clearance of the main flight land HK (circular arc 2a) with respect to the housing is $C\_HK=0.01$. The construction point K1, the construction point K2 and the center of the circular arc 1 lie on a line.

This embodiment is advantageous because it has a constant, narrow clearance between the housing and the main flight land HK (circular arc 2a), which results in good cleaning of the housing. This embodiment is also advantageous because the length of the convergent or divergent channel—depending on the direction of rotation—between the housing and the main flight land HK (circular arc 2) is substantially smaller than in the embodiment according to FIG. 1b. Thus, when rotated clockwise, a convergent channel is produced between the housing and the main flight land HK (circular arc 2a), and when rotated counterclockwise, a divergent channel is produced.

FIG. 3a: FIG. 3a shows a closed screw profile according to the invention which has the number of grooves Z=1 and is composed of 5 circular arcs. The dimensionless housing inner radius is RG=0.66. The dimensionless screw outer radius is RA=0.61. The dimensionless clearance of the secondary flight land $NK_i$ (circular arc 2) with respect to the housing is $C\_NK=0.05$.

The screw profile includes a construction point K1, which lies in the center M1 of the housing bore and thus in the associated point of rotation DP1. The screw profile is not axisymmetric or point-symmetric in relation to the construction point K1. The construction point K1 is the center of the circular arc 2. The circular arc 2 has a dimensionless radius $R\_2=0.61$, which is the same as the dimensionless screw outer radius RA. The center angle is $\alpha\_2=0.6946\approx39.8°$. The circular arc 2 represents a secondary flight land $NK_i$, since the two directly adjacent circular arcs 1 and 2a, apart from the common point of contact, have a smaller distance to the construction point K1. The construction point K1 is the center of the circular arc 4. The circular arc 4 has a dimensionless radius $R\_4=0.39$, which is the same as the dimensionless core radius RI. The center angle is $\alpha\_4=1.9217\approx110.1°$. The circular arc 4 represents a groove, since the two directly adjacent circular arcs 1 and 3, apart from the common point of contact, have a greater distance to the construction point K1.

The screw profile includes a construction point K2 which does not coincide with the construction point K1 and which lies within the screw profile and which moreover lies within a circle the center of which is the construction point K1 and the dimensionless radius of which is the dimensionless core radius RI. The screw profile is not axisymmetric or point-symmetric in relation to the construction point K2. The construction point K2 is the center of the circular arc 2a. The circular arc 2a has a dimensionless radius $R\_2a=0.65$, which is somewhat smaller than the dimensionless housing inner radius RG=0.66. The center angle is $\alpha\_2a=1.1594\approx66.4°$. The circular arc 2a represents the main flight land HK, since the two directly adjacent circular arcs 2 and 3, apart from the common point of contact, have a smaller distance to the construction point K2.

The distance between the construction point K2 and the construction point K1 is approximately 0.091 times the housing inner radius RG. The smaller angle between the angle bisector of the groove and the connecting line between K1 and K2 is 35.0°. The line between the construction point K1 and the center of the circular arc 1 and the line between the construction point K2 and the starting point of the circular arc 3 are approximately parallel.

The circular arcs 1 and 3 represent flanks. The radius of the two circular arcs is respectively $R\_1=R\_3=1.00$. The centers of these two circular arcs are in each case not identical to the construction points K1 and K2.

The main flight land HK (circular arc 2a) and the secondary flight land $NK_i$ (circular arc 2) make contact with one another. The main flight land and the secondary flight land $NK_i$ are each separated from the groove by a flank.

FIG. 3b: The screw profile in FIG. 3b has been obtained by displacing the screw profile from FIG. 3a. The displacement was effected such that the construction point K2 lies in the center M1 of the housing bore and thus in the associated point of rotation DP1. The dimensionless housing inner radius is RG=0.66. The dimensionless screw outer radius is RA=0.65. The circular arc 2a has a dimensionless radius $R\_2a=0.65$, which is equal to the dimensionless screw outer radius RA. The dimensionless clearance of the main flight land HK (circular arc 2a) with respect to the housing is $C\_HK=0.01$.

This embodiment is advantageous because it has a constant, narrow clearance between the housing and the main flight land HK (circular arc 2a), which results in good cleaning of the housing. This embodiment is also advantageous because the length of the convergent or divergent channel—depending on the direction of rotation—between the housing and the secondary flight land $NK_i$ (circular arc 2) is substantially smaller than in the embodiment according to FIG. 1b. Thus, when rotated clockwise, a convergent channel is produced between the housing and the main flight land HK (circular arc 2a), and when rotated counterclockwise, a divergent channel is produced.

FIG. 4a: FIG. 4a shows a closed screw profile according to the invention which has the number of grooves Z=1 and is composed of 5 circular arcs. The dimensionless housing inner radius is RG=0.66. The dimensionless screw outer radius is RA=0.61. The dimensionless clearance of the secondary flight land $NK_1$ (circular arc 2) with respect to the housing is $C\_NK=0.05$. Here, the center of the circular arc 1 is the same as the starting point of the circular arc 3.

The screw profile includes a construction point K1, which lies in the center M1 of the housing bore and thus in the associated point of rotation DP1. The screw profile is not axisymmetric or point-symmetric in relation to the construction point K1. The construction point K1 is the center of the circular arc 2. The circular arc 2 has a radius R_2=0.61, which is the same as the dimensionless screw outer radius RA. The center angle is α_2=0.5238≈30.0°. The circular arc 2 represents a secondary flight land $NK_i$, since the two directly adjacent circular arcs 1 and 2a, apart from the common point of contact, have a smaller distance to the construction point K1. The construction point K1 is the center of the circular arc 4. The circular arc 4 has a dimensionless radius R_4=0.39, which is the same as the dimensionless core radius RI. The center angle is α_4=1.9217≈110.1°. The circular arc 4 represents a groove, since the two directly adjacent circular arcs 1 and 3, apart from the common point of contact, have a greater distance to the construction point K1.

The screw profile includes a construction point K2 which does not coincide with the construction point K1 and which lies within the screw profile and which moreover lies within a circle the center of which is the construction point K1 and the dimensionless radius of which is the core radius RI. The screw profile is not axisymmetric or point-symmetric in relation to the construction point K2. The construction point K2 is the center of the circular arc 2a. The circular arc 2a has a dimensionless radius R_2a=0.65, which is somewhat smaller than the dimensionless housing inner radius RG=0.66. The center angle is α_2a=1.2966≈74.3°. The circular arc 2a represents the main flight land HK, since the two directly adjacent circular arcs 2 and 3, apart from the common point of contact, have a smaller distance to the construction point K2.

The distance between the construction point K2 and the construction point K1 is approximately 0.077 times the dimensionless housing inner radius RG. The smaller angle between the angle bisector of the groove and the connecting line between K1 and K2 is 15.0°. The size and position of the circular arc 3 have remained unchanged in comparison with FIG. 1a.

The circular arcs 1 and 3 represent flanks. The dimensionless radius of the two circular arcs is respectively R_1=R_3=1.00. The centers of these two circular arcs are in each case not identical to the construction points K1 and K2.

The main flight land HK (circular arc 2a) and the secondary flight land $NK_1$ (circular arc 2) make contact with one another. The main flight land HK and the secondary flight land $NK_i$ are each separated from the groove by a flank.

FIG. 4b: The screw profile in FIG. 4b has been obtained by displacing the screw profile from FIG. 4a. The displacement was effected such that the construction point K2 lies in the center M1 of the housing bore and thus in the associated point of rotation DP1. The dimensionless housing inner radius is RG=0.66. The dimensionless screw outer radius is RA=0.65. The circular arc 2a has a radius R_2a=0.65, which is the same as the dimensionless screw outer radius RA. The dimensionless clearance of the main flight land HK (circular arc 2a) with respect to the housing is C_HK=0.01. The center of circle 1 corresponds to the starting point of circle 3.

This embodiment is advantageous because it has a constant, narrow clearance between the housing and the main flight land HK (circular arc 2a), which results in good cleaning of the housing. This embodiment is also advantageous because the length of the convergent or divergent channel—depending on the direction of rotation—between the housing and the secondary flight land $NK_i$ (circular arc 2) is substantially smaller than in the embodiment according to FIG. 1b. Thus, when rotated clockwise, a convergent channel is produced between the housing and the main flight land HK (circular arc 2a), and when rotated counterclockwise, a divergent channel is produced.

FIG. 5a: FIG. 5a shows a screw profile having a number of grooves Z=2 according to the prior art. The dimensionless screw outer radius is RA=0.61. The dimensionless housing inner radius is RG=0.66. The construction point K1 lies in the center M1 of the housing bore and thus in the associated point of rotation DP1.

This embodiment is disadvantageous because the clearance between the housing and a first flight land (circular arc 2) and also between the housing and a second flight land (circular arc 6) is large, the result of which is poor cleaning of the housing.

FIG. 5b: The screw profile in FIG. 5b has been obtained by displacing the screw profile from FIG. 5a. The displacement was effected such that the smaller angle between the angle bisector of the circular arc 8 and the connecting line between the construction point K1 and the construction point K2 is 135°. The construction point K2 lies in the center M1 of the housing bore and thus in the associated point of rotation DP1. The end point of the circular arc 6 corresponding to the starting point of the circular arc 7 lies on the dimensionless screw outer radius RA. The dimensionless screw outer radius is RA=0.65. The dimensionless housing inner radius is RG=0.66.

Compared to the embodiment according to FIG. 5a, this embodiment has a narrow clearance between the housing and the end point of the circular arc 6, which results in good cleaning of the housing. However, this embodiment is disadvantageous in that the clearance between the housing and the second flight land (circular arc 6) is not constant and this results in a convergent or divergent channel between the housing and the second flight land (circular arc 6) depending on the direction of rotation. When the screw profile is rotated clockwise around the construction point K2, polymer mass is pressed into the convergent channel between the housing and the second flight land (circular arc 6), as a result of which large compressive forces act on the screw element that can move the screw element far enough out of the point of rotation DP1 that the screw element makes contact with the housing and/or a directly adjacent screw element and this leads to mechanical wear of the screw element.

FIG. 6a: FIG. 6a shows a closed screw profile according to the invention which has the number of grooves Z=2 and is composed of 9 circular arcs. The dimensionless housing inner radius is RG=0.66. The dimensionless screw outer radius is RA=0.61. The dimensionless clearance of a first secondary flight land $NK_1$ (circular arc 2) and a second secondary flight land $NK_2$ (circular arc 6) with respect to the housing is respectively C_NK=0.05.

The screw profile includes a construction point K1, which lies in the center M1 of the housing bore and thus in the associated point of rotation DP1. The screw profile is not axisymmetric or point-symmetric in relation to the construction point K1. The construction point K1 is the center of the circular arc 2. The circular arc 2 has a dimensionless radius R_2=0.61, which is the same as the dimensionless screw outer radius RA. The center angle is α_2=0.3509≈20.1°. The circular arc 2 represents a secondary flight land $NK_i$, since the two directly adjacent circular arcs 1 and 3, apart from the common point of contact, have a smaller distance to the construction point K1. The construction point K1 is the center of the circular arc 6. The circular arc 6 has a radius R_6=0.61, which is the same as the dimensionless screw outer radius RA. The center angle is $\alpha\_6=0.0001\approx0.006°$. The circular arc 6 represents a secondary flight land $NK_i$, since the two directly adjacent circular arcs 5 and 6a, apart from the common point of contact, have a smaller distance to the construction point K1. The construction point K1 is the center of the circular arc 4. The circular arc 4 has a radius $R\_4=0.39$, which is the same as the dimensionless core radius RI. The center angle is $\alpha\_4=0.3509\approx20.1°$. The circular arc 4 represents a groove, since the two directly adjacent circular arcs 3 and 5, apart from the common point of contact, have a greater distance to the construction point K1. The construction point K1 is the center of the circular arc 8. The circular arc 8 has a radius $R\_8=0.39$, which is the same as the dimensionless core radius RI. The center angle is $\alpha\_8=0.3509\approx20.1°$. The circular arc 8 represents a groove, since the two directly adjacent circular arcs 1 and 7, apart from the common point of contact, have a greater distance to the construction point K1.

The screw profile includes a construction point K2 which does not coincide with the construction point K1 and which lies within the screw profile and which moreover lies within a circle the center of which is the construction point K1 and the radius of which is the dimensionless core radius. The screw profile is not axisymmetric or point-symmetric in relation to the construction point K2. The construction point K2 is the center of the circular arc 6a. The circular arc 6a has a dimensionless radius $R\_6a=0.65$, which is somewhat smaller than the dimensionless housing inner radius $RG=0.66$. The center angle is $\alpha\_6a=0.3618\approx20.7°$. The circular arc 6a represents the main flight land HK, since the two directly adjacent circular arcs 6 and 7, apart from the common point of contact, have a smaller distance to the construction point K2.

The distance between the construction point K2 and the construction point K1 is approximately 0.100 times the dimensionless housing inner radius RG. The smaller angle between the angle bisector of the groove, the circular arc point of which that lies on the angle bisector of the groove is separated from the closest point of the main flight land HK by the smaller curve length, and the connecting line between K1 and K2 is 135.0°.

The circular arcs 1, 3, 5 and 7 represent flanks. The dimensionless radius of the four circular arcs is respectively $R\_1=R\_3=R\_5=R\_7=1.00$. The centers of these four circular arcs are in each case not identical to the construction points K1 and K2.

The main flight land HK (circular arc 6a) and the second secondary flight land $NK_2$ (circular arc 6) make contact with one another. The main flight land HK, the first secondary flight land $NK_i$ (circular arc 2) and the second secondary flight land $NK_2$ (circular arc 6) are each separated from a groove by a flank.

FIG. 6b: The screw profile in FIG. 6b has been obtained by displacing the screw profile from FIG. 6a. The displacement was effected such that the construction point K2 lies in the center M1 of the housing bore and thus in the associated point of rotation DP1. The dimensionless housing inner radius is $RG=0.66$. The dimensionless screw outer radius is $RA=0.65$. The circular arc 6a has a dimensionless radius $R\_6a=0.65$, which is the same as the dimensionless screw outer radius RA. The dimensionless clearance of the main flight land HK (circular arc 6a) with respect to the housing is $C\_HK=0.01$.

This embodiment is advantageous because it has a constant, narrow clearance between the housing and the main flight land HK (circular arc 6a), which results in good cleaning of the housing. This embodiment is also advantageous because the length of the convergent or divergent channel—depending on the direction of rotation—between the housing and the secondary flight land $NK_i$ (circular arc 6) is virtually equal to zero in contrast to FIG. 5b. Thus, when rotated clockwise, a convergent channel is produced between the housing and the main flight land HK (circular arc 6a), and when rotated counterclockwise, a divergent channel is produced.

FIG. 7a: FIG. 7a shows a closed screw profile according to the invention that has the number of grooves $Z=2$ and is composed of 9 circular arcs. The dimensionless housing inner radius is $RG=0.66$. The dimensionless screw outer radius is $RA=0.61$. The dimensionless clearance of a first secondary flight land $NK_1$ (circular arc 2) and a second secondary flight land $NK_2$ (circular arc 6) with respect to the housing is respectively $C\_NK=0.05$.

The screw profile includes a construction point K1, which lies in the center M1 of the housing bore and thus in the associated point of rotation DP1. The screw profile is not axisymmetric or point-symmetric in relation to the construction point K1. The construction point K1 is the center of the circular arc 2. The circular arc 2 has a dimensionless radius $R\_2=0.61$, which is the same as the dimensionless screw outer radius RA. The center angle is $\alpha\_2=0.3509\approx20.1°$. The circular arc 2 represents a secondary flight land $NK_i$, since the two directly adjacent circular arcs 1 and 3, apart from the common point of contact, have a smaller distance to the construction point K1. The construction point K1 is the center of the circular arc 6. The circular arc 6 has a dimensionless radius $R\_6=0.61$, which is the same as the dimensionless screw outer radius RA. The center angle is $\alpha\_6=0.0837\approx4.8°$. The circular arc 6 represents a secondary flight land $NK_i$, since the two directly adjacent circular arcs 5 and 6a, apart from the common point of contact, have a smaller distance to the construction point K1. The construction point K1 is the center of the circular arc 4. The circular arc 4 has a dimensionless radius $R\_4=0.39$, which is the same as the dimensionless core radius RI. The center angle is $\alpha\_4=0.3509\approx20.1°$. The circular arc 4 represents a groove, since the two directly adjacent circular arcs 3 and 5, apart from the common point of contact, have a greater distance to the construction point K1. The construction point K1 is the center of the circular arc 8. The circular arc 8 has a dimensionless radius $R\ 8=0.39$, which is the same as the dimensionless core radius RI. The center angle is $\alpha\_8=0.3509\approx20.1°$. The circular arc 8 represents a groove, since the two directly adjacent circular arcs 1 and 7, apart from the common point of contact, have a greater distance to the construction point K1.

The screw profile includes a construction point K2 which does not coincide with the construction point K1 and which lies within the screw profile and which moreover lies within a circle the center of which is the construction point K1 and the radius of which is the dimensionless core radius RI. The screw profile is not axisymmetric or point-symmetric in relation to the construction point K2. The construction point K2 is the center of the circular arc 6a. The circular arc 6a has a dimensionless radius $R\_6a=0.65$, which is somewhat smaller than the dimensionless housing inner radius $RG=0.66$. The center angle is $\alpha\_6a=0.2731\approx15.6°$. The circular arc 6a represents the main flight land HK, since the two directly adjacent circular arcs 6 and 7, apart from the common point of contact, have a smaller distance to the construction point K2.

The distance between the construction point K2 and the construction point K1 is approximately 0.091 times the dimensionless housing inner radius RG. The smaller angle between the angle bisector of the groove, the circular arc point of which that lies on the angle bisector of the groove is separated from the closest point of the main flight land HK by the smaller curve length, and the connecting line between K1 and K2 is 135.0°.

The circular arcs 1, 3, 5 and 7 represent flanks. The radius of the four circular arcs is respectively R_1=R_3=R_5=R_7=1.00. The centers of these four circular arcs are in each case not identical to the construction points K1 and K2.

The main flight land HK (circular arc 6a) and the second secondary flight land $NK_2$ (circular arc 6) make contact with one another. The main flight land HK, the first secondary flight land $NK_i$ (circular arc 2) and the second secondary flight land $NK_2$ (circular arc 6) are each separated from a groove by a flank.

FIG. 7b: The screw profile in FIG. 7b has been obtained by displacing the screw profile from FIG. 7a. The displacement was effected such that the construction point K2 lies in the center M1 of the housing bore and thus in the associated point of rotation DP1. The dimensionless housing inner radius is RG=0.66. The dimensionless screw outer radius is RA=0.65. The circular arc 6a has a dimensionless radius R_6a=0.65, which is the same as the dimensionless screw outer radius RA.

The dimensionless clearance of the main flight land HK (circular arc 6a) with respect to the housing is C_HK=0.01.

This embodiment is advantageous because it has a constant, narrow clearance between the housing and the main flight land HK (circular arc 6a), which results in good cleaning of the housing. This embodiment is also advantageous because the length of the convergent or divergent channel—depending on the direction of rotation—between the housing and the secondary flight land $NK_i$ (circular arc 6) is substantially smaller than in the embodiment according to FIG. 5b. Thus, when rotated clockwise, a convergent channel is produced between the housing and the main flight land HK (circular arc 6a), and when rotated counterclockwise, a divergent channel is produced.

FIG. 8a: FIG. 8a shows a closed screw profile according to the invention which has the number of grooves Z=2 and is composed of 9 circular arcs. The housing inner radius is RG=0.61. The dimensionless screw outer radius is RA=0.58. The dimensionless clearance of a first secondary flight land $NK_1$ (circular arc 2) and a second secondary flight land $NK_2$ (circular arc 6) with respect to the housing is C_NK=0.03.

The screw profile includes a construction point K1, which lies in the center M1 of the housing bore and thus in the associated point of rotation DP1. The screw profile is not axisymmetric or point-symmetric in relation to the construction point K1. The construction point K1 is the center of the circular arc 2. The circular arc 2 has a dimensionless radius R_2=0.58, which is the same as the dimensionless screw outer radius RA. The center angle is $\alpha\_2$=0.5079≈29.1°. The circular arc 2 represents a secondary flight land $NK_i$, since the two directly adjacent circular arcs 1 and 3, apart from the common point of contact, have a smaller distance to the construction point K1. The construction point K1 is the center of the circular arc 6. The circular arc 6 has a dimensionless radius R_6=0.58, which is the same as the screw outer radius RA. The center angle is $\alpha\_6$=0.0320≈1.9°. The circular arc 6 represents a secondary flight land $NK_i$, since the two directly adjacent circular arcs 5 and 6a, apart from the common point of contact, have a smaller distance to the construction point K1. The construction point K1 is the center of the circular arc 4. The circular arc 4 has a dimensionless radius R_4=0.42, which is the same as the dimensionless core radius RI. The center angle is $\alpha\_4$=0.5079≈29.1°. The circular arc 4 represents a groove, since the two directly adjacent circular arcs 3 and 5, apart from the common point of contact, have a greater distance to the construction point K1. The construction point K1 is the center of the circular arc 8. The circular arc 8 has a dimensionless radius R_8=0.42, which is the same as the dimensionless core radius RI. The center angle is $\alpha\_8$=0.5079≈29.1°. The circular arc 8 represents a groove, since the two directly adjacent circular arcs 1 and 7, apart from the common point of contact, have a greater distance to the construction point K1.

The screw profile includes a construction point K2 which does not coincide with the construction point K1 and which lies within the screw profile and which moreover lies within a circle the center of which is the construction point K1 and the dimensionless radius of which is the dimensionless core radius RI. The screw profile is not axisymmetric or point-symmetric in relation to the construction point K2. The construction point K2 is the center of the circular arc 6a. The circular arc 6a has a dimensionless radius R_6a=0.60, which is somewhat smaller than the housing inner radius RG=0.61. The center angle is $\alpha\_6a$=0.4895≈28.0°. The circular arc 6a represents the main flight land HK, since the two directly adjacent circular arcs 6 and 7, apart from the common point of contact, have a smaller distance to the construction point K2.

The distance between the construction point K2 and the construction point K1 is approximately 0.055 times the housing inner radius RG. The smaller angle between the angle bisector of the groove, the circular arc point of which that lies on the angle bisector of the groove is separated from the closest point of the main flight land HK by the smaller curve length, and the connecting line between K1 and K2 is 135.0°.

The circular arcs 1, 3, 5 and 7 represent flanks. The dimensionless radius of the four circular arcs is respectively R_1=R_3=R_5=R_7=1.00. The centers of these four circular arcs are in each case not identical to the construction points K1 and K2.

The main flight land HK (circular arc 6a) and the second secondary flight land $NK_2$ (circular arc 6) make contact with one another. The main flight land HK, the first secondary flight land $NK_i$ (circular arc 2) and the second secondary flight land $NK_2$ (circular arc 6) are each separated from a groove by a flank.

FIG. 8b: The screw profile in FIG. 8b has been obtained by displacing the screw profile from FIG. 8a. The displacement was effected such that the construction point K2 lies in the center M1 of the housing bore and thus in the associated point of rotation DP1. The dimensionless housing inner radius is RG=0.61. The dimensionless screw outer radius is RA=0.60. The circular arc 6a has a dimensionless radius R_6a=0.60, which is the same as the dimensionless screw outer radius RA. The dimensionless clearance of the main flight land HK (circular arc 6a) with respect to the housing is C_HK=0.01.

This embodiment is advantageous because it has a constant, narrow clearance between the housing and the main flight land HK (circular arc 6a), which results in good cleaning of the housing. This embodiment is also advantageous because the length of the convergent or divergent channel—depending on the direction of rotation—between the housing and the secondary flight land $NK_i$ (circular arc 6) is substantially smaller than in the embodiment according to FIG. 5b. Thus, when rotated clockwise, a convergent channel is produced between the housing and the main flight land HK (circular arc 6*a*), and when rotated counterclockwise, a divergent channel is produced.

FIG. 9*a*: FIG. 9*a* shows a closed screw profile according to the invention that has the number of grooves Z=2 and is composed of 10 circular arcs. The dimensionless housing inner radius is RG=0.66. The dimensionless screw outer radius is RA=0.61. The dimensionless clearance of a first secondary flight land $NK_1$ (circular arc 2) and a second secondary flight land $NK_2$ (circular arc 6) with respect to the housing is C_NK=0.05.

The screw profile includes a construction point K1, which lies in the center M1 of the housing bore and thus in the associated point of rotation DP1. The screw profile is not axisymmetric or point-symmetric in relation to the construction point K1. The construction point K1 is the center of the circular arc 2. The circular arc 2 has a dimensionless radius R_2=0.61, which is the same as the dimensionless screw outer radius RA. The center angle is $\alpha\_2$=0.0550≈3.2°. The circular arc 2 represents a secondary flight land $NK_i$, since the two directly adjacent circular arcs 2*a* and 3, apart from the common point of contact, have a smaller distance to the construction point K1. The construction point K1 is the center of the circular arc 6. The circular arc 6 has a dimensionless radius R_6=0.61, which is the same as the dimensionless screw outer radius RA. The center angle is $\alpha\_6$=0.0837≈4.8°. The circular arc 6 represents a secondary flight land $NK_i$, since the two directly adjacent circular arcs 5 and 6*a*, apart from the common point of contact, have a smaller distance to the construction point K1. The construction point K1 is the center of the circular arc 4. The circular arc 4 has a radius R_4=0.39, which is the same as the dimensionless core radius RI. The center angle is $\alpha\_4$=0.3509≈20.1°. The circular arc 4 represents a groove, since the two directly adjacent circular arcs 3 and 5, apart from the common point of contact, have a greater distance to the construction point K1. The construction point K1 is the center of the circular arc 8. The circular arc 8 has a radius R_8=0.39, which is the same as the dimensionless core radius RI. The center angle is $\alpha\_8$=0.3509≈20.1°. The circular arc 8 represents a groove, since the two directly adjacent circular arcs 1 and 7, apart from the common point of contact, have a greater distance to the construction point K1.

The screw profile includes a construction point K2 which does not coincide with the construction point K1 and which lies within the screw profile and which moreover lies within a circle the center of which is the construction point K1 and the dimensionless radius of which is the dimensionless core radius RI. The screw profile is not axisymmetric or point-symmetric in relation to the construction point K2. The construction point K2 is the center of the circular arc 2*a*. The circular arc 2*a* has a dimensionless radius R_2a=0.564, which is smaller than the dimensionless screw outer radius RA=0.61. The center angle is $\alpha\_2a$=0.3577≈20.5°. The circular arc 2*a* represents a secondary flight land $NK_i$, since the two directly adjacent circular arcs 1 and 2, apart from the common point of contact, have a smaller distance to the construction point K2 and the circular arc 6*a* has a greater distance to the construction point K2. The construction point K2 is the center of the circular arc 6*a*. The circular arc 6*a* has a dimensionless radius R_6a=0.65, which is somewhat smaller than the dimensionless housing inner radius RG=0.66. The center angle is $\alpha\_6a$=0.2731≈15.6°. The circular arc 6*a* represents the main flight land HK, since the two directly adjacent circular arcs 6 and 7, apart from the common point of contact, have a smaller distance to the construction point K2 and the circular arc 2*a* has a smaller distance to the construction point K2.

The distance between the construction point K2 and the construction point K1 is approximately 0.091 times the dimensionless housing inner radius RG. The smaller angle between the angle bisector of the groove, the circular arc point of which that lies on the angle bisector of the groove is separated from the closest point of the main flight land HK by the smaller curve length, and the connecting line between K1 and K2 is 135.0°.

The circular arcs 1, 3, 5 and 7 represent flanks. The dimensionless radius of the four circular arcs is respectively R_1=R_3=R_5=R_7=1.00. The centers of these four circular arcs are in each case not identical to the construction points K1 and K2.

The main flight land HK (circular arc 6*a*) and the second secondary flight land $NK_2$ (circular arc 6) make contact with one another. The main flight land HK, the first secondary flight land $NK_i$ (circular arc 2) and the second secondary flight land $NK_2$ (circular arc 6) are each separated from a groove by a flank.

FIG. 9*b*: The screw profile in FIG. 9*b* has been obtained by displacing the screw profile from FIG. 9*a*. The displacement was effected such that the construction point K2 lies in the center M1 of the housing bore and thus in the associated point of rotation DP1. The dimensionless housing inner radius is RG=0.66. The dimensionless screw outer radius is RA=0.65. The circular arc 6*a* has a dimensionless radius R_6a=0.65, which is equal to the dimensionless screw outer radius RA. The dimensionless clearance of the main flight land HK (circular arc 6*a*) with respect to the housing is C_HK=0.01.

This embodiment is advantageous because it has a constant, narrow clearance between the housing and the main flight land HK (circular arc 6*a*), which results in good cleaning of the housing. This embodiment is furthermore advantageous because it has a constant clearance between the housing and a first secondary flight land $NK_1$ (circular arc 2*a*). This embodiment is also advantageous because the lengths of the convergent or divergent channels—depending on the direction of rotation—between the housing and the secondary flight land NK (circular arc 2) and a second secondary flight land $NK_2$ (circular arc 6) are substantially smaller than in the embodiment according to FIG. 5*b*. Thus, when rotated clockwise, a convergent channel is produced between the housing and the main flight land HK (circular arc 6*a*), and when rotated counterclockwise, a divergent channel is produced.

FIG. 10*a*: FIG. 10*a* shows a closed screw profile according to the invention that has the number of grooves Z=2 and is composed of 10 circular arcs. The dimensionless housing inner radius is RG=0.66. The dimensionless screw outer radius is RA=0.61. The clearance of a first secondary flight land $NK_1$ (circular arc 2) and a second secondary flight land $NK_2$ (circular arc 6) with respect to the housing is respectively C_NK=0.05.

The screw profile includes a construction point K1, which lies in the center M1 of the housing bore and thus in the associated point of rotation DP1. The screw profile is point-symmetric in relation to the construction point K1. The construction point K1 is the center of the circular arc 2. The circular arc 2 has a dimensionless radius R_2=0.61, which is the same as the dimensionless screw outer radius RA. The center angle is $\alpha\_2$=0.0837≈4.8°. The circular arc 2 represents a secondary flight land $NK_i$, since the two directly adjacent circular arcs 2*a* and 3, apart from the common point of contact, have a smaller distance to the construction point K1. The construction point K1 is the center of the circular arc 6. The circular arc 6 has a dimensionless radius R_6=0.61, which is the same as the dimensionless screw outer radius RA. The center angle is α_6=0.0837≈4.8°. The circular arc 6 represents a secondary flight land $NK_2$, since the two directly adjacent circular arcs 5 and 6a, apart from the common point of contact, have a smaller distance to the construction point K1. The construction point K1 is the center of the circular arc 4. The circular arc 4 has a dimensionless radius R_4=0.39, which is the same as the dimensionless core radius RI. The center angle is α_4=0.3509≈20.1°. The circular arc 4 represents a groove, since the two directly adjacent circular arcs 3 and 5, apart from the common point of contact, have a greater distance to the construction point K1. The construction point K1 is the center of the circular arc 8. The circular arc 8 has a dimensionless radius R_8=0.39, which is the same as the dimensionless core radius RI. The center angle is α_8=0.3509≈20.1°. The circular arc 8 represents a groove, since the two directly adjacent circular arcs 1 and 7, apart from the common point of contact, have a greater distance to the construction point K1.

The screw profile includes a construction point K2 which does not coincide with the construction point K1 and which lies within the screw profile and which moreover lies within a circle the center of which is the construction point K1 and the dimensionless radius of which is the dimensionless core radius RI. The screw profile is not axisymmetric or point-symmetric in relation to the construction point K2. The construction point K2 is the center of the circular arc 6a. The circular arc 6a has a dimensionless radius R_6a=0.65, which is somewhat smaller than the dimensionless housing inner radius RG=0.66. The center angle is α_6a=0.2731≈15.6°. The circular arc 6a represents the main flight land HK, since the two directly adjacent circular arcs 6 and 7, apart from the common point of contact, have a smaller distance to the construction point K2.

The screw profile includes a construction point K3, which has the same distance to the construction point K1 as construction point K2, and wherein the construction points K1, K2 and K3 lie on a straight line and K1, K2 and K3 are not identical. The screw profile is not axisymmetric or point-symmetric in relation to the construction point K3. The construction point K3 is the center of the circular arc 2a. The circular arc 2a has a dimensionless radius R_2a=0.65, which is somewhat smaller than the dimensionless housing inner radius RG=0.66. The center angle is α_2a=0.2731≈15.6°. The circular arc 2a represents a secondary flight land $NK_3$, since the two directly adjacent circular arcs 2 and 3, apart from the common point of contact, have a smaller distance to the construction point K3.

The distance between the construction point K2 and the construction point K1 is approximately 0.091 times the dimensionless housing inner radius RG. The smaller angle between the angle bisector of the groove, the circular arc point of which that lies on the angle bisector of the groove is separated from the closest point of the main flight land HK by the smaller curve length, and the connecting line between K1 and K2 is 135.0°.

The circular arcs 1, 3, 5 and 7 represent flanks. The dimensionless radius of the four circular arcs is respectively R_1=R_3=R_5=R_7=1.00. The centers of these four circular arcs are in each case not identical to the construction points K1 and K2.

The main flight land HK (circular arc 6a) and the second secondary flight land $NK_2$ (circular arc 6) make contact with one another. The main flight land HK, the first secondary flight land $NK_1$ (circular arc 2) and the second secondary flight land $NK_2$ (circular arc 6) are each separated from a groove by a flank.

The screw profile is not axisymmetric, but is point-symmetric, in relation to the construction point K1. In this way, the screw profile can be constructed particularly easily.

FIG. 10b: The screw profile in FIG. 10b has been obtained by displacing the screw profile from FIG. 10a. The displacement was effected such that the construction point K2 lies in the center M1 of the housing bore and thus in the associated point of rotation DP1. The dimensionless housing inner radius is RG=0.66. The dimensionless screw outer radius is RA=0.65. The circular arc 6a has a dimensionless radius R_6a=0.65, which is the same as the dimensionless screw outer radius RA. The dimensionless clearance of the main flight land (circular arc 6a) with respect to the housing is C_HK=0.01.

This embodiment is advantageous because it has a constant, narrow clearance between the housing and the main flight land (circular arc 6a), which results in good cleaning of the housing. This embodiment is also advantageous because the length of the convergent or divergent channel—depending on the direction of rotation—between the housing and the main flight land (circular arc 6) is substantially smaller than in the embodiment according to FIG. 5b. Thus, when rotated clockwise, a convergent channel is produced between the housing and the main flight land HK (circular arc 6a), and when rotated counterclockwise, a divergent channel is produced.

FIG. 11a: Figure Ha1 shows a screw profile having a number of grooves Z=3 according to the prior art and FIG. 11a2 shows an enlargement of a detail around circular arc 6 of FIG. 11a1. The dimensionless screw outer radius is RA=0.54. The dimensionless housing inner radius is RG=0.584. The construction point K1 lies in the center M1 of the housing bore and thus in the associated point of rotation DP1.

This embodiment is disadvantageous because the clearance between the housing and a first flight land (circular arc 2) and also between the housing and a second flight land (circular arc 6) and also between the housing and a third flight land (circular arc 10) is large, the result of which is poor cleaning of the housing.

FIG. 11b: The screw profile in FIG. 11b1 has been obtained by displacing the screw profile from FIG. 11a1; FIG. 11b2 shows an enlargement of a detail around circular arc 6 of FIG. 11b1. The displacement was effected such that the smaller angle between the angle bisector of the circular arc 8 and the connecting line between the construction point K1 and the construction point K2 is 150°. The construction point K2 lies in the center M1 of the housing bore and thus in the associated point of rotation DP1. The end point of the circular arc 6 corresponding to the starting point of the circular arc 7 lies on the dimensionless screw outer radius RA, the starting point of circular arc 6 does not lie on the dimensionless screw outer radius RA. The dimensionless screw outer radius is RA=0.58. The dimensionless housing inner radius is RG=0.584.

Compared to the embodiment according to FIG. 11a1, this embodiment has a narrow clearance between the housing and the end point of the circular arc 6, which results in good cleaning of the housing. However, this embodiment is disadvantageous in that the clearance between the housing and the second flight land (circular arc 6) is not constant and this results in a convergent or divergent channel between the housing and the second flight land (circular arc 6) depending on the direction of rotation. Thus, when rotated clockwise, a convergent channel is produced between the housing and the main flight land HK (circular arc 6), and when rotated counterclockwise, a divergent channel is produced.

FIG. 12*a*: FIG. 12*a*1 shows a closed screw profile according to the invention which has the number of grooves Z=3 and is composed of 13 circular arcs, and FIG. 12*a*2 shows an enlargement of a detail around circular arc 6 and circular arc 6*a* of FIG. 12*a*1. The dimensionless housing inner radius is RG=0.584. The dimensionless screw outer radius is RA=0.54. The dimensionless clearance of a first secondary flight land $NK_1$ (circular arc 2), a second secondary flight land $NK_2$ (circular arc 6) and a third secondary flight land $NK_3$ (circular arc 10) with respect to the housing is respectively C_NK=0.044.

The screw profile includes a construction point K1, which lies in the center M1 of the housing bore and thus in the associated point of rotation DP1. The screw profile is not axisymmetric or point-symmetric in relation to the construction point K1. The construction point K1 is the center of the circular arc 2. The circular arc 2 has a dimensionless radius R_2=0.54, which is the same as the dimensionless screw outer radius RA. The center angle is $\alpha\_2=0.2726\approx15.6°$. The circular arc 2 represents a secondary flight land $NK_1$, since the two directly adjacent circular arcs 1 and 3, apart from the common point of contact, have a smaller distance to the construction point K1. The construction point K1 is the center of the circular arc 6. The circular arc 6 has a dimensionless radius R_6=0.54, which is the same as the dimensionless screw outer radius RA. The center angle is $\alpha\_6=0.0501\approx2.9°$. The circular arc 6 represents a secondary flight land $NK_2$, since the two directly adjacent circular arcs 5 and 6*a*, apart from the common point of contact, have a smaller distance to the construction point K1. The construction point K1 is the center of the circular arc 10. The circular arc 10 has a dimensionless radius R_10=0.54, which is the same as the dimensionless screw outer radius RA. The center angle is $\alpha\_10=0.2726\approx15.6°$. The circular arc 10 represents a secondary flight land $NK_3$, since the two directly adjacent circular arcs 9 and 11, apart from the common point of contact, have a smaller distance to the construction point K1. The construction point K1 is the center of the circular arc 4. The circular arc 4 has a dimensionless radius R_4=0.46, which is the same as the dimensionless core radius RI. The center angle is $\alpha\_4=0.2726\approx15.6°$. The circular arc 4 represents a groove, since the two directly adjacent circular arcs 3 and 5, apart from the common point of contact, have a greater distance to the construction point K1. The construction point K1 is the center of the circular arc 8. The circular arc 8 has a radius R_8=0.46, which is the same as the dimensionless core radius RI. The center angle is $\alpha\_8=0.2726\approx15.6°$. The circular arc 8 represents a groove, since the two directly adjacent circular arcs 7 and 9, apart from the common point of contact, have a greater distance to the construction point K1. Construction point K1 is the center of the circular arc 12. The circular arc 12 has a radius R_12=0.46, which is the same as the dimensionless core radius RI. The center angle is $\alpha\_12=0.2726\approx15.6°$. The circular arc 12 represents a groove, since the two directly adjacent circular arcs 1 and 11, apart from the common point of contact, have a greater distance to the construction point K1.

The screw profile includes a construction point K2 which does not coincide with the construction point K1 and which lies within the screw profile and which moreover lies within a circle the center of which is the construction point K1 and the dimensionless radius of which is the dimensionless core radius RI. The screw profile is not axisymmetric or point-symmetric in relation to the construction point K2. The construction point K2 is the center of the circular arc 6*a*. The circular arc 6*a* has a dimensionless radius R_6*a*=0.58, which is somewhat smaller than the dimensionless housing inner radius RG=0.584. The center angle is $\alpha\_6a=0.2282\approx13.1°$. The circular arc 6*a* represents the main flight land HK, since the two directly adjacent circular arcs 6 and 7, apart from the common point of contact, have a smaller distance to the construction point K2.

The distance between the construction point K2 and the construction point K1 is approximately 0.073 times the housing inner radius RG. The smaller angle between the angle bisector of the groove, the circular arc point of which that lies on the angle bisector of the groove is separated from the closest point of the main flight land HK by the smaller curve length, and the connecting line between K1 and K2 is 150.0°.

The circular arcs 1, 3, 5, 7, 9 and 11 represent flanks. The dimensionless radius of the six circular arcs is respectively R_1=R_3=R_5=R_7=R_9=R_11=1.00. The centers of these six circular arcs are in each case not identical to the construction points K1 and K2.

The main flight land HK (circular arc 6*a*) and the secondary flight land $NK_2$ (circular arc 6) make contact with one another. The main flight land HK (circular arc 6*a*), the first secondary flight land $NK_1$ (circular arc 2), the second secondary flight land $NK_2$ (circular arc 6) and the third secondary flight land $NK_3$ (circular arc 10) are each separated from a groove by a flank.

FIG. 12*b*: The screw profile in FIG. 12*b*1 has been obtained by displacing the screw profile from FIG. 12*a*1; FIG. 12*b*2 shows an enlargement of a detail around circular arc 6 and circular arc 6*a* of FIG. 12*b*1. The displacement was effected such that the construction point K2 lies in the center M1 of the housing bore and thus in the associated point of rotation DP1. The housing inner radius is RG=0.584. The dimensionless screw outer radius is RA=0.58. The circular arc 6*a* has a dimensionless radius R_6*a*=0.58, which is the same as the dimensionless screw outer radius RA. The dimensionless clearance of the main flight land HK (circular arc 6*a*) with respect to the housing is C_HK=0.004.

This embodiment is advantageous because it has a constant, narrow clearance between the housing and the main flight land HK (circular arc 6*a*), which results in good cleaning of the housing. This embodiment is also advantageous because the length of the convergent or divergent channel—depending on the direction of rotation—between the housing and the main flight land (circular arc 6) is substantially smaller than in the embodiment according to FIG. 11*b*. Thus, when rotated clockwise, a convergent channel is produced between the housing and the main flight land HK (circular arc 6*a*), and when rotated counterclockwise, a divergent channel is produced.

FIG. 13*a*: FIG. 13*a*1 shows a screw profile having a number of grooves Z=4 according to the prior art and FIG. 13*a*2 shows an enlargement of a detail around circular arc 6 of FIG. 13*a*1. The dimensionless screw outer radius is RA=0.52. The dimensionless housing inner radius is RG=0.554. The construction point K1 lies in the center M1 of the housing bore and thus in the associated point of rotation DP1.

This embodiment is disadvantageous because the clearance between the housing and a first flight land (circular arc 2) and also between the housing and a second flight land (circular arc 6) and also between the housing and a third flight land (circular arc 10) and also between the housing and a fourth flight land (circular arc 14) is large, the result of which is poor cleaning of the housing. FIG. 13b: The screw profile in FIG. 13b1 has been obtained by displacing the screw profile from FIG. 13a1; FIG. 13b2 shows an enlargement of a detail around circular arc 6 of FIG. 13b1. The displacement was effected such that the smaller angle between the angle bisector of the circular arc 8 and the connecting line between the construction point K1 and the construction point K2 is 157.5°. The construction point K2 lies in the center M1 of the housing bore and thus in the associated point of rotation DP1. The end point of the circular arc 6 corresponding to the starting point of the circular arc 7 lies on the dimensionless screw outer radius RA, the starting point of circular arc 6 does not lie on the dimensionless screw outer radius RA. The dimensionless screw outer radius is RA=0.55. The dimensionless housing inner radius is RG=0.554.

Compared to the embodiment according to FIG. 13a1, this embodiment has a narrow clearance between the housing and the end point of the circular arc 6, which results in good cleaning of the housing. However, this embodiment is disadvantageous in that the clearance between the housing and the second flight land (circular arc 6) is not constant and this results in a convergent or divergent channel between the housing and the second flight land (circular arc 6) depending on the direction of rotation. Thus, when rotated clockwise, a convergent channel is produced between the housing and the main flight land HK (circular arc 6), and when rotated counterclockwise, a divergent channel is produced.

FIG. 14a: FIG. 14a1 shows a closed screw profile according to the invention which has the number of grooves Z=4 and is composed of 17 circular arcs; FIG. 14a2 shows an enlargement of a detail around circular arc 6 and circular arc 6a of FIG. 14a1. The dimensionless housing inner radius is RG=0.554. The screw outer radius is RA=0.52. The clearance of a first secondary flight land $NK_1$ (circular arc 2), a second secondary flight land $NK_2$ (circular arc 6), a third secondary flight land $NK_3$ (circular arc 10) and a fourth secondary flight land $NK_4$ (circular arc 14) with respect to the housing is respectively C_NK=0.034.

The screw profile includes a construction point K1, which lies in the center M1 of the housing bore and thus in the associated point of rotation DP1. The screw profile is not axisymmetric or point-symmetric in relation to the construction point K1. The construction point K1 is the center of the circular arc 2. The circular arc 2 has a dimensionless radius R_2=0.52, which is the same as the dimensionless screw outer radius RA. The center angle is α_2=0.2289≈13.1°. The circular arc 2 represents a secondary flight land $NK_i$, since the two directly adjacent circular arcs 1 and 3, apart from the common point of contact, have a smaller distance to the construction point K1. The construction point K1 is the center of the circular arc 6. The circular arc 6 has a dimensionless radius R_6=0.52, which is the same as the dimensionless screw outer radius RA. The center angle is α_6=0.0381≈2.2°. The circular arc 6 represents a secondary flight land $NK_2$, since the two directly adjacent circular arcs 5 and 6a, apart from the common point of contact, have a smaller distance to the construction point K1. The construction point K1 is the center of the circular arc 10. The circular arc 10 has a dimensionless radius R_10=0.52, which is the same as the dimensionless screw outer radius RA. The center angle is α_10=0.2289≈13.1°. The circular arc 10 represents a secondary flight land $NK_3$, since the two directly adjacent circular arcs 9 and 11, apart from the common point of contact, have a smaller distance to the construction point K1. The construction point K1 is the center of the circular arc 14. The circular arc 14 has a dimensionless radius R_14=0.52, which is the same as the dimensionless screw outer radius RA. The center angle is α_14=0.2289≈13.1°. The circular arc 14 represents a secondary flight land $NK_4$, since the two directly adjacent circular arcs 13 and 15, apart from the common point of contact, have a smaller distance to the construction point K1. The construction point K1 is the center of the circular arc 4. The circular arc 4 has a dimensionless radius R_4=0.48, which is the same as the dimensionless core radius. The center angle is α_4=0.2289≈13.1°. The circular arc 4 represents a groove, since the two directly adjacent circular arcs 3 and 5, apart from the common point of contact, have a greater distance to the construction point K1. The construction point K1 is the center of the circular arc 8. The circular arc 8 has a dimensionless radius R_8=0.48, which is the same as the dimensionless core radius. The center angle is α_8=0.2289≈13.1°. The circular arc 8 represents a groove, since the two directly adjacent circular arcs 7 and 9, apart from the common point of contact, have a greater distance to the construction point K1. The construction point K1 is the center of the circular arc 12. The circular arc 12 has a dimensionless radius R_12=0.48, which is the same as the dimensionless core radius. The center angle is α_12=0.2289≈13.1°. The circular arc 12 represents a groove, since the two directly adjacent circular arcs 11 and 13, apart from the common point of contact, have a greater distance to the construction point K1. The construction point K1 is the center of the circular arc 16. The circular arc 16 has a dimensionless radius R_16=0.48, which is the same as the dimensionless core radius. The center angle is α_16=0.2289≈13.1°. The circular arc 16 represents a groove, since the two directly adjacent circular arcs 1 and 15, apart from the common point of contact, have a greater distance to the construction point K1.

The screw profile includes a construction point K2 which does not coincide with the construction point K1 and which lies within the screw profile and which moreover lies within a circle the center of which is the construction point K1 and the dimensionless radius of which is the dimensionless core radius. The screw profile is not axisymmetric or point-symmetric in relation to the construction point K2. The construction point K2 is the center of the circular arc 6a. The circular arc 6a has a dimensionless radius R_6a=0.55, which is somewhat smaller than the dimensionless housing inner radius RG=0.554. The center angle is α_6a=0.1950≈11.2°. The circular arc 6a represents the main flight land HK, since the two directly adjacent circular arcs 6 and 7, apart from the common point of contact, have a smaller distance to the construction point K2.

The dimensionless distance between the construction point K2 and the construction point K1 is approximately 0.051 times the dimensionless housing inner radius RG. The smaller angle between the angle bisector of the groove, the circular arc point of which that lies on the angle bisector of the groove is separated from the closest point of the main flight land HK by the smaller curve length, and the connecting line between K1 and K2 is 157.5°.

The circular arcs 1, 3, 5, 7, 9, 11, 13 and 15 represent flanks. The dimensionless radius of the eight circular arcs is respectively R_1=R_3=R_5=R_7=R_9=R_11=R_13=R_15=1.00. The centers of these eight circular arcs are in each case not identical to the construction points K1 and K2.

The main flight land HK (circular arc 6a) and the second secondary flight land $NK_2$ (circular arc 6) make contact with one another. The main flight land HK, the first secondary flight land $NK_i$ (circular arc 2), the second secondary flight land $NK_2$ (circular arc 6), the third secondary flight land $NK_3$ (circular arc 10) and the fourth secondary flight land $NK_4$ (circular arc 14) are each separated from a groove by a flank.

FIG. 14*b*: The screw profile in FIG. 14*b*1 has been obtained by displacing the screw profile from FIG. 14*a*; FIG. 14*b*2 shows an enlargement of a detail around circular arc 6 and circular arc 6*a* of FIG. 14*b*1. The displacement was effected such that the construction point K2 lies in the center M1 of the housing bore and thus in the associated point of rotation DP1. The dimensionless housing inner radius is RG=0.554. The dimensionless screw outer radius is RA=0.55. The circular arc 6*a* has a dimensionless radius R_6*a*=0.55, which is the same as the dimensionless screw outer radius RA. The dimensionless clearance of the main flight land HK (circular arc 6*a*) with respect to the housing is C_HK=0.004.

This embodiment is advantageous because it has a constant, narrow clearance between the housing and the main flight land HK (circular arc 6*a*), which results in good cleaning of the housing. This embodiment is also advantageous because the length of the convergent or divergent channel—depending on the direction of rotation—between the housing and the main flight land (circular arc 6) is substantially smaller than in the embodiment according to FIG. 13*b*. Thus, when rotated clockwise, a convergent channel is produced between the housing and the main flight land HK (circular arc 6*a*), and when rotated counterclockwise, a divergent channel is produced.

FIGS. 1 to 14 show screw profiles having numbers of grooves Z from 1 up to and including 4, in which screw profiles the dimensionless screw outer radius RA has different discrete values. The screw elements according to the invention are not limited to these discrete values of the screw outer radius. Screw profiles having a number of grooves 1 or a number of grooves 2 may have a dimensionless screw outer radius in the range of RA=0.57 to RA=0.67, preferably in the range of RA=0.59 to RA=0.65, if the construction point K1 lies in the center M1 of the housing bore and thus in the associated point of rotation DP1. Screw profiles having a number of grooves 3 may have a screw outer radius in the range of RA=0.515 to RA=0.56, preferably in the range of RA=0.525 to RA=0.55, if the construction point K1 lies in the center M1 of the housing bore and thus in the associated point of rotation DP1. Screw profiles having a number of grooves 4 may have a screw outer radius in the range of RA=0.51 to RA=0.535, preferably in the range of RA=0.515 to RA=0.53, if the construction point K1 lies in the center M1 of the housing bore and thus in the associated point of rotation DP1.

If the construction point K1 lies in the center M1 of the housing bore and thus in the associated point of rotation DP1, the dimensionless screw outer radius RA is 0.2% to 10%, preferably 0.4% to 7.5%, particularly preferably 0.6% to 5%, very particularly preferably approximately 0.8% to 2.5%, smaller than the dimensionless housing inner radius RG. That is to say, if the construction point K1 lies in the center M1 of the housing bore and thus in the associated point of rotation DP1, the dimensionless clearance C_NK between a secondary flight land $NK_i$ and the housing is 0.2% to 10%, preferably 0.4% to 7.5%, particularly preferably 0.6% to 5%, very particularly preferably approximately 0.8% to 2.5%, of the dimensionless housing inner radius RG. In the case of a plurality of secondary flight lands $NK_1$ to $NK_n$, these secondary flight lands may have the same or a different dimensionless clearance C_NK.

If the construction point K2 lies in the center M1 of the housing bore and thus in the associated point of rotation DP1, the dimensionless screw outer radius RA is 0.1% to 3.2%, preferably 0.2% to 2.6%, particularly preferably 0.3% to 2.0%, very particularly preferably approximately 0.4% to 1.4%, smaller than the dimensionless housing inner radius RG. That is to say, if the construction point K2 lies in the center M1 of the housing bore and thus in the associated point of rotation DP1, the dimensionless clearance C_HK between the main flight land HK and the housing is 0.1% to 3.2%, preferably 0.2% to 2.6%, particularly preferably 0.3% to 2.0%, very particularly preferably approximately 0.4% to 1.4%, of the dimensionless housing inner radius RG.

The distance of the construction point K2 from the construction point K1 and the smaller angle between the angle bisector of the groove, the circular arc point of which that lies on the angle bisector of the groove is separated from the closest point of the main flight land HK by the smaller curve length, and the connecting line between K1 and K2 make it possible to adapt the position of the main flight land HK and the size of the center angle thereof, and thus the screw profile or the screw element having this screw profile, to the process tasks in a twin-shaft screw machine. Thus, for example, in the case of the profile according to FIG. 6*a*, the distance (0.1 times the housing inner radius) and the smaller angle (135°) between the angle bisector of the groove, the circular arc point of which that lies on the angle bisector of the groove is separated from the closest point of the main flight land HK by the smaller curve length, and the connecting line between K1 and K2 have been selected such that the circular arc 6 is almost no longer present. In FIG. 7*a*, the distance between K1 and K2 has been reduced to 0.091 times the housing inner radius, as a result of which the center angle of the circular arc 6 increases and the center angle of the circular arc 6*a*, which represents the main flight land HK, decreases. If, in FIG. 6*a*, the distance between K1 and K2 were increased to more than 0.1 times the housing inner radius, the circular arc 6 would disappear completely from the screw profile. In this case, the point of intersection between the circular arcs 5 and 6*a* would have to be ascertained in order to be able to determine the center angles of the circular arcs 5 and 6*a*. For screw profiles having a number of grooves Z=3 or a number of grooves Z=4, what has been stated above applies analogously.

If the screw profile has a secondary flight land $NK_i$ which is formed from a circular arc the center of which is the construction point K2 or the construction point K3, the position of the construction point K2 or the construction point K3 and the radius of the circular arc that forms the secondary flight land $NK_i$ make it possible to adapt the secondary flight land $NK_i$ to the process tasks of a twin-shaft screw machine. In FIG. 9*a*, the circular arc 2*a*, the center of which is the construction point K2, forms a corresponding secondary flight land $NK_i$. If, in FIG. 9*a*, the radius of the circular arc 2*a* were to be reduced, the center angle of the circular arc 2*a* would increase. In the case of a sufficiently small radius of the circular arc 2*a*, the circular arc 2 would disappear completely from the screw profile. In this case, the point of intersection between the circular arcs 2*a* and 3 would have to be ascertained in order to be able to determine the center angles of the circular arcs 2*a* and 3. In FIG. 10*a*, the circular arc 2*a*, the center of which is the construction point K3, forms a corresponding secondary flight land $NK_i$. If, in FIG. 10*a*, the radius of the circular arc 2*a* were to be reduced, the center angle of the circular arc 2*a* would increase. In the case of a sufficiently small radius of the circular arc 2*a*, the circular arc 2 would disappear completely from the screw profile. In this case, the point of intersection between the circular arcs 1 and 2a would have to be ascertained in order to be able to determine the center angles of the circular arcs 1 and 2a.

FIGS. 1 to 14 show screw profiles having numbers of grooves of Z=1 up to and including Z=4, in which screw profiles the distance between the construction points K1 and K2 has different discrete values. The screw elements according to the invention are not limited to these discrete values. The distance from the construction point K1 to the construction point K2 is 0.2% to 20%, preferably 0.4% to 15%, particularly preferably 0.6% to 10% and very particularly preferably 0.8% to 5%, of the dimensionless housing inner radius RG.

FIGS. 1 to 14 show screw profiles having numbers of grooves of Z=1 up to and including Z=4, in which screw profiles the smaller angle between the angle bisector of the groove, the circular arc point of which that lies on the angle bisector of the groove is separated from the closest point of the main flight land HK by the smaller curve length, and the connecting line between K1 and K2 has different discrete values. The screw elements according to the invention are not limited to these discrete values. At a number of grooves of Z=1, the smaller angle between the angle bisector of the groove and the connecting line between K1 and K2 is in the range of 0° to 90°, preferably in the range of 45° to 70°, and is particularly preferably approximately 55°. At a number of grooves of Z=2, the smaller angle between the angle bisector of the groove, the circular arc point of which that lies on the angle bisector of the groove is separated from the closest point of the main flight land HK by the smaller curve length, and the connecting line between K1 and K2 is in the range of 110° to 160°, preferably in the range of 125° to 145°, and is particularly preferably approximately 135°. At a number of grooves of Z=3, the smaller angle between the angle bisector of the groove, the circular arc point of which that lies on the angle bisector of the groove is separated from the closest point of the main flight land HK by the smaller curve length, and the connecting line between K1 and K2 is in the range of 130° to 170°, preferably in the range of 140° to 160°, and is particularly preferably approximately 150°. At a number of grooves of Z=4, the smaller angle between the angle bisector of the groove, the circular arc point of which that lies on the angle bisector of the groove is separated from the closest point of the main flight land HK by the smaller curve length, and the connecting line between K1 and K2 is in the range of 140° to 175°, preferably in the range of 150° to 165°, and is particularly preferably approximately 157.5°.

FIGS. 1 to 14 show screw profiles having numbers of grooves of Z=1 up to and including Z=4, in which screw profiles the center angles of the circular arcs that form a groove have different discrete values. The screw elements according to the invention are not limited to these discrete values. At a number of grooves of Z=1, the circular arc which forms the groove has a center angle of 90° to 150°, preferably of 95° to 140°, particularly preferably of 100° to 130°. At a number of grooves of Z=2, the circular arcs which form the grooves each have a center angle of 5° to 50°, preferably of 10° to 40°, particularly preferably of 15° to 30°. At a number of grooves of Z=3, the circular arcs which form the grooves each have a center angle of 3° to 30°, preferably of 6° to 24°, particularly preferably of 9° to 18°. At a number of grooves of Z=4, the circular arcs which form the grooves each have a center angle of 2° to 20°, preferably of 4° to 16°, particularly preferably of 6° to 12°.

FIGS. 1 to 14 show screw profiles having numbers of grooves of Z=1 up to and including Z=4, in which screw profiles the center angle of the circular arc which forms the main flight land HK has different discrete values. The screw elements according to the invention are not limited to these discrete values. In a first situation, for example, one of the two adjacent circular arcs of the main flight land HK may be a secondary flight land NK$_i$. In a second situation, it may be the case, for example, that neither of the two directly adjacent circular arcs of the main flight land HK is a secondary flight land NK$_i$. At a number of grooves of Z=1, in the first situation, the circular arc which forms the main flight land HK has a center angle of 10° to 150°, preferably of 30° to 140°, particularly preferably of 50° to 130°. At a number of grooves of Z=1, in the second situation, the circular arc which forms the main flight land HK has a center angle of 90° to 150°, preferably of 95° to 140°, particularly preferably of 100° to 130°. At a number of grooves of 2, in the first situation, the circular arc which forms the main flight land HK has a center angle of 5° to 50°, preferably of 10° to 40°, particularly preferably of 15° to 30°. At a number of grooves of 2, in the second situation, the circular arc which forms the main flight land HK has a center angle of 5° to 50°, preferably of 10° to 40°, particularly preferably of 15° to 30°. At a number of grooves of 3, in the first situation, the circular arc which forms the main flight land HK has a center angle of 3° to 30°, preferably of 6° to 24°, particularly preferably of 9° to 18°. At a number of grooves of 3, in the second situation, the circular arc which forms the main flight land HK has a center angle of 3° to 30°, preferably of 6° to 24°, particularly preferably of 9° to 18°. At a number of grooves of 4, in the first situation, the circular arc which forms the main flight land HK has a center angle of 2° to 20°, preferably of 4° to 16°, particularly preferably of 6° to 12°. At a number of grooves of 4, in the second situation, the circular arc which forms the main flight land HK has a center angle of 2° to 20°, preferably of 4° to 16°, particularly preferably of 6° to 12°.

FIGS. 1 to 14 show screw profiles having numbers of grooves of Z=1 up to and including Z=4, in which screw profiles the center angles of the circular arcs which form the secondary flight lands NK$_1$ to NK$_n$ have different discrete values. The screw elements according to the invention are not limited to these discrete values. In a first situation, for example, one of the two directly adjacent circular arcs of a secondary flight land NK$_i$ may be the main flight land HK. In a second situation, it may be the case, for example, that neither of the two directly adjacent circular arcs of a secondary flight land NK$_i$ is the main flight land HK. At a number of grooves of Z=1, in the first situation, a circular arc which forms a secondary flight land NK$_i$ has a center angle of greater than 0° to 140°, preferably of greater than 0° to 110°, particularly preferably of greater than 0° to 80°. At a number of grooves of Z=2, in the first situation, a circular arc which forms a secondary flight land NK$_i$ has a center angle of greater than 0° to 45°, preferably of greater than 0° to 30°, particularly preferably of greater than 0° to 15°. At a number of grooves of Z=2, in the second situation, a circular arc which forms a secondary flight land NK$_i$ has a center angle of 5° to 50°, preferably of 10° to 40°, particularly preferably of 15° to 30°. At a number of grooves of Z=3, in the first situation, a circular arc which forms a secondary flight land NK$_i$ has a center angle of greater than 0° to 27°, preferably of greater than 0° to 18°, particularly preferably of greater than 0° to 9°. At a number of grooves of Z=3, in the second situation, a circular arc which forms a secondary flight land NK$_i$ has a center angle of 3° to 30°, preferably of 6° to 24°, particularly preferably of 9° to 18°. At a number of grooves of Z=4, in the first situation, a circular arc which forms a secondary flight land $NK_i$ has a center angle of greater than 0° to 18°, preferably of greater than 0° to 12°, particularly preferably of greater than 0° to 6°. At a number of grooves of Z=4, in the second situation, a circular arc which forms a secondary flight land $NK_i$ has a center angle of 2° to 20°, preferably of 4° to 16°, particularly preferably of 6° to 12°.

FIG. 15: shows the screw profile according to the invention having a number of grooves Z=1 from FIG. 2b as a pair of two identical screw profiles. FIG. 15 is obtained by copying the housing and the circular arcs 1, 2, 2a, 3 and 4 of the screw profile from FIG. 2b and displacing the copies by the axial distance in the direction of the positive x axis. The copied and displaced circular arcs are given the designations 1', 2', 2a', 3' and 4'. The circular arc 2a of the left-hand screw profile is not cleaned by the right-hand screw profile. The circular arc 2a' of the right-hand screw profile is not cleaned by the left-hand screw profile. There is no complete self-cleaning of the screw profiles.

FIG. 16: shows the screw profile according to the invention having a number of grooves Z=2 from FIG. 6b as a pair of two identical screw profiles. FIG. 16 is obtained by copying the housing from FIG. 6b and displacing it by the axial distance in the direction of the positive x-axis and by copying the circular arcs 1, 2, 3, 4, 5, 6, 6a, 7 and 8 of the screw profile from FIG. 6b, mirroring the copied circular arcs at point K2 on the x-axis and rotating them by 90° clockwise in point K2 and displacing these copies by the axial distance in the direction of the positive x-axis. The copied and displaced circular arcs are given the designations 1', 2', 3', 4', 5', 6', 6a', 7' and 8'. The circular arc 6a of the left-hand screw profile is not cleaned by the right-hand screw profile. The circular arc 6a' of the right-hand screw profile is not cleaned by the left-hand screw profile. There is no complete self-cleaning of the screw profiles.

FIG. 17: shows the screw profile according to the invention having a number of grooves Z=3 from FIG. 12b as a pair of two identical screw profiles. FIG. 17 is obtained by copying the housing and the circular arcs 1, 2, 3, 4, 5, 6, 6a, 7, 8, 9, 10, 11 and 12 of the screw profile from FIG. 12b and displacing the copies by the axial distance in the direction of the positive x-axis. The copied and displaced circular arcs are given the designations 1', 2', 3', 4', 5', 6', 6a', 7', 8', 9', 10', 11' and 12'. The circular arc 6a of the left-hand screw profile is not cleaned by the right-hand screw profile. The circular arc 6a' of the right-hand screw profile is not cleaned by the left-hand screw profile. There is no complete self-cleaning of the screw profiles.

FIG. 18: shows the screw profile according to the invention having a number of grooves Z=4 from FIG. 14b as a pair of two identical screw profiles. FIG. 18 is obtained by copying the housing from FIG. 14b and displacing it by the axial distance in the direction of the positive x-axis and by copying the circular arcs 1, 2, 3, 4, 5, 6, 6a, 7, 8, 9, 10, 11, 12, 13, 14, 15 and 16 of the screw profile from FIG. 14b, mirroring the copied circular arcs at point K2 on the x-axis and rotating them by 135° clockwise in point K2 and displacing these copies by the axial distance in the direction of the positive x-axis. The copied and displaced circular arcs are given the designations 1', 2', 3', 4', 5', 6', 6a', 7', 8', 9', 10', 11', 12', 13', 14', 15' and 16'. The circular arc 6a of the left-hand screw profile is not cleaned by the right-hand screw profile. The circular arc 6a' of the right-hand screw profile is not cleaned by the left-hand screw profile. There is no complete self-cleaning of the screw profiles.

FIG. 19: shows the screw profiles according to the invention from FIG. 16 in the form of a pair of conveying elements with the axes of rotation D1 and D2, which are at the dimensionless axial distance A from one another and which are situated at the same height on the drive shaft AW1 and the drive shaft AW2. The dimensionless housing inner radius is RG=0.66 and the dimensionless screw outer radius RA=0.65. The dimensionless clearance between the main flight land HK of a conveying element and the housing inner wall is C_HK=0.01. The dimensionless length of the conveying elements is 1.2 times the dimensionless axial distance A. The dimensionless pitch of the conveying elements is T=1.2, wherein the dimensionless pitch is understood to mean the quotient of the axial length required for a rotation of the screw profile by an angle of 6.2832=360° and the axial distance a. The housing is illustrated by hatching on the left and right of the two conveying elements. Illustrated on the surfaces of the two conveying elements is also a possible computational grid, which can be used to calculate the flow in twin-shaft and multi-shaft extruders. For the force fit between a drive shaft AW such as the drive shaft AW1 or the drive shaft AW2 and a screw element, tongue-and-groove systems or arrangements of multiple interlocking teeth may be used. Arrangements of multiple interlocking teeth may be configured as trapezoidal or wavy and respectively symmetrical or asymmetrical.

As an alternative, the screw profiles according to the invention from FIG. 16 may also be in the form of a pair of kneading elements or a pair of mixing elements.

A conveying element is distinguished, as is known (see for example [1], pages 227-248), in that the screw profile has continuous helical turns and continuations in the axial direction. In this case, the conveying element may be right-handed or left-handed. The pitch of the conveying element preferably lies in the range of 0.1 to 10 times the axial distance, and the axial length of a conveying element is preferably in the range of 0.1 to 10 times the axial distance.

A kneading element is distinguished, as is known (see for example [1], pages 227-248), in that the screw profile is continued in the axial direction in an offset manner in the form of kneading disks. The arrangement of the kneading disks may be right-handed or left-handed or neutral. The axial length of the kneading disks preferably lies in the range of 0.05 to 10 times the axial distance. The axial distance between two adjacent kneading disks preferably lies in the range of 0.002 to 0.1 times the axial distance.

As is known (see for example [1], pages 227-248), mixing elements are formed by conveying elements being provided with apertures in the screw flight lands. The mixing elements may be right-handed or left-handed. Their pitch preferably lies in the range of 0.1 to 10 times the axial distance, and the axial length of the elements preferably lies in the range of 0.1 to 10 times the axial distance. The apertures preferably have the form of a u-shaped or v-shaped groove, said grooves preferably being arranged counter-conveying or axially parallel.

The sequence of the screw elements consisting of conveying elements and/or kneading elements and/or mixing elements on a drive shaft AW is referred to as screw configuration. All screw elements on a drive shaft AW and the drive shaft AW itself together form a screw shaft SW. The first drive shaft is denoted AW1 and the first screw shaft is denoted SW1. The second drive shaft is denoted AW2 and the second screw shaft is denoted SW2.

Screw profiles according to the invention can, inter alia, be obtained particularly easily from reference profiles which are axisymmetric in relation to a construction point K1. Such an axisymmetric reference profile is characterized in that the dimensionless core radius RG, the number of grooves Z and the dimensionless outer radius RA of such an axisymmetric reference profile correspond to the dimensionless core radius RG, the number of grooves Z and the dimensionless outer radius RA of a screw profile according to the invention and the construction point K1 of such an axisymmetric reference profile is the same as the construction point K1 of a screw profile according to the invention and, in the case of an odd number of grooves Z, such an axisymmetric reference profile is axisymmetric in relation to either the x-axis or the y-axis and, in the case of an even number of grooves Z, such an axisymmetric reference profile is axisymmetric in relation to the x-axis and the y-axis, and two similar axisymmetric reference profiles precisely clean one another in pairs if these axisymmetric reference profiles have a reference distance RFA which corresponds to the axial distance A, and if, in the case of an odd number of grooves Z, these axisymmetric reference profiles are not rotated with respect to one another in their respective reference axes of rotation RFD1 and RFD2, and if, in the case of an even number of grooves Z, these axisymmetric reference profiles are rotated with respect to one another in their respective reference axes of rotation RFD1 and RFD2 by an angle of $\pi/Z=180°/Z$, and if these axisymmetric reference profiles rotate in their respective reference axes of rotation RFD1 and RFD2 at the same speed with the same direction of rotation.

Thus,

FIG. 1a shows a reference profile which is axisymmetric in relation to a construction point K1 and has a number of grooves Z=1 for a screw profile according to the invention as per FIG. 2a, FIG. 3a or FIG. 4a.

FIG. 5a shows a reference profile which is axisymmetric in relation to a construction point K1 and has a number of grooves Z=2 for a screw profile according to the invention as per FIG. 6a, FIG. 7a, FIG. 9a or FIG. 10a.

FIG. 11a shows a reference profile which is axisymmetric in relation to a construction point K1 and has a number of grooves Z=3 for a screw profile according to the invention as per FIG. 12a.

FIG. 13a shows a reference profile which is axisymmetric in relation to a construction point K1 and has a number of grooves Z=4 for a screw profile according to the invention as per FIG. 14a.

FIG. 5a shows a reference profile which is axisymmetric in relation to a construction point K1 and has a number of grooves Z=2 for a screw profile according to the invention as per FIG. 7a. The circular arcs 1 to 5, the circular arc 8 and the construction point K1 are respectively identical. Therefore, the dimensionless core radius RI, the number of grooves Z and the dimensionless outer radius RA of the axisymmetric reference profile and of the screw profile according to the invention are the same size in each case. It is furthermore thus the case that the point of rotation of the axisymmetric reference profile and that of the screw profile according to the invention correspond.

In order, for example, to convert the reference profile as per FIG. 5a, which is axisymmetric in relation to the construction point K1, into the screw profile according to the invention as per FIG. 7a, the circular arc 6a, which represents the main flight land HK, must be inserted between the circular arcs 6 and 7 into the axisymmetric reference profile, it being necessary to correspondingly adapt the circular arcs 6 and 7. The radius of the circular arc 6a is selected such that it is the same as the dimensionless housing inner radius RG=0.66 reduced by the dimensionless clearance C_HK=0.01. The center of the circular arc 6a lies in the construction point K2. The position of the construction point K2 is selected such that the smaller angle between the angle bisector of the groove, the circular arc point of which that lies on the angle bisector of the groove is separated from the closest point of the main flight land HK by the smaller curve length, and the connecting line between K1 and K2 is 135.0° and the distance between the construction points K1 and K2 is equal to 0.06. The new end point of the circular arc 6 results from the point of intersection of the circular arc 6a with the old circular arc 6. The starting point of the circular arc 6a is the same as the end point of the circular arc 6. The new starting point of the point 7 on the circle results from the point of intersection of the circular arc 6a with the old circular arc 7. The end point of the circular arc 6a is the same as the starting point of the circular arc 7. The now respectively known starting points, end points and centers of the circular arcs 6, 6a and 7 make it possible to calculate the respective center angles.

FIG. 20 shows a pair of reference profiles having a number of grooves Z=2. The reference profile of the left-hand shaft that is axisymmetric in relation to the construction point K1 corresponds to the axisymmetric profile as per FIG. 5a. The axisymmetric reference profile of the right-hand shaft represents a copy of the reference profile of the left-hand shaft and is therefore likewise axisymmetric, which copy has been mirrored on the x-axis and which, at the origin of the x/y coordinate system, has been rotated clockwise by an angle of $\pi/2=180°/2=90°$ and which is displaced in the positive x-direction by a dimensionless reference axial distance RFA, which corresponds to the dimensionless axial distance A.

By means of this procedure, the circular arc 1 of the reference profile of the left-hand shaft that is axisymmetric in relation to the construction point K1 has been converted into the circular arc 1' of the axisymmetric reference profile of the right-hand shaft. The same applies analogously to the circular arcs 2 to 8, from which the circular arcs 2' to 8' arise. The construction point K1 is identical to the reference point of rotation RFD1. The construction point K1', which is displaced by the reference axial distance in the positive x-direction, is identical to the reference point of rotation RFD2. The axisymmetric reference profiles of the left-hand and right-hand shafts clean one another in pairs if the axisymmetric reference profiles rotate in their respective reference axes of rotation RFD1 and RFD2 at the same speed with the same direction of rotation.

In FIG. 20, the reference screw outer radius RFRA is the same as the reference housing inner radius RFRG=0.61. The reference screw outer radius RFRA is smaller than the housing inner radius RG by 0.2% to 10%, preferably 0.4% to 7.5%, particularly preferably 0.6% to 5%, very particularly preferably 0.8% to 2.5%.

At a given dimensionless axial distance A, corresponding to the dimensionless reference axial distance RFA, the reference profiles may be constructed easily according to the methods disclosed in [1], pages 95 to 109.

The invention claimed is:

1. A screw element having a number of grooves Z, suitable for a twin-shaft screw machine:
    having two screw shafts SW1 and SW2 that rotate in the same direction and at the same speed, having axes of rotation D1 and D2 of which are at an axial distance a and
    having two circular housing bores which penetrate one another, each of which has an identical housing inner radius rg and bore centers M1 and M2 of which are at a distance which is equal to the axial distance a, and the bore centers M1 and M2 of which coincide with the respective axes of rotation D1 and D2 of the screw shafts SW1 and SW2,
    wherein the screw element has a screw profile which:
        (1) forms a closed convex line,
        (2) is composed only of circular arcs the radius of which is less than or equal to the axial distance a, wherein directly adjacent circular arcs have a different radius,
        (3) has a first construction point K1 which lies within the screw profile,
        (4) is not axisymmetric in relation to the construction point K1,
        (5) is composed of at least 4 circular arcs,
        (6) has a second construction point K2 which does not coincide with the construction point K1, wherein the construction point K2 lies within the screw profile,
        (7) is not point-symmetric or axisymmetric in relation to the construction point K2,
        (8) has a point of rotation DP which coincides with one of the bore centers M1 or M2 and which lies on a path from the construction point K1 to the construction point K2, wherein the point of rotation DP of the screw element lies closer to the construction point K2 than to the construction point K1,
        (9) has exactly one main flight land HK, the main flight land HK is formed from only one circular arc and the center of this circular arc is the construction point K2, and wherein the set of points of the screw profile that are furthest away from the construction point K2 comprise an end point of a circular arc preceding the main flight land HK, the main flight land HK, and a starting point of a circular arc succeeding the main flight land HK,
        (10) has at least one groove, wherein a groove of the at least one groove is formed from only a single circular arc the center of which is the construction point K1, and a radius of the groove of the at least one groove is the same as a core radius ri, and wherein a circular arc preceding the groove of the at least one groove and a circular arc succeeding the groove of the at least one groove, apart from an end point of the circular arc preceding the groove of the at least one groove and a starting point of the circular arc succeeding the groove of the at least one groove, have a greater distance from the construction point K1 than the circular arc of the groove of the at least one groove,
        (11) has a plurality of flanks, wherein flanks are those regions of the screw profile the circular arcs of which have a center which is neither the construction point K1 nor the construction point K2, and
        (12) the groove of the at least one groove is separated from the closest point of the main flight land HK by at least one circular arc, which is a flank.

2. The screw element as claimed in claim 1, wherein the second construction point K2 of the screw profile lies within a circle having the construction point K1 as the center and the core radius ri as the radius.

3. The screw element as claimed in claim 1, wherein a radius rHK of the circular arc of the main flight land HK corresponds to a housing inner radius rg reduced by a main flight-land clearance c_HK.

4. The screw element as claimed in claim 1, wherein the screw profile has a number of grooves Z=1 to 4 grooves and wherein the circular arcs forming the grooves
    at a number of grooves Z=1 have a center angle of 90° to 150°, or
    at a number of grooves Z=2 respectively have a center angle of 5° to 50°, wherein the center angles of the grooves may be the same or different, or
    at a number of grooves Z=3 respectively have a center angle of 3° to 30° wherein the center angles of the grooves may be the same or different, or
    at a number of grooves Z=4 respectively have a center angle of 2° to 20°.

5. The screw element as claimed in claim 1, wherein the screw profile has a third construction point K3, wherein the screw profile is not axisymmetric or point-symmetric in relation to the construction point K3, wherein the construction point K3 is a point which has the same distance to the construction point K1 as the construction point K2, and wherein the construction points K1, K2 and K3 lie on a straight line and K1, K2 and K3 are not identical.

6. The screw element as claimed in claim 1, wherein the screw profile has a secondary flight land NK or a plurality of secondary flight lands $NK_1$ to $NK_n$, wherein each secondary flight land $NK_i$ is formed from only one circular arc, the center of which is the construction point K1 or the construction point K2 or a construction point K3, wherein the screw profile is not axisymmetric or point-symmetric in relation to the construction point K3, wherein the construction point K3 is a point which has the same distance to the construction point K1 as the construction point K2, and wherein the construction points K1, K2 and K3 lie on a straight line and K1, K2 and K3 are not identical.

7. The screw element as claimed in claim 1, wherein the groove of the at least one groove is separated from the closest point of a secondary flight land $NK_i$ by at least one circular arc, which is a flank.

8. The screw element as claimed in claim 1, wherein the point of rotation DP of the screw profile is the construction point K2.

9. The screw element as claimed in claim 1, wherein the screw element is suitable for being arranged and operated in pairs in the screw machine with another screw element having the same or a different screw profile and the same or a different arrangement of the point of rotation on the other screw shaft.

10. The screw element as claimed in claim 1, wherein:
    the core radius ri, the number of grooves Z and an outer radius ra of the screw profile correspond to the core radius ri, the number of grooves Z and the outer radius ra of a reference screw profile and
        the construction point K1 of the screw profile is the same as the construction point K1 of the reference screw profile,
    wherein a reference screw outer radius rfra is smaller than the housing inner radius rg by 0.2% to 10%,
    wherein two similar reference screw profiles precisely clean one another in pairs if the reference screw profiles have a reference distance rfa which corresponds to the axial distance a, and if the reference screw profiles have respective reference points of rotation rfDP1 and rfDP1 and rotate in their respective reference points of rotation rfDP1 and rfDP2 at the same speed with the same direction of rotation.

11. The screw element as claimed in claim 1, wherein the point of rotation DP lies on the construction point K2.

12. The screw element as claimed in claim 1, wherein the circular arc which forms the main flight land HK has a center angle which is greater than 0°.

13. The screw element as claimed in claim 12, wherein the circular arc which forms the main flight land HK has a center angle of 1° to 179°.

14. The screw element as claimed in claim 1, wherein the number of circular arcs of the screw profile is equal to the number of grooves Z multiplied by 4 or equal to the number of grooves multiplied by 4 and then increased by 1.

15. The screw element as claimed in claim 14, wherein the number of circular arcs of the screw profile is equal to the number of grooves multiplied by 4 and then increased by 1.

16. An extruder having two or more drive shafts that rotate in the same direction and at the same speed, wherein the extruder is equipped with two or more identical or different screw elements as claimed in claim 1.

17. A screw element having a number of grooves Z, suitable for a twin-shaft screw machine:

having two screw shafts SW1 and SW2 that rotate in the same direction and at the same speed, axes of rotation D1 and D2 of which are at an axial distance a, and having two circular housing bores which penetrate one another, each of which has an identical housing inner radius rg and bore centers M1 and M2 of which are at a distance which is equal to the axial distance a, and the bore centers M1 and M2 of which coincide with the respective axes of rotation D1 and D2 of the screw shafts SW1 and SW2, wherein the screw element has a screw profile which:
(1) forms a closed convex line,
(2) is composed only of circular arcs the radius of which is less than or equal to the axial distance a, wherein directly adjacent circular arcs have a different radius,
(3) has a first construction point K1 which lies within the screw profile,
(4) is not axisymmetric in relation to the construction point K1,
(5) is composed of at least 4 circular arcs,
(6) has a second construction point K2 which does not coincide with the construction point K1, wherein the construction point K2 lies within the screw profile,
(7) is not point-symmetric or axisymmetric in relation to the construction point K2,
(8) has a point of rotation DP which coincides with one of the bore centers M1 or M2 and which lies on a path from the construction point K1 to the construction point K2,
(9) has exactly one main flight land HK, the main flight land HK is formed from only one circular arc and the center of this circular arc is the construction point K2, and wherein the set of points of the screw profile that are furthest away from the construction point K2 comprise an end point of a circular arc preceding the main flight land HK, the main flight land HK, and a starting point of a circular arc succeeding the main flight land HK,
(10) has at least one groove, wherein a groove of the at least one groove is formed from only a single circular arc the center of which is the construction point K1, and a radius of the groove of the at least one groove is the same as a core radius ri, and wherein a circular arc preceding the groove of the at least one groove and a circular arc succeeding the groove of the at least one groove, apart from an end point of the circular arc preceding the groove of the at least one groove and a starting point of the circular arc succeeding the groove of the at least one groove, have a greater distance from the construction point K1 than the circular arc of the groove of the at least one groove,
(11) has a plurality of flanks, wherein flanks are those regions of the screw profile the circular arcs of which have a center which is neither the construction point K1 nor the construction point K2, and
(12) the groove of the at least one groove is separated from the closest point of the main flight land HK by at least one circular arc, which is a flank, wherein a radius rHK of the circular arc of the main flight land HK corresponds to a housing inner radius rg reduced by a main flight-land clearance c_HK.

* * * * *